US010503948B2

(12) United States Patent
Kitchens, II et al.

(10) Patent No.: US 10,503,948 B2
(45) Date of Patent: Dec. 10, 2019

(54) MULTI-SPECTRAL ULTRASONIC IMAGING

(71) Applicant: QUALCOMM Incorporated, San Diego, CA (US)

(72) Inventors: Jack Conway Kitchens, II, Buffalo, NY (US); John Keith Schneider, Williamsville, NY (US); Ashish Hinger, Sunnyvale, CA (US); Ranjith Ranganathan, San Jose, CA (US); Nai-Kuei Kuo, San Jose, CA (US); Kostadin Dimitrov Djordjev, San Jose, CA (US); Stephen Michael Gojevic, Lockport, NY (US); David William Burns, San Jose, CA (US); Nao Sugawara Chuei, San Diego, CA (US); Eliza Yingzi Du, Cupertino, CA (US); Ming Yu Chen, Santa Clara, CA (US); Kwokleung Chan, San Diego, CA (US); Jin Gu, Santa Clara, CA (US); Esra Vural, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 15/115,058

(22) PCT Filed: Mar. 5, 2015

(86) PCT No.: PCT/US2015/019069
§ 371 (c)(1),
(2) Date: Jul. 28, 2016

(87) PCT Pub. No.: WO2015/134816
PCT Pub. Date: Sep. 11, 2015

(65) Prior Publication Data
US 2016/0350573 A1 Dec. 1, 2016

Related U.S. Application Data

(63) Continuation of application No. 14/639,116, filed on Mar. 4, 2015, now abandoned.
(Continued)

(51) Int. Cl.
*G03B 42/06* (2006.01)
*G06K 9/00* (2006.01)
(Continued)

(52) U.S. Cl.
CPC ........ *G06K 9/0002* (2013.01); *G01S 15/8952* (2013.01); *G06K 9/00067* (2013.01); *G06K 9/00114* (2013.01); *G06K 9/6289* (2013.01)

(58) Field of Classification Search
None
See application file for complete search history.

(56) References Cited

U.S. PATENT DOCUMENTS 5,515,298 A    5/1996 Bicz
5,551,295 A    9/1996 Stockburger
(Continued)

FOREIGN PATENT DOCUMENTS

CN    1249164 A      4/2000
CN    101536384 A    9/2009
(Continued)

OTHER PUBLICATIONS

International Search Report and Written Opinion—PCT/US2015/019069—ISA/EPO—dated Jul. 23, 2015.
(Continued)

*Primary Examiner* — Isam A Alsomiri
*Assistant Examiner* — Jonathan D Armstrong
(74) *Attorney, Agent, or Firm* — Weaver Austin Villeneuve & Sampson LLP/Qualcomm Incorporated

(57) ABSTRACT

Systems and methods for multi-spectral ultrasonic imaging are disclosed. In one embodiment, a finger is scanned at a plurality of ultrasonic scan frequencies. Each scan frequency provides an image information set describing a plurality of pixels of the finger including a signal-strength indicating an amount of energy reflected from a surface of a platen on which a finger is provided. For each of the pixels, the pixel output value corresponding to each of the scan frequencies is combined to produce a combined pixel out put value for each pixel. Systems and methods for improving the data capture of multi-spectral ultrasonic imaging are also disclosed.

13 Claims, 43 Drawing Sheets

Related U.S. Application Data

(60) Provisional application No. 61/948,778, filed on Mar. 6, 2014.

(51) Int. Cl.
*G01S 15/89* (2006.01)
*G06K 9/62* (2006.01)

(56) References Cited

U.S. PATENT DOCUMENTS

| | | | |
|---|---|---|---|
| 7,669,478 B2 | 3/2010 | Su | |
| 2002/0146178 A1* | 10/2002 | Bolle | G06K 9/00067 382/254 |
| 2008/0097211 A1 | 4/2008 | Sarvazyan et al. | |
| 2009/0234230 A1 | 9/2009 | Bercoff et al. | |
| 2009/0279746 A1 | 11/2009 | Clarke et al. | |
| 2011/0215150 A1 | 9/2011 | Schneider et al. | |
| 2013/0136321 A1 | 5/2013 | Lee et al. | |
| 2016/0350573 A1* | 12/2016 | Kitchens, II | G06K 9/0002 |
| 2016/0379038 A1* | 12/2016 | Vural | G06K 9/0008 382/125 |
| 2017/0075700 A1* | 3/2017 | Abudi | G06F 9/4418 |

FOREIGN PATENT DOCUMENTS

| | | | |
|---|---|---|---|
| CN | 101637395 A | 2/2010 | |
| CN | 102781337 A | 11/2012 | |
| CN | 102869308 A | 1/2013 | |
| DE | 102004043876 A1 | 3/2006 | |
| GB | 2461710 | 1/2010 | |
| JP | 2002175529 A | 6/2002 | |
| JP | 2003527906 A | 9/2003 | |
| JP | 2008527681 A | 7/2008 | |
| JP | 2012521597 A | 9/2012 | |
| JP | 2012521658 A | 9/2012 | |
| JP | 2014504162 A | 2/2014 | |
| WO | 02/37402 | 5/2002 | |
| WO | 2006/026970 | 3/2006 | |
| WO | WO-2006026970 A1 * | 3/2006 | G06K 9/00013 |
| WO | 2007/000047 | 1/2007 | |
| WO | 2013/023087 | 2/2013 | |

OTHER PUBLICATIONS

Nallagatla V.P., et al., "Sequential Decision Fusion of Multibiometrics Applied to Text-Dependent Speaker Verification for Controlled Errors", May 1, 2012 (May 1, 2012), 280 Pages, XP055188829, Brisbane, Queensland Retrieved from the Internet: URL:http://eprints.qut.edu.au/63348/ [retrieved on May 12, 2015].
Partial International Search Report—PCT/US2015/019069—ISA/EPO—dated May 26, 2015.

* cited by examiner

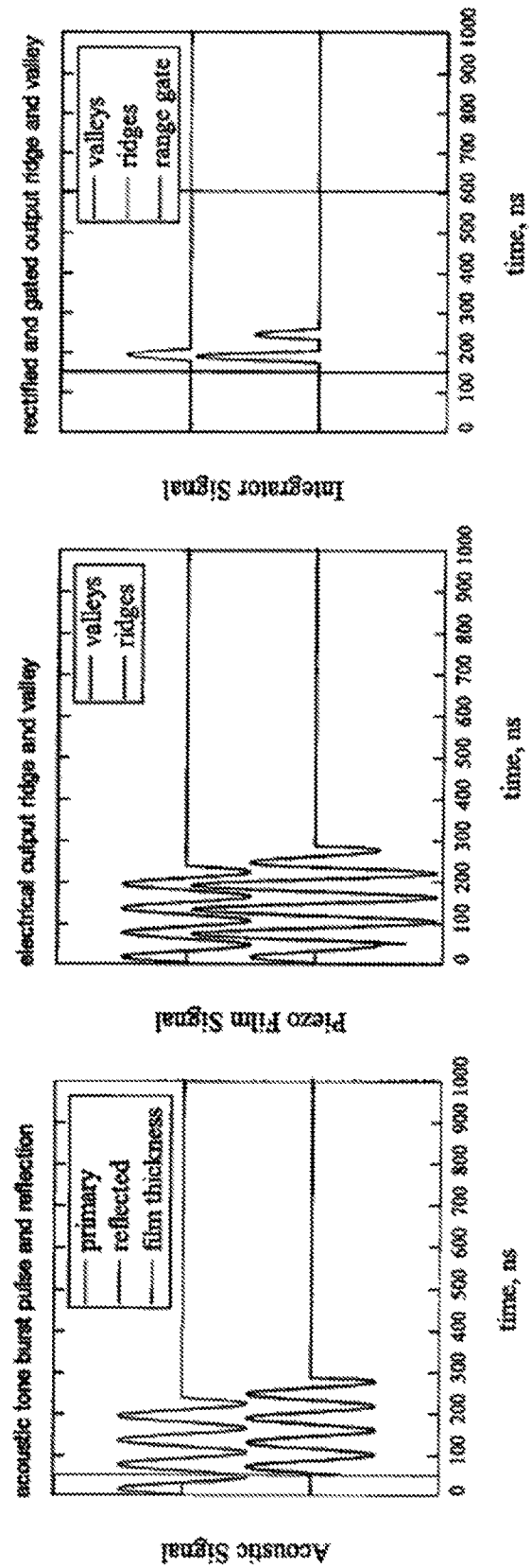

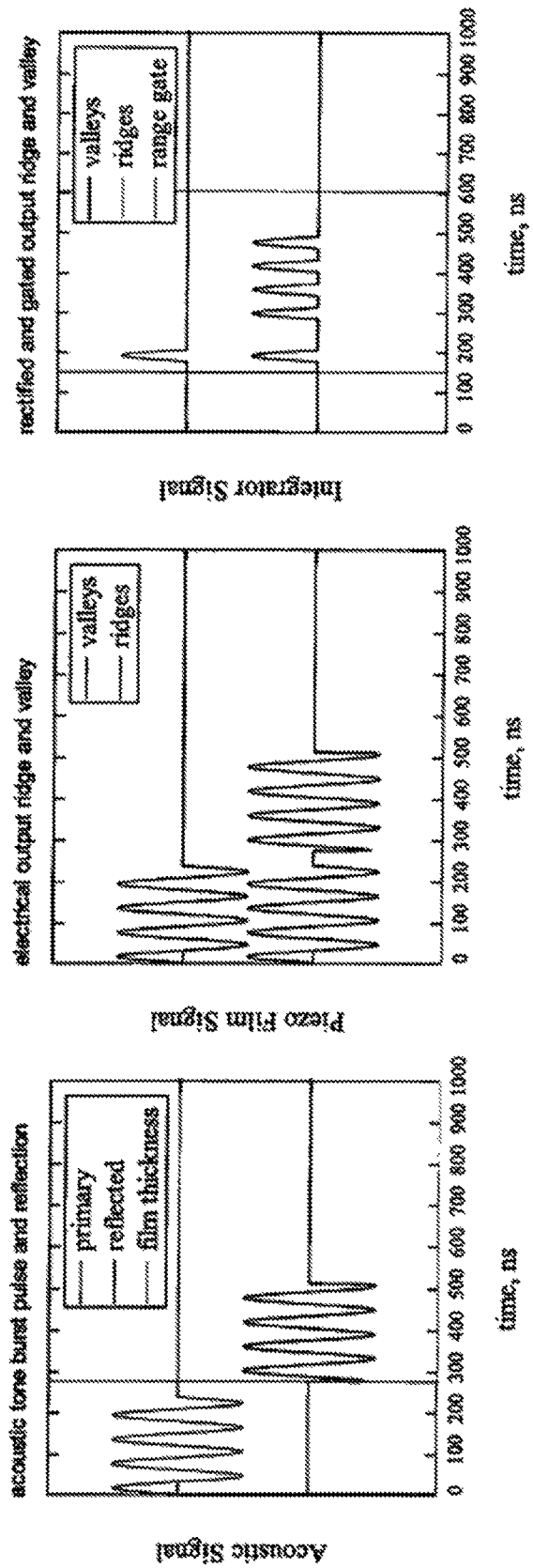

MULTI-SPECTRAL ULTRASONIC IMAGING

CROSS REFERENCE TO RELATED APPLICATIONS

This application claims priority to and benefit of U.S. provisional application No. 61/948,778, entitled "Multi-Spectral Ultrasonic Imaging", which was filed on Mar. 6, 2014, and U.S. non-provisional application Ser. No. 14/639,116, entitled "Multi-Spectral Ultrasonic Imaging", which was filed on Mar. 4, 2015, the entire contents of which is incorporated herein by reference.

FIELD OF THE DISCLOSURE

The present disclosure relates to devices and methods of using multi-spectral ultrasonic imaging.

BACKGROUND OF THE DISCLOSURE

An ultrasonic scanner may be comprised of various types of materials. Normally, the ultrasonic energy used in such a scanner is required to pass through most of these materials. The properties of the various materials through which an ultrasonic wave passes or strikes may have differing properties with regard to dispersion, diffraction, absorption and reflection such that the materials will disperse, diffract, absorb, and reflect the ultrasonic energy in different ways, and these differences may be dependent upon the wavelength of the ultrasonic energy. Use of a single ultrasonic frequency to image a particular object may result in limited information and detail about the object being imaged.

During manufacture of an ultrasonic sensor array, tolerances may build up within the ultrasonic sensor stack that affect the signal path and may create a situation where the data collected does make use of the optimum available signal and response of the system. Furthermore, the data quality may be frequency dependent and the structural makeup of the target may present frequency dependencies.

Normal variations attributable to manufacturing ultrasonic scanning systems may result in one ultrasonic scanning system performing in a manner that is noticeably different from another, even though both scanning systems are manufactured within desired tolerances and according to the same procedures. A result of these differences may mean that one scanner collects information at an optimum frequency, while another scanner does not.

The basic methodology that has been applied in the prior art has been to perform a scan at a single specific frequency which maximizes the signal output as captured by a thin-film transistor (TFT) array positioned within the sensor stack. The single frequency may be primarily determined by the thickness and the material properties of the sensor stack and used to differentiate the fingerprint ridge and valley regions of a finger being imaged. In a manufacturing setting (without fingerprint references), the frequency determination may be made by choosing the frequency at which the sensor array output is maximized between two cases, one with the ultrasonic transmitter excitation voltage on and one with the transmitter off. This methodology may yield image information sets that may not match expected results in terms of fingerprint image definition in a more real-life setting. There might also be the need to tune the operational frequency throughout normal usage, which may lead to inconsistent results.

SUMMARY OF THE DISCLOSURE

One aspect of the invention may be described as a method of scanning a finger. The method may include scanning a finger positioned on an imaging surface of an ultrasonic sensor with a plurality of ultrasonic scan frequencies. The penetration depth for an ultrasound signal into a tissue region may be different for different frequencies and ultimately may result in variations of the reflected signal level when captured by a TFT array. The plurality of scan frequencies may be selected by scanning without a finger present on the imaging surface at a plurality of test frequencies and identifying peak test frequencies. The peak test frequency may be a test frequency at which an immediately lower test frequency and an immediately higher test frequency return less energy than the peak test frequency.

The method may include generating an ultrasonic image information set from a plurality of pixels of the ultrasonic sensor for each of the scan frequencies. The image information set may include a pixel output value from each of the plurality of pixels, each pixel output value indicating an amount of energy reflected from the imaging surface. Each scan frequency may provide an image information set describing a plurality of pixel output signal levels associated with a fingerprint. Each pixel output value may indicate a signal strength that indicates an amount of ultrasonic energy reflected from a surface of a platen on which a finger is provided. As used herein, the term "image" refers to one form of an image information set.

The method may further comprise the step of combining the image information sets corresponding to each of the scan frequencies to generate a combined image information set. The combined image information set may include combined pixel output values from each of the plurality of pixels. Combining the image information sets may include adding pixel output values to produce a sum, dividing the sum by the number of scan frequencies to produce an average value for each of the pixels, and using the average value as the combined value. As used herein, the term "combined" means mathematically combined.

In some embodiments, the method may further include using the plurality of ultrasonic image information sets to make a liveness determination and providing a liveness output signal indicating the liveness determination.

In some embodiments, the method may further include transforming each pixel output value to a gray-scale value and providing the gray-scale values for the plurality of pixels as the combined image information set representing the fingerprint of the finger.

In some embodiments, combining the image information sets includes, for each scan frequency, identifying a weighting factor, multiplying each pixel output value by the corresponding weighting factor to produce a pixel output value product, adding the pixel output value products to produce a sum, dividing the sum by the number of scan frequencies to produce an average value for each of the pixel output values, and using the average value as the combined pixel output value. The weighting factor may be calculated using the following equation:

$$w(f_i) = (e^{(avg_i * f_i)} - e^{(avg_i * f_{max})}) / (e^{(avg_i * f_{min})} - e^{(avg_i * f_{max})})$$

where $w(f_i)$ is the weighting factor for the $i^{th}$ scan frequency, $avg_i$ is the average value of the pixel output values at the $i^{th}$ scan frequency and a next lower scan frequency, $f_{min}$ is a lowest scan frequency; and $f_{max}$ is a highest scan frequency.

In another embodiment, combining the image information sets may include creating a covariance matrix for each of the scan frequencies. The covariance matrix may be created from the pixel output values in the image information sets. The covariance matrices may be combined to provide a combined matrix having a combined value for each pixel output value. In one embodiment, combining the covariance matrices comprises interpolating between entries in the covariance matrices.

In one embodiment, the method may include, for each scan frequency, identifying a weighting factor and multiplying each entry in the covariance matrices by the corresponding weighting factor prior to mathematically combining the covariance matrices. The weighting factor may be calculated using the following equation:

$$w(f_i)=(e^{(avgi*fi)}-e^{(avgi*fmax)})/(e^{(avgi*fmin)}-e^{(avgi*fmax)})$$

where, $w(f_i)$ is the weighting factor for the $i^{th}$ scan frequency, $avg_i$ is the average value of the pixel output values at the $i^{th}$ scan frequency and a next lower scan frequency, $f_{min}$ is a lowest scan frequency, and $f_{max}$ is a highest scan frequency.

The method may further include the step of correlating each combined value for each of the pixels to a gray-scale value. The method may further include the step of providing the gray-scale values as the representation of the finger or fingerprint.

The method may further include the step of scanning, without a finger on the imaging surface of the ultrasonic sensor, at a plurality of ultrasonic test frequencies. The method may further include the step of selecting one or more peak test frequencies. Each selected peak test frequency may have a reflected signal that is higher than a majority of other peak test frequencies. The method may further include the step of using the selected peak test frequencies as the plurality of scan frequencies. Additional scan frequencies may be identified by adding or subtracting a predetermined offset to the selected one of the peak test frequencies. In another embodiment, additional scan frequencies may be selected by identifying a range that includes the selected one of the peak test frequencies and selecting the scan frequencies to be within the identified range. In one embodiment, additional scan frequencies may be selected by identifying harmonics of the selected peak test frequency. In another embodiment, the method may further include assessing image quality of the peak test frequencies and selecting peak test frequencies having an image quality that is better than other peak test frequencies.

One aspect of the present invention may be described as a system for generating automatically co-registered image information sets of a target object. The system may also be described as a system for scanning a finger. The system may comprise an imaging surface configured to receive a finger. The imaging surface may be substantially planar. The system may also comprise plane wave ultrasonic transmitter. The plane wave ultrasonic transmitter may generate one or more ultrasonic plane waves in response to a signal generator. The signal generator may be capable of creating electrical signals of different discrete frequencies within the ultrasonic frequency range.

The system may further include a transmitter driver amplifier. The amplifier may be configured to receive an electrical signal from the signal generator and use the electrical signal to drive the ultrasonic transmitter. The ultrasonic waves may be directed to the imaging surface by the transmitter, and one or more ultrasonic signals may be reflected from the imaging surface to an ultrasonic sensor array, and to which the target object is in contact. The ultrasonic sensor array may be configured to detect the one or more reflected ultrasonic waves. In some implementations, the system may further include a set of band-pass filters for separating the one or more detected ultrasonic waves into their frequency components.

The system may further include an electronic subsystem for forming or generating image information sets of an object for each received signal at each frequency of interest. The electronic subsystem may comprise a processor or logic circuitry. The electronic subsystem may also be configured to combine the image information sets. The image information sets may be heuristically combined or probabilistically combined using a Neyman-Pearson multimodal fusion system to produce an output representation of the target object, such as an image.

One aspect of the present invention may also be described as a non-transitory computer readable medium storing computer executable code. The executable code may comprise instructions to scan a finger positioned on an imaging surface of an ultrasonic sensor with a plurality of ultrasonic scan frequencies. The executable code may further comprise instructions to generate an ultrasonic image information set from a plurality of pixels of the ultrasonic sensor for each of the scan frequencies. The image information set may include a pixel output value from each of the plurality of pixels. Each pixel output value may indicate an amount of energy reflected from the imaging surface. The executable code may further comprise instructions to combine the image information sets corresponding to each of the scan frequencies to generate a combined image information set. The combined image information set may include combined pixel output values from each of the plurality of pixels. The executable code may further comprise instructions to transform each pixel output value to a gray-scale value and provide the gray-scale values for the plurality of pixels as the combined image information set representing the fingerprint of the finger. The executable code may further comprise instructions to use the plurality of ultrasonic image information sets to make a liveness determination and provide a liveness output signal indicating the liveness determination.

One aspect of the present invention may also be described as a system for scanning a finger. The system may comprise a means for generating one or more ultrasonic plane waves ("MFG") in response to a signal generator that is capable of creating electrical signals of different discrete frequencies within the ultrasonic frequency range. The system may further comprise a means for driving the MFG in response to an electrical signal from the signal generator. The system may further comprise a means for contacting the finger and reflecting ultrasonic waves from the MFG as ultrasonic signals to an ultrasonic sensor array means, wherein the ultrasonic sensor array means is configured to receive the reflected ultrasonic signals. The system may further comprise a means for forming an image information set of the finger for each received reflected ultrasonic signal at each frequency of interest and combining the formed image information sets. In one embodiment, the system may further comprise a means for separating the one or more received ultrasonic signals into their frequency components. The means for combining the formed image information sets may be configured to heuristically produce an output image or to probabilistically produce an output image using Neyman-Pearson multimodal fusion.

BRIEF DESCRIPTION OF THE DRAWINGS

For a fuller understanding of the nature and objects of the disclosure, reference should be made to the accompanying drawings and the subsequent description. The disclosure will now be described by way of non-limiting examples, with reference to the attached drawings and diagrams in which:

FIGS. 37A-C depict plots of signals reflected from various portions of the target object in one configuration of a system for multi-spectral ultrasonic imaging;

FIGS. 38A-C depict plots of signals reflected from various portions of the target object in another configuration of a system for multi-spectral ultrasonic imaging;

FIGS. 39A-F depict plots of an integrated receiver output according to various range gates implemented in the system of FIGS. 39A-C;

FIGS. 40A-F depict plots of integrated receiver output according to various range gates implemented in the system of FIGS. 39A-C;

FIGS. 41A-F depict plots of integrated receiver output according to various range gates implemented in the system of FIGS. 41A-C;

FURTHER DESCRIPTION OF THE DISCLOSURE

Figure 1:
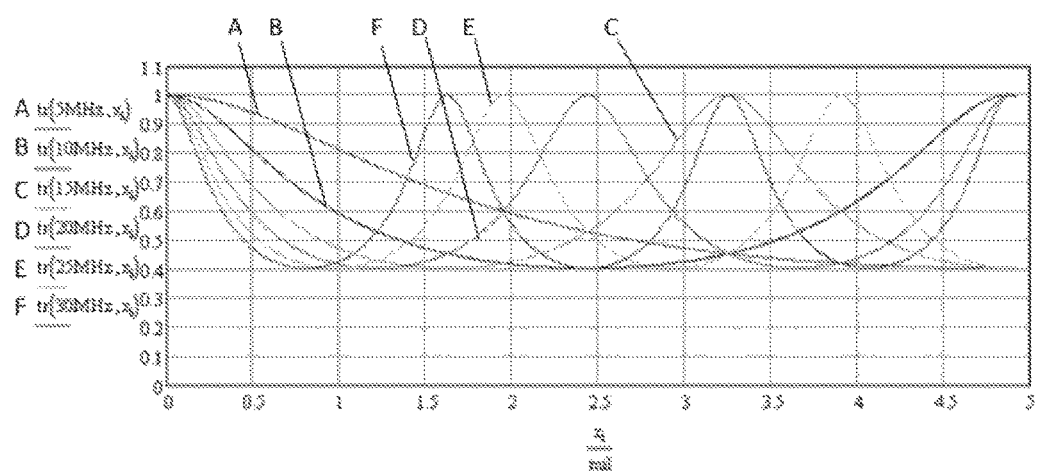
FIG. 1 shows a plot with information corresponding to six different ultrasonic waves traversing through an ultrasonic sensor array, each at a different frequency.

One aspect of the present invention relates generally to an ultrasonic sensor system for providing information about a target object. In some implementations, the information may be obtained from a plurality of excitation signals applied to an ultrasonic transmitter, each at a different frequency. By using a plurality of ultrasonic frequencies, more information may be provided about a target object than may be provided by utilizing a single excitation frequency.

Ultrasonic fingerprint sensors may function by generating and transmitting an ultrasonic wave toward a platen-type imaging surface. On the platen may be a target object about which information is desired. When the target object is a finger, the desired information may be related to a fingerprint. Some of the ultrasonic energy reaching the platen is reflected, and this reflected energy may be detected. The strength of the reflected energy and the location at which it is received can be acquired. The acquired signals may be recorded in the form of a dataset. The dataset may be used to create a data stream that may be used to produce a visual image of the target object, which may be provided via a monitor or printer. In some implementations, the acquired signals may form a dataset also referred to as an ultrasonic image information set, which may be further processed to generate a combined image information set. The combined image information set may be utilized, for example, in the enrollment, verification, and authentication of a user of a mobile device such as a mobile phone, tablet computer, or portable medical device that incorporates the ultrasonic fingerprint sensor.

One aspect of the invention may be embodied in systems and/or methods for multi-spectral ultrasonic imaging to more closely align with a system-specific maximum. For example, ultrasonic sensors produced according to the same design and manufactured from the same production facility may nevertheless have differences which can impact the performance of each sensor.

For example, during the manufacture of an ultrasonic sensor there will be a number of material interfaces and material bulk media which the ultrasound waves traverse. Due to normal variations in manufacturing processes, each sensor may be slightly different in its resonant frequency and in its effects upon the ultrasonic signal passing through it. These resonant differences can show as much as a 50% change over a reasonably small change in frequency. Consequently, the same system that obtains a good output at a transmitter excitation frequency of 20 MHz may show only half of the output with a frequency of 19 MHz or 21 MHz.

The differences between individual sensors can be accommodated by using more than one scanning frequency, and then combining the image information sets that were derived from each scanning frequency. In addition, insonification by multiple frequencies may allow for the collection of data about the target object that gives a better representation of the target object than single monochromatic insonification. Insonification in an ultrasonic system by a multitude of frequencies, either as single sequential signals or as a composite signal with a spectrum of excitation frequencies allows enhanced imaging while allowing looser manufacturing tolerances in the system and therefore more cost effective manufacturing techniques may be employed.

In some implementations, a multi-spectral ultrasonic sensor system produces a plurality of datasets or image information sets corresponding to a target object, each image information set being generated with information obtained at a different ultrasonic frequency. The term multi-spectral refers, generally, to systems that use 2, 3, 4, or more frequencies or wavelengths in constructing image information sets of a target object. Multi-spectral systems may also be referred to as hyper-spectral systems. Generating image information sets may be performed when the ultrasonic receiver is able to detect ultrasonic energy at many different frequencies, and is a fixed distance from the target object. For example, the surface of a platen upon which a user may place a finger may be a fixed distance from the pixel circuits of an underlying ultrasonic sensor array. The desired ultrasonic waves may be produced by driving the ultrasonic transmitter with transmitter excitation signals to produce discrete frequency ultrasonic waves. In some implementations, the transmitter may be driven to produce an ultrasonic waveform that is the summation of the desired frequencies and issued simultaneously as a composition-energy ultrasonic waveform with the plurality of desired frequencies.

Multi-spectral scanning at discrete frequencies may be implemented as a "chirp". A chirp is a signal in which the frequency increases ('up-chirp') or decreases ('down-chirp') with time and may be continuous. In ultrasonics, excitation signals may be formed to exhibit chirp, and in doing so generated waves will interact with the dispersion properties of the materials, increasing or decreasing total dispersion as the ultrasonic signal propagates. Utilizing chirped excitation signals allows the collection of data with more information content.

The use of chirp excitation signals enables a sensor system to insonify and collect information about the target over a broad range of frequencies. The ultrasonic sensor system may acquire the pixel output signals from the sensor pixels in the ultrasonic sensor array, digitize the pixel output signals, and pass the digitized pixel output signals (or values) through a series of filters to extract the needed data. Alternately, a discrete frequency pulse may be used to insonify the target and collect data from the reflected signal, then the transmitter excitation frequency can be changed and the process repeated to obtain data about the target object at a plurality of different frequencies. The process may be accomplished very quickly with the excitation signals being transmitted and the reflected signals being received and processed in very small increments of time. Depending upon the distance from the transmitter to the surface of the platen and back to the ultrasonic sensor array, this process may be accomplished in microseconds (or if larger distances are involved, milliseconds).

An additional advantage in using a chirp-based method when operating an ultrasonic system is to allow more flexibility in manufacturing an ultrasonic transmitter-receiver system. Use of a chirp-based system can accommodate manufacturing differences and allow improved responses from each system.

FIG. 1 shows a plot with information corresponding to six different ultrasonic waves traversing through an ultrasonic sensor array, each at a different frequency. The vertical axis is transmissibility and the horizontal axis is the thickness of a polystyrene layer, which is a typical material used as a platen for ultrasonic sensors. The thickness ($x_i$) of the polystyrene layer corresponding to the various curves of FIG. 1 ranges from nearly zero to nearly 5 thousandths of an inch. The transmissibility (tr) is shown for six ultrasonic frequencies: 5 MHz, 10 MHz, 15 MHz, 20 MHz, 25 MHz and 30 MHz. From FIG. 1 it will be observed that at about 1.7 mils thickness, 30 MHz gives nearly 100% transmissibility, and both 15 MHz and 5 MHz each give approximately 65% transmissibility. Other frequencies at 1.7 mils thickness give less than 50% transmissibility. It should be noted that the peak transmissibility for other ultrasonic frequencies shown in FIG. 1 are approximately:

25 MHz—1.9 mils thickness 15 MHz—3.5 mils thickness
20 MHz—2.4 mils thickness 10 MHz—4.7 mils thickness It will also be observed that the slope of the transmissibility function at 30 MHz is quite steep near the peaks, which occur at about 1.7 mils and 3.5 mils. This indicates that the transmissibility at 30 MHz drops rapidly near the peak transmissibility with small changes in the thickness of the polystyrene layer. With respect to the peak transmissibility for each of 25 MHz, 20 MHz and 15 MHz excitation frequencies, the same is true—the transmissibility drops rapidly with small changes in the thickness of the polystyrene layer. Although FIG. 1 indicates that 5 MHz and 10 MHz have slopes which are less steep, these frequencies have high transmissibility and are therefore useful, yet only in a limited portion of the range of polystyrene thickness depicted on FIG. 1.

An additional advantage to a multiple discrete frequency sensor system or a chirp-based system is the ability to discriminate between objects on the platen that are of interest and those that are not of interest. For example, assume that an ultrasonic multi-spectral system is built into a display of a mobile device. Also assume that the system uses a 22 MHz insonification signal. Rain drops on the display will interfere with the information corresponding to the target object. However, if the frequency is lowered to perhaps 15 MHz, the droplets of rain water, now become invisible with respect to ultrasound, because they do not have the proper resonance. A multi-spectral sensor (i.e., a chirp sensor) would avoid detecting rain drops by offering a plurality of frequency-dependent image information sets. A best one of the information sets may be selected for further use, or a composition of the information sets may be made and used.

Figure 2:
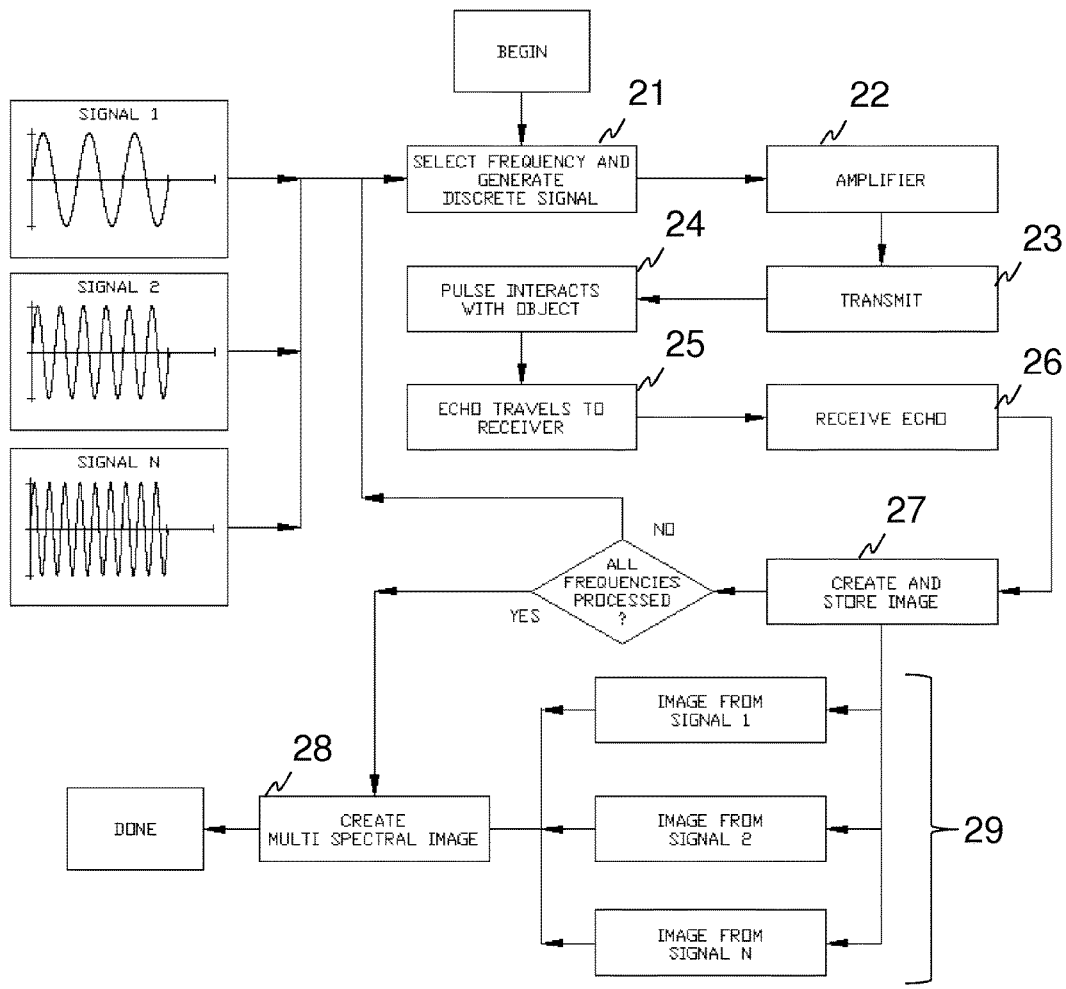
FIG. 2 depicts a method for generating an ultrasonic image information set that is based on sequentially transmitting, processing and repeating the method for several transmitter excitation signals of differing frequency.

FIG. 2 depicts a method for generating an ultrasonic image information set that is based on sequentially transmitting, processing and repeating the method for several transmitter excitation signals of differing frequency. A system utilizing a plurality of discrete frequencies is employed in this case. A first frequency may be generated 21, amplified 22, and used to drive an ultrasonic transmitter that generates 23 plane ultrasonic waves. An ultrasonic signal generated 23 and emitted from the transmitter travels through coupling media (if any) and materials of the ultrasonic sensor stack and interacts 24 with the platen surface that is in contact with the target object. Part of the ultrasonic energy may be reflected 25, for example at those locations where the platen interfaces with air (e.g. a fingerprint valley) and the reflected energy then travels to the ultrasonic sensor array where it is detected 26. An ultrasonic image information set or dataset corresponding to the detected energy is generated and may be stored 27 for later use. That later use may include creating a data stream that causes an image of the target object to be displayed via a monitor or for fingerprint enrollment, verification and authentication. The process is repeated with a second frequency, and a second image information set corresponding to the detected energy is generated and may be stored for later use. This process may be repeated N times so as to create N image information sets 29. The plurality of image information sets may be combined to produce 28 a multi-spectral combined image information set.

Figure 3:
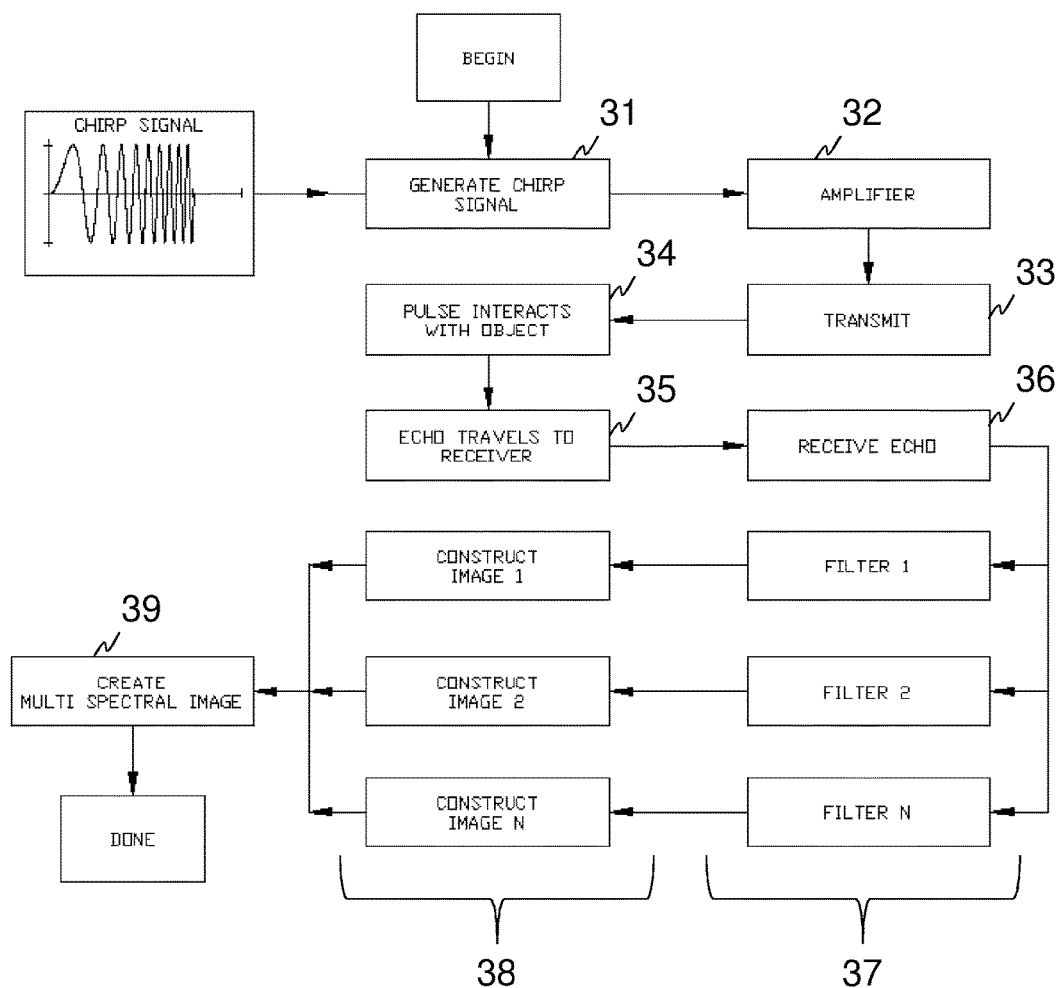
FIG. 3 illustrates a method for creating an ultrasonic image information set that is based on a chirp-type transmitter excitation signal.

Another type of ultrasonic multi-spectral imaging system is described in FIG. 3. FIG. 3 illustrates a method for creating an ultrasonic image information set that is based on a chirp-type transmitter excitation signal. A chirp-type signal is generated 31 (either up-chirp (frequency increasing), or down-chirp (frequency decreasing)) over a range of frequencies suitable for the required resolution of the system. An amplifier 32 may amplify the excitation signal and drive an ultrasonic plane wave generator. An ultrasonic signal, sometimes referred to as a pulse or tone burst (TB), issues 33 from the transmitter, travels through coupling media (if any) and other materials in the sensor stack, and interacts 34 with the platen surface that is in contact with the target object. Part of the ultrasonic energy may be reflected, and the reflected energy then travels 35 to the ultrasonic sensor array where it is detected 36 and converted to an electric signal. The converted electrical signals from the pixels in the ultrasonic sensor array may be sent to band-pass filters 37 that separate the components of the signal according to frequency content. Separation of the components may be achieved using fast Fourier processing in lieu of discrete band-pass filters. The resulting output from the filtering process may be used to construct 38 a plurality of ultrasonic image information sets, each representative of the target object at a different frequency. The plurality of information sets may be combined 39 to produce a multi-spectral image information set.

Figure 4:
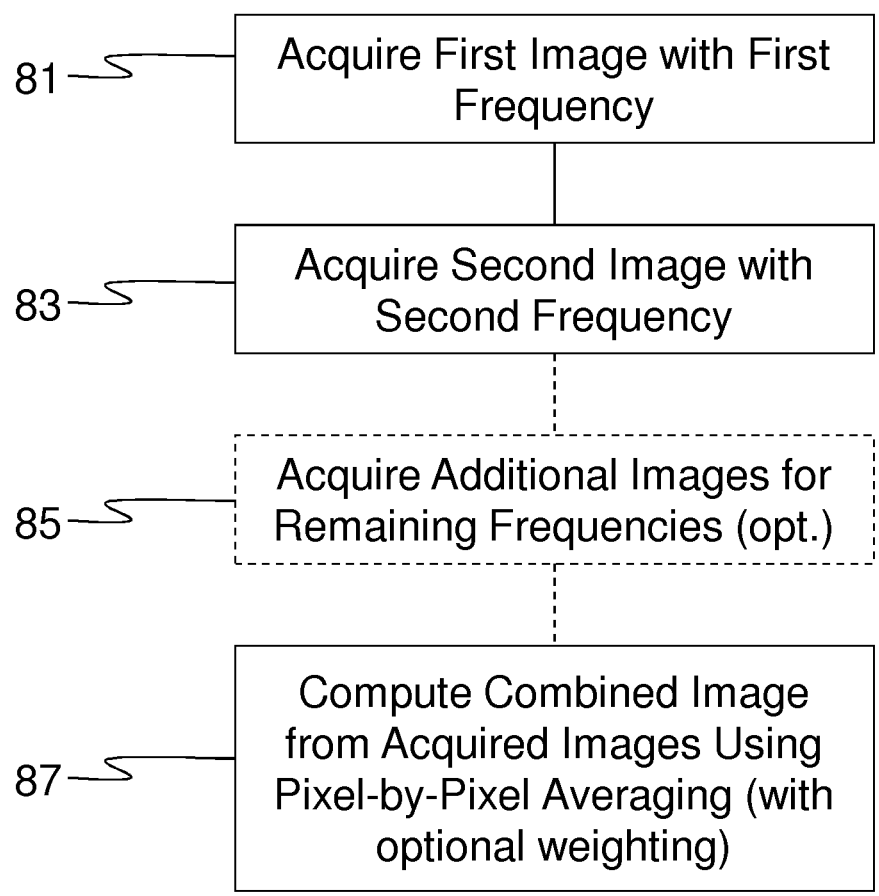
FIG. 4 is a flowchart illustrating a method of multi-spectral ultrasonic imaging utilizing pixel-wise arithmetic averaging with optional weighting.

FIG. 4 is a flowchart illustrating a method of multi-spectral ultrasonic imaging utilizing pixel-wise arithmetic averaging with optional weighting. A fingerprint may be scanned at a plurality of ultrasonic frequencies (the "scan frequencies"). Each scan frequency may provide an image information set describing an object being imaged, such as a fingerprint. The information set may be comprised of scan-value data, and each datum in the information set may indicate a signal strength for a pixel. The signal strength for each pixel indicates the amount of energy reflected to that pixel from a surface of a platen on which the finger is provided. Scanning at a plurality of frequencies produces a plurality of data for each of the pixels. The scan-value data corresponding to each of the scan frequencies may be mathematically combined to produce a combined value for each pixel. The combined value for each pixel may be correlated to a gray-scale value, in order to provide a gray-scale value for each pixel. Those gray scale values may be provided collectively to represent the fingerprint.

Mathematically combining the image information sets for a pixel may include adding the pixel output value for that pixel to produce a sum, and dividing the sum by the number of scan frequencies to produce an average value for each of the pixels. This average value may be used to compute 87 a combined image information set from the acquired image information sets 81, 83, 85 using pixel-by-pixel averaging with optional weighting.

The process of combining discrete co-registered information sets may be performed by heuristic summing, averaging, comparison, or selection of the different information sets. The process of combining information sets may use a probabilistic combining system such as a Neyman-Pearson multimodal fusion system (see, for example, U.S. Pat. No. 7,287,013). The heuristic system may be less computationally complex, but the Neyman-Pearson multimodal fusion system may produce a more accurate output at the cost of additional complexity.

Mathematically combining the scan-value data may include, for each scan frequency, identifying a weighting factor, and multiplying each scan-value datum by the corresponding weighting factor to produce a scan-value product. The scan-value products may be added to produce a sum, and the sum may be divided by the number of scan frequencies to produce an average value for each of the pixels. This average value may be used as the combined value referenced above. The weighting factor may be calculated using the following equation:

$$w(f_i) = (e^{(avgi*fi)} - e^{(avgi*fmax)}) / (e^{(avgi*fmin)} - e^{(avgi*fmax)})$$

where
$w(f_i)$ is the weighting factor for the $i^{th}$ scan frequency;
$avg_i$ is the average value of the scan-value data at the $i^{th}$ scan frequency and a next lower scan frequency;
$f_{min}$ is a lowest scan frequency; and
$f_{max}$ is a highest scan frequency.

Another method of mathematically combining the scan-value data may include creating a covariance matrix for each of the scan frequencies from the scan-value data in the information sets, and mathematically combining the covariance matrices to provide a combined matrix having a combined value for each pixel. To combine the covariance matrices, the corresponding entries in each of the covariance matrices may be interpolated to provide a combined covariance matrix, the entries of which are the interpolated values.

One or more of the covariance matrices may be weighted. If weighting of a particular scan frequency is desired, a weighting factor for the corresponding covariance matrix may be identified, and each entry in the corresponding covariance matrix may be multiplied by that weighting factor prior to mathematically combining the covariance matrices. The weighting factor may be calculated using the following equation:

$$w(f_i) = (e^{(avg_i * f_i)} - e^{(avg_i * f_{max})}) / (e^{(avg_i * f_{min})} - e^{(avg_i * f_{max})})$$

where $w(f_i)$ is the weighting factor for the $i^{th}$ scan frequency;

$avg_i$ is the average value of the scan-value data at the $i^{th}$ scan frequency and a next lower scan frequency;

$f_{min}$ is a lowest scan frequency; and $f_{max}$ is a highest scan frequency.

The scan frequencies may be selected by scanning without a finger present at a plurality of test frequencies, and identifying peak test frequencies. A peak test frequency is a test frequency at which an immediately lower test frequency and an immediately higher test frequency return less energy than the peak test frequency. Having identified a number of peak test frequencies, those peak test frequencies that will be used for evaluating the fingerprint may be selected. Those that are selected may have a return energy that is higher than a majority of other peak test frequencies. That is to say that if the information sets of three (or some other number) peak frequencies will be used to evaluate the fingerprint, then three (or some other number) of the peak test frequencies may be selected as the scan frequencies. In some implementations, the range of scan frequencies may vary from less than 8 MHz to over 12 MHz. In some implementations, the range of scan frequencies may vary from less than 5 MHz to over 25 MHz. In some implementations, the range of scan frequencies may range from less than 1 MHz to over 100 MHz. Other ranges are also possible. The number of scan frequencies within a selected range may vary from as few as two to fifty or more. The separation between the scan frequencies may also vary, as described in more detail below. Hyper-spectral ultrasonic imaging includes imaging at multiple frequencies typically in larger numbers of scans over different frequencies or wavelengths. Hyper-spectral ultrasonic imaging is considered to be an extension of multi-spectral imaging.

Alternatively, the scan frequencies may be selected based on information set quality. For example, for each of the peak test frequencies, the information set quality may be assessed, and those peak test frequencies having the best information set quality may be selected. For example, if three (or some other number) of the peak test frequencies are to be selected as the scan frequencies, then the three (or some other number) peak test frequencies having a quality that is better than other peak test frequencies may be selected and used as the scan frequencies. The quality of an image information set at a particular frequency may be evaluated in various manners. For example, the quality for an information set may be determined by evaluating the image contrast ratio between ridges and valleys of a fingerprint image. Information sets with higher quality may have a higher contrast ratio. Another quality measure may be related to fuzziness, that is, images with sharp delineations between ridges and valleys may have a higher quality than images with blurred edges. Quality of an image information set may be determined on the entire image or on selected regions within the image. For example, image quality may be assessed within an outline of a finger, avoiding regions where there is no finger. Information set quality may be impacted by the object being imaged. For example, diffraction effects may occur with certain ridge-to-ridge separation distances that may be related to a person's age, finger size, or patterns of whorls and ridges within a finger. The diffraction effects may change with scan frequency. Use of multiple scan frequencies in multi-spectral ultrasonic imaging may mitigate some of the effects of diffraction, for example, by selective combining of image information sets generated at different frequencies.

In some implementations, it may be beneficial to select an initial scan frequency (for example, the peak test frequency with the highest average amplitude or the best quality) as one of the scan frequencies, and then selecting additional scan frequencies by adding and/or subtracting a predetermined offset to or from the initially selected scan frequency. For example, if the initially selected scan frequency has a frequency of X and the predetermined offset is Y, then a second one of the scan frequencies may be X+Y and a third one of the scan frequencies may be X−Y.

Alternatively, an initial scan frequency may be selected by, for example, selecting the peak test frequency with the highest average value or the best quality, and then identifying a range that includes the initially selected scan frequency. Additional scan frequencies may be selected from frequencies that are within the range that includes the peak test frequency. In some implementations, additional scan frequencies may be identified to be those frequencies that are harmonics of the initially selected scan frequency, such as integer multiples of the selected scan frequency.

In some embodiments, once a plurality of information sets have been created, the information sets may also be used to determine whether the fingerprint was provided by a live being. In a method for determining liveness, the normalized multiple-frequency response of each fingerprint pixel may be formed as a vector. A first one of the information sets (the "FoIS") may be selected, pixels in the FoIS corresponding to ridges (the "ridge pixels") may be identified, and pixels in the FoIS corresponding to valleys (the "valley pixels") may be identified. Vectors may be clustered together to form a valley-pixel cluster. For each of the other information sets, a signal-strength histogram-distribution information ("SSHDI") may be computed for the ridge pixels, and SSHDI may be computed for the valley pixels. A feature-value of the ridge-pixel SSHDI may be identified, and a feature value of the valley-pixel SSHDI may be identified. In some embodiments, a feature-value of the ridge-pixel frequency-response strength histogram distribution information (FSHDI) may be identified, and a feature value of the valley-pixel FSHDI may be identified. The feature value mentioned above may be (a) a signal strength that most commonly appears in the FSHDI or SSHDI, (b) a median signal strength appearing in the FSHDI or SSHDI, (c) a statistical energy of the FSHDI or SSHDI, (d) a statistical entropy of the FSHDI or SSHDI, or (e) a statistical variance of the FSHDI or SSHDI.

For each of those other information sets, a difference between the ridge-pixel feature value and the valley-pixel feature value may be determined in order to obtain a separation value. Then a determination may be made regarding whether any of the separation values identify a spatial location previously identified as corresponding to a live being.

Figure 42:
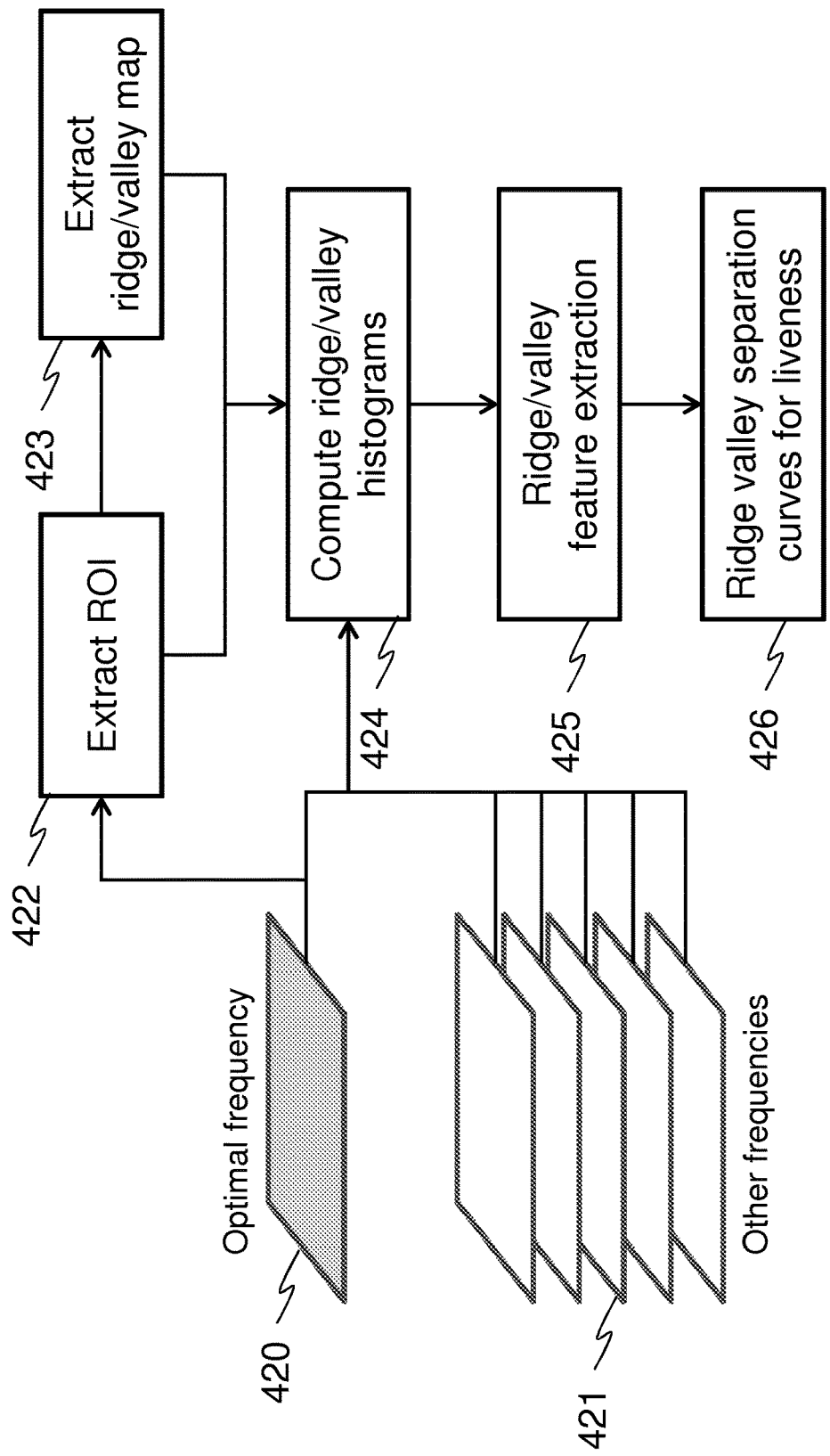
FIG. 42 is a flowchart of a liveness detection method.

FIG. 42 shows one example of liveness detection with multi-spectral/hyper-spectral imaging is multi-frequency ridge-valley separation. In some embodiments, the target object being scanned (e.g., a finger) may not move during the process. In one embodiment of multi-frequency ridge-valley separation, a ridge-valley separation is computed. A fingerprint image is captured at an optimal frequency 420 (selected from scans at other frequencies 421) for extracting 422 fingerprint regions of interest (ROI). ROIs are extracted 422, and binarization may be performed on one or more extracted ROIs. Binarization of the ROI may extract 423 ridge and valley maps. The ROIs and ridge-valley maps extracted 423 at the optimal frequency 420 may be applied to scans of all other frequencies 421. For the scan at each frequency 421, a histogram of the ridge and valley pixels may be separately computed 424. Features may be extracted 425 from the ridge and valley histograms, such as the bin value of the peak of the ridge-valley histogram, the median of the ridge-valley pixels, or the energy, entropy, or variance of the ridge-valley histogram. The valley-feature value may be subtracted from the ridge-feature value to obtain a ridge-valley separation at a given frequency. For example, peak bin values may be used as the extracted feature from the histogram, and the ridge-valley separation curves 426 may be shown over multiple frequencies (see, generally, FIGS. 33-36). Different materials have different acoustic impedances and hence result in different ridge-valley separation curves 426. Therefore, the ridge-valley separation curves 426 may be used to determine liveness of the target object.

Figure 5:
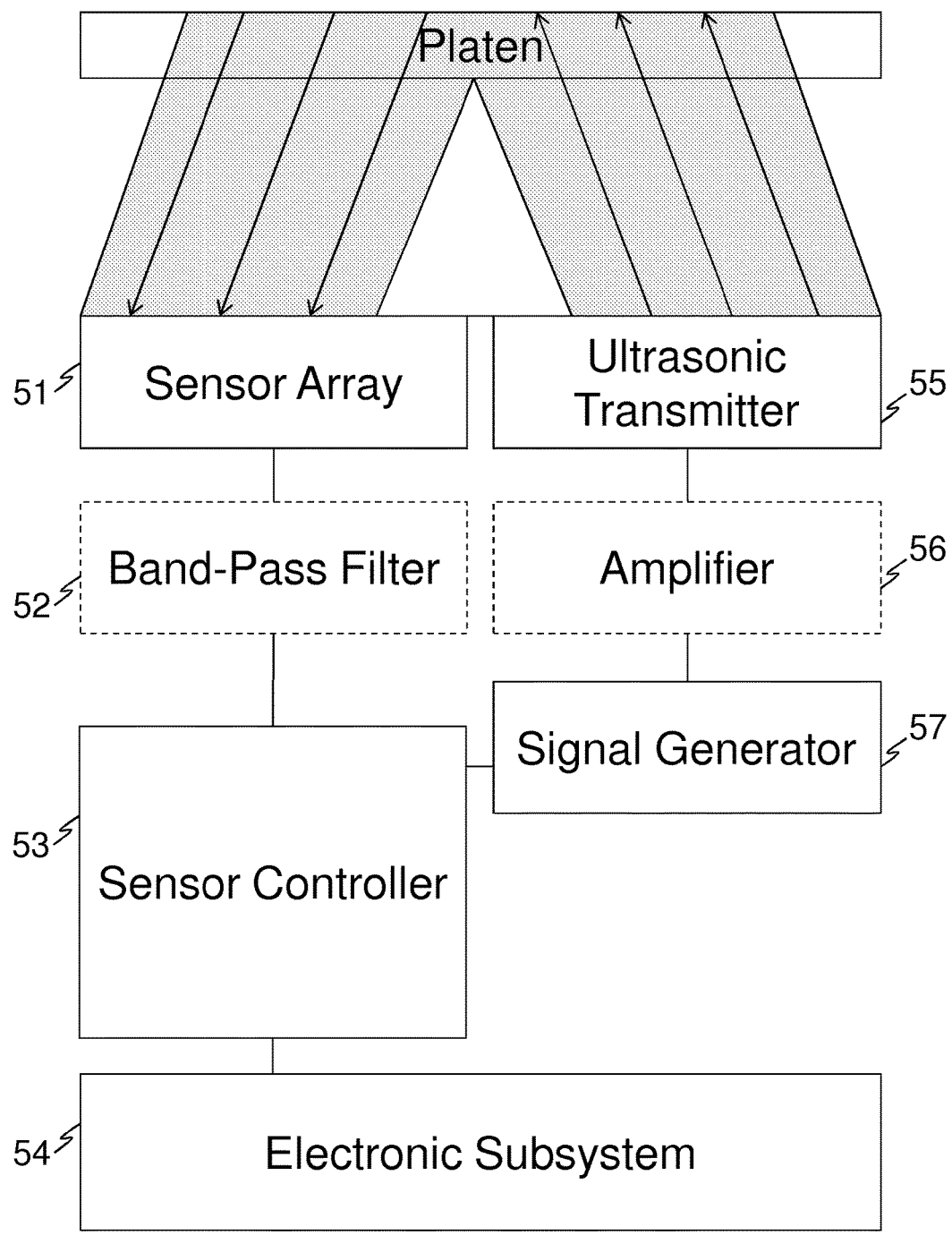
FIG. 5 illustrates a block diagram depicting an ultrasonic sensor system for generating ultrasonic image information sets corresponding to a target object.

FIG. 5 illustrates a block diagram depicting an ultrasonic sensor system for generating ultrasonic image information sets corresponding to a target object. The sensor system may comprise an ultrasonic transmitter 55 for generating ultrasonic waves. The system may further comprise a signal generator 57 capable of creating electrical transmitter excitation signals to cause the transmitter 55 to provide a plurality of waves at desired frequencies. The system may further comprise an amplifier 56 for amplifying the electrical signals from the signal generator 57 and for driving the ultrasonic transmitter 55. The system may further comprise an ultrasonic sensor array 51 capable of detecting reflected ultrasonic energy and providing pixel output signals corresponding to the detected energy. The system may further comprise a sensor controller 53 for controlling the ultrasonic sensor array 51 and for receiving the pixel output signals from the sensor array 51. The system may further comprise an electronic subsystem 54 (e.g., an applications processor) for forming image information sets, each image information set corresponding to a different frequency, and then combining the image information sets into a combined image information set. The system may further comprise band-pass filters 52 for separating the received signals into their frequency components.

Exemplary Embodiments

Figure 6:
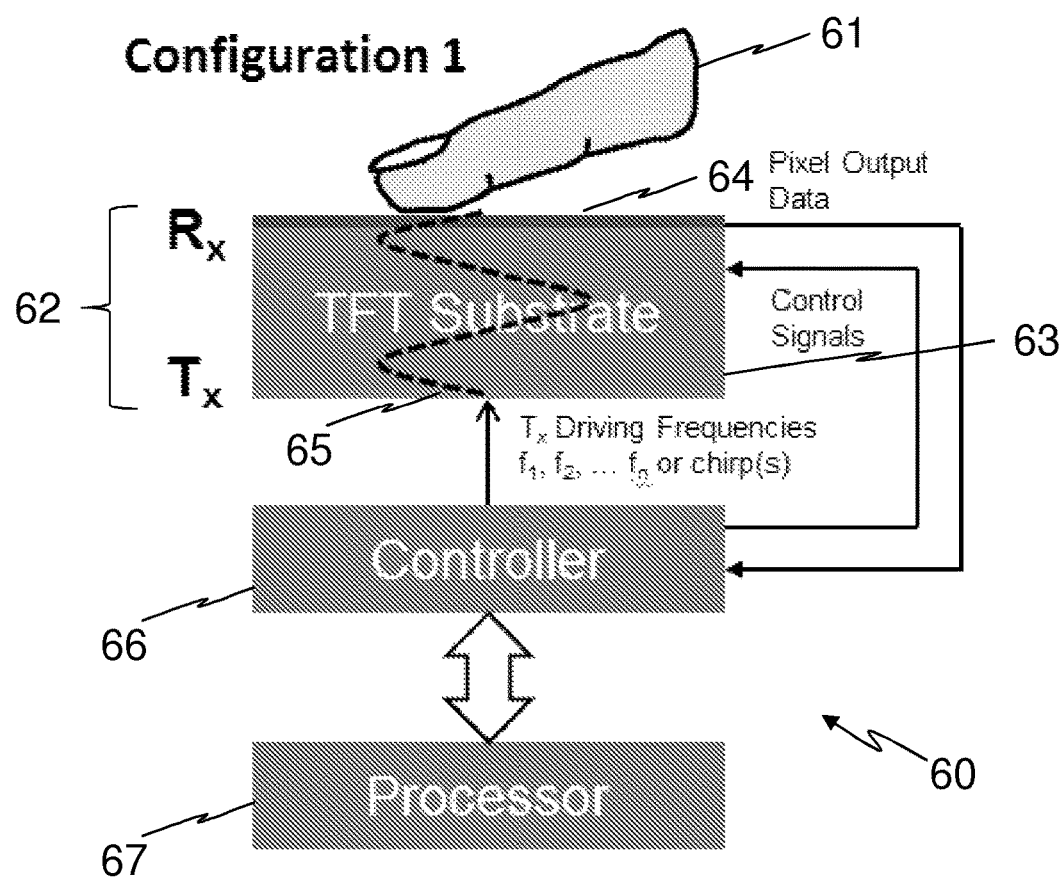
FIG. 6 is a diagram showing a first configuration of a system for generating ultrasonic image information sets of an object in contact with an outer surface of an ultrasonic sensor array.

FIG. 6 is a diagram showing a configuration of a system 60 for generating ultrasonic image information sets of an object 61 in contact with an outer surface of an ultrasonic sensor array 62. In this configuration, a sensor stack 62 has a TFT substrate 63 sandwiched by an ultrasonic transmitter (Tx 65, on the bottom) and receiver (Rx 64, on the top). The TFT substrate 63 has TFT circuitry including pixel circuits disposed on the upper surface and a piezoelectric layer disposed on the pixel circuits. The transmitter 65 may include a piezoelectric layer with one or more electrodes disposed on each side of the piezoelectric layer. The top surface (not shown) may be coated with a protective film (i.e. parylene, acrylic, a hardcoat, a diamond-like coating (DLC), an impedance matching layer or other suitable coating) that may serve as a platen. A controller 66 may provide transmitter excitation signals to the electrodes associated with the ultrasonic transmitter 63. The controller 66 may send various control signals to the TFT pixel circuitry for controlling the acquisition of reflected ultrasonic signals from the upper surface of the sensor array 62 and for extracting the pixel output signals from the sensor pixels. The sensor array 62 and controller 66 may be in communication with one or more processors 67 such as an application processor in a mobile device that may serve to process the pixel output signals from the sensor array 62. Alternatively, the TFT substrate including the thin-film transistors and associated circuitry formed thereon as described throughout this disclosure may be replaced by a silicon-based ultrasonic sensor array such as a CMOS sensor array with transistors and associated circuitry formed in and on a silicon substrate rather than on a glass or plastic TFT substrate.

Figure 7:
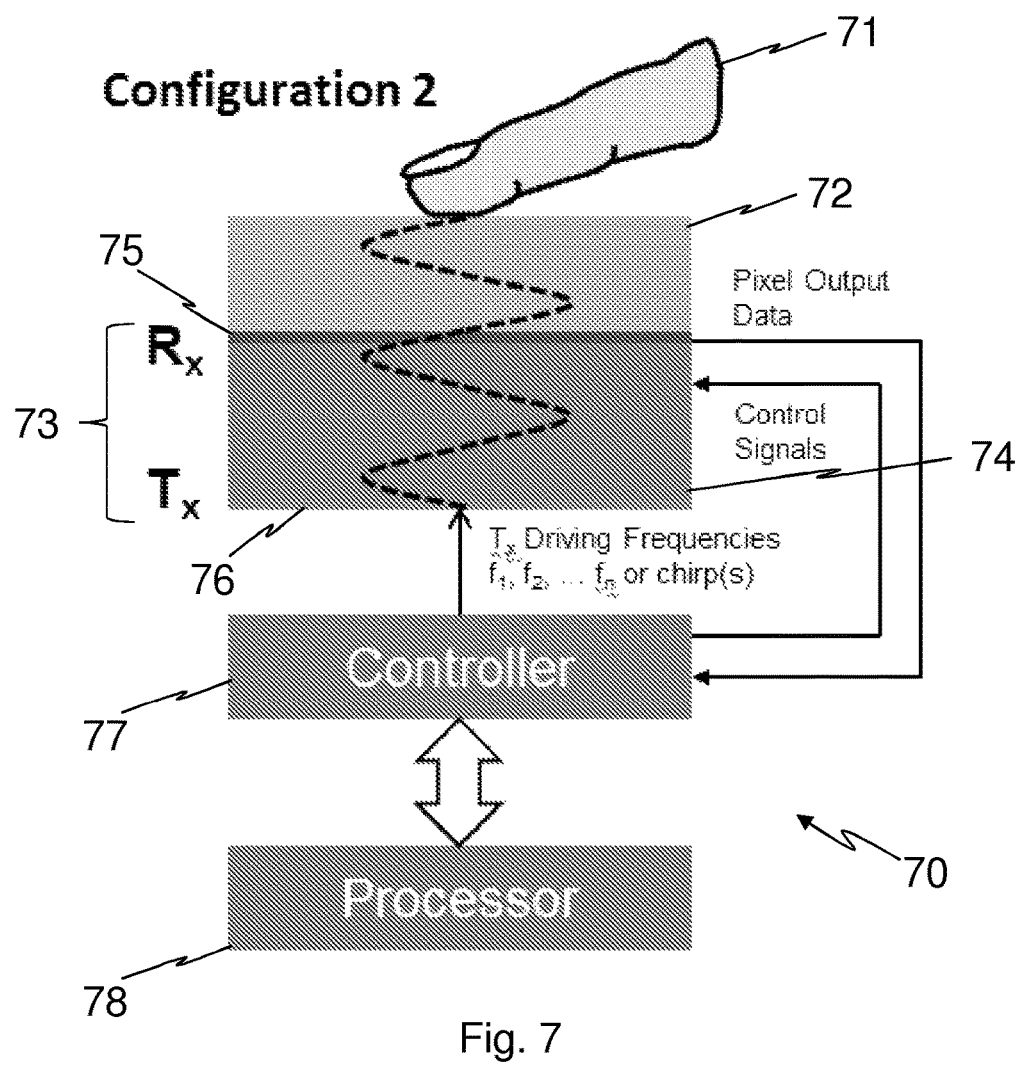
FIG. 7 depicts a diagram showing a second configuration of a system for generating ultrasonic image information sets of an object in contact with an outer surfaced of a platen positioned on an ultrasonic sensor array.

FIG. 7 depicts a diagram showing another configuration of a system 70 for generating ultrasonic image information sets of an object 71 in contact with an outer surface of a platen 72 positioned on an ultrasonic sensor array 73. In this configuration, the sensor array 73 has a TFT substrate 74 sandwiched by an ultrasonic transmitter (Tx 76, on the bottom) and receiver (Rx 75, on the top) with a cover material on the top surface (i.e. glass or plastic), which may serve as a cover glass or a platen 72. In some implementations, the platen 72 may include a layer of polycarbonate (PC), polyethylene terephthalate (PET), polyethylene naphthalate (PEN), polyimide (PI) or other polymer material. In some implementations, the platen 72 layer may be made of sapphire, alkali-aluminosilicate sheet glass, aluminum, stainless steel, a metal alloy, polycarbonate, a polymeric material, a metal-filled plastic or other suitable platen material. In some implementations, the platen 72 may include one or more coatings or an acoustic impedance matching layer on one or both sides of the platen 72. A controller 77 may provide transmitter excitation signals to the electrodes associated with the ultrasonic transmitter 76. The controller 77 may send various control signals to the TFT pixel circuitry for controlling the acquisition of reflected ultrasonic signals from the upper surface of the sensor array 73 and for extracting the pixel output signals from the sensor pixels. The sensor array 73 and controller 77 may be in communication with one or more processors 78 such as an application processor in a mobile device that may serve to process the pixel output signals from the sensor array 73.

In both the first (FIG. 6) and second configurations (FIG. 7), the controller 66, 77 may generate signals with different frequencies or chirp sequences for exciting the transmitter 65, 76 and capturing pixel output data. Optionally, a processor 67, 78 may be provided for further processing. In some implementations, the processor 67, 78 may instruct the controller 66, 77 for exciting the transmitter 65, 76. In some implementations, the processor 67, 78 may be provided on a mobile platform such as a mobile phone, tablet computer, laptop computer, or portable medical device. In some implementations, one or more processors 67, 78 in the mobile device such as an applications processor may serve to process the data and image information sets from the sensor array 62, 73 and provide outputs for other functions such as unlocking a phone or authenticating a user.

For example, it is contemplated that the teachings herein may be implemented in or associated with a variety of electronic devices such as, but not limited to, mobile devices, display devices, telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, medical devices, wearable electronic devices, mobile health devices, wrist watches, clocks, calculators, television monitors, flat panel displays, electronic reading devices (e.g., e-readers), computer monitors, automobile displays (e.g., odometer displays, etc.), cockpit controls and/or displays, camera view displays (e.g., display of a rear view camera in a vehicle), or automatic teller machines.

Figure 8A:
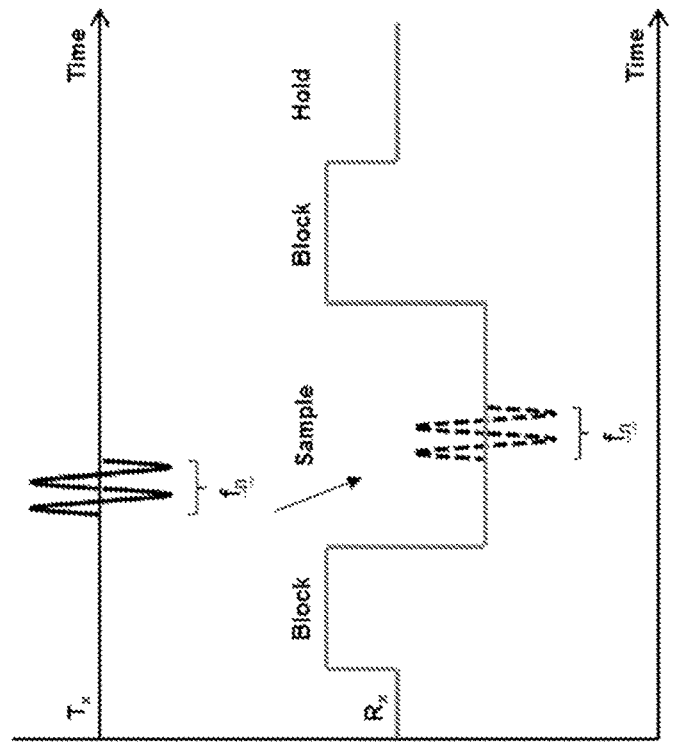
FIGS. 8A and 8B depict transmitter and receiver signals for a set of two or more excitation frequencies applied sequentially to a transmitter with an image information set acquired for each applied frequency.
Figure 8B:
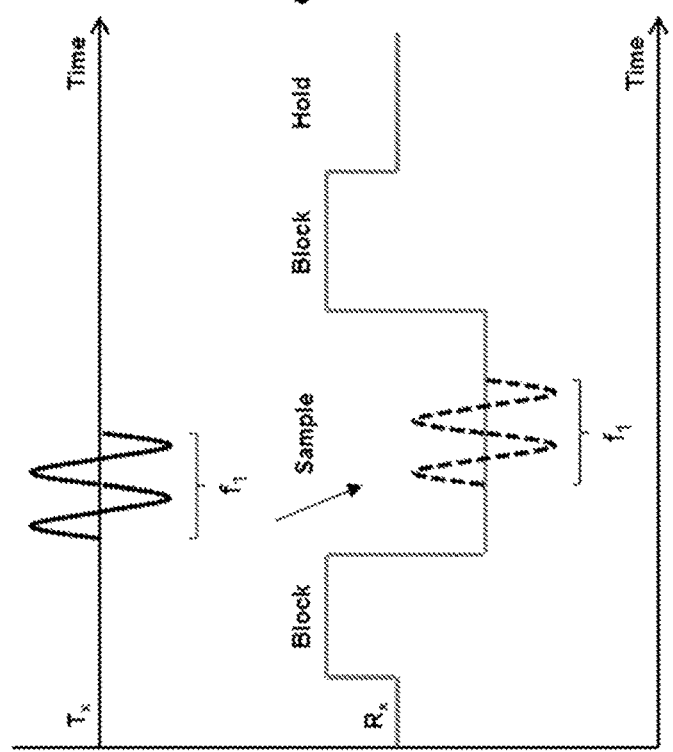

FIGS. 8A and 8B illustrate methods of operation for multi-spectral ultrasonic imaging. FIGS. 8A and 8B depict transmitter and receiver signals for a set of two or more excitation frequencies applied sequentially to a transmitter with an image information set acquired for each applied frequency. A set of two or more excitation frequencies may be applied sequentially to the transmitter ($f_1$ in FIG. 8A and $f_n$ in FIG. 8B) with an information set acquired for each applied scan frequency. One or more cycles of the excitation signal at a predetermined scan frequency may be applied to the transmitter (Tx), as shown in the top portion of each figure. Two cycles are shown here. During the transmission of the outgoing ultrasonic wave, a control signal to the receiver bias electrode may be set to a block mode. The reflected ultrasonic signals may be captured during a sample mode, when the control signal to the receiver bias electrode is brought to a sample value. To prevent detection of unwanted internal reflections, the receiver bias electrode may be brought back to a block mode for a short period of time. During a hold mode, the signals stored in each sensor pixel of the ultrasonic sensor array may be clocked out. An ultrasonic image information set may be obtained with a first applied excitation frequency as shown in FIG. 8A, and a second ultrasonic image information set may be obtained with a second (higher) applied excitation frequency as shown in FIG. 8B.

Figure 9A:
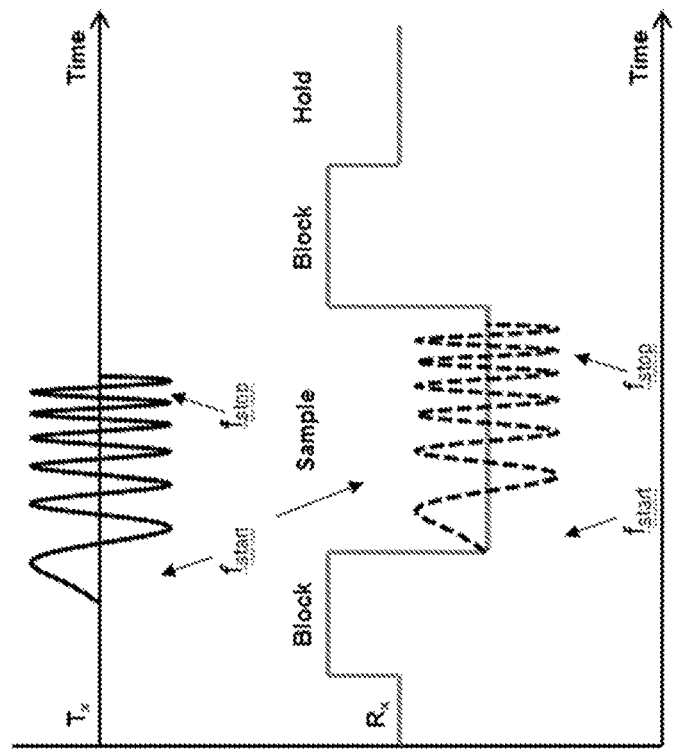
FIG. 9A depicts transmitter and receiver signals for a set of two or more excitation frequencies applied sequentially to a transmitter with an image information set acquired for the set of excitation frequencies.
Figure 9B:
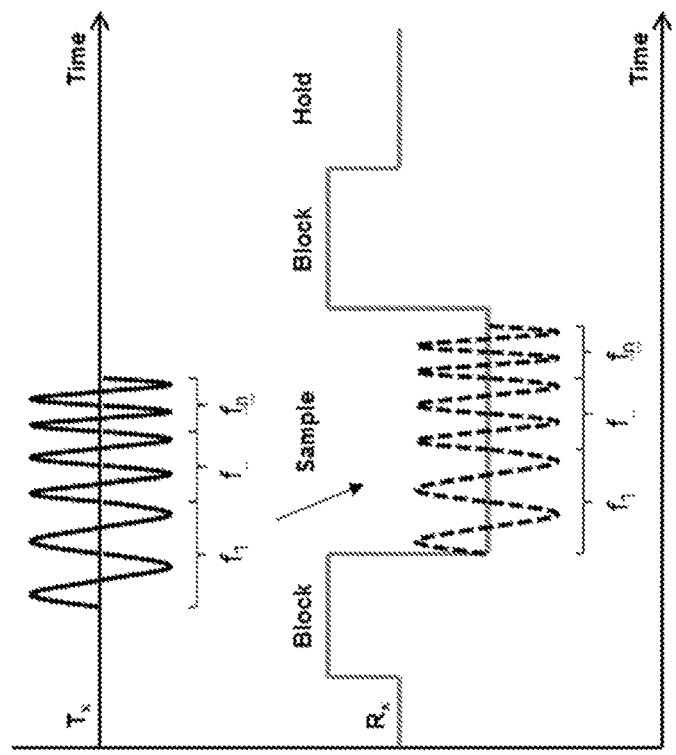
FIG. 9B depicts transmitter and receiver signals for a chirp transmitter excitation sequence (up-chirp or down-chirp) starting at a first frequency and ending at a second frequency.

Another such method is shown in FIG. 9A wherein transmitter and receiver signals for a set of two or more excitation frequencies are applied sequentially to the transmitter. FIG. 9A depicts transmitter and receiver signals for a set of two or more excitation frequencies applied sequentially to a transmitter with an image information set acquired for the set of excitation frequencies. In this method, a peak detector formed as part of the pixel circuitry may be used to acquire the peak signal amplitude during the sample mode as the reflected ultrasonic signals from the various scan frequencies are detected within a single sample window. FIG. 9B depicts transmitter and receiver signals for a chirp transmitter excitation sequence (up-chirp or down-chirp) starting at a first frequency and ending at a second frequency (up-chirp sequence is shown). In this method, the peak detector formed as part of the pixel circuitry may be used to acquire the peak signal amplitude during the sample mode as the reflected ultrasonic signals from the chirped excitation signal applied to the ultrasonic transmitter are detected within a single sample window.

One example of the present invention may utilize combination methods using discrete frequencies. FIG. 4 is a flowchart illustrating one such method utilizing pixel-wise arithmetic averaging with optional weighting. This method involves computing 87 a combined value for each pixel from acquired 81, 83, 85 information sets, each derived from a different frequency, using pixel-by-pixel averaging. Using this method, ultrasonic information sets having respective frequency components are acquired in blocks 81, 83 and 85 with an ultrasonic sensor array. For each of these acquired information sets, the pixel output signals or values may be digitized at each image pixel with coordinates (x, y) where x is the horizontal dimension and y is the vertical dimension of the sensor array. The digitized values of pixels at each location (x, y) may be summed across all the selected information sets. Based on the frequency component, these pixel values may be multiplied by pre-assigned weights. This sum of the pixels at each x, y location for all selected information sets may be divided by the number of information sets acquired. The operation may be repeated for some or all of the pixel locations. The resultant data may be referred to as a combined representation or as a combined image information set.

Figure 10:
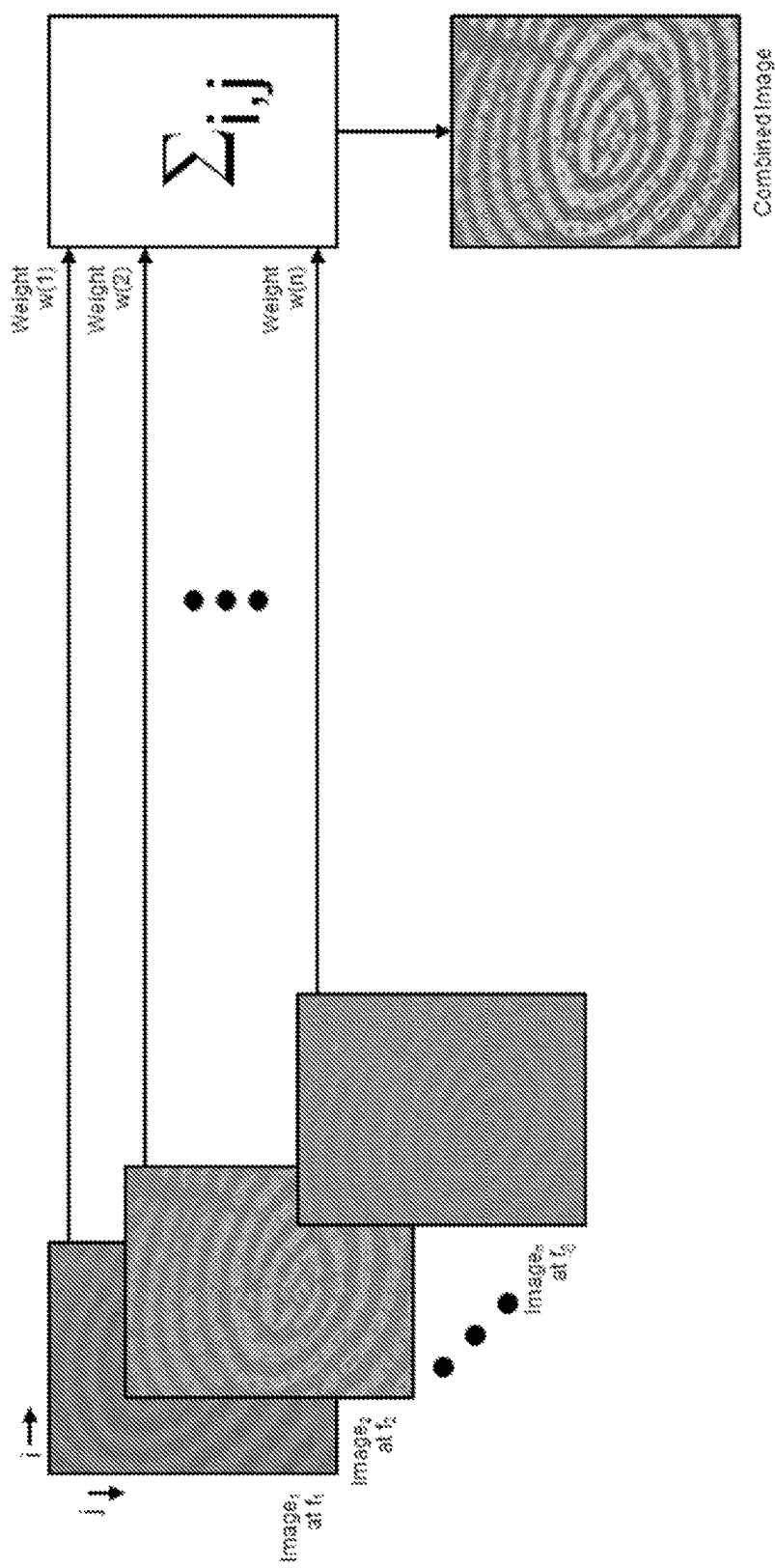
FIG. 10 depicts point-wise arithmetic averaging of two or more sets of ultrasonic image information.

FIG. 10 depicts point-wise arithmetic averaging of two or more sets of ultrasonic image information. In FIG. 10, the magnitude for each pixel of a plurality of selected pixels from information sets at different frequencies are added together and optionally normalized to form a combined representation or image information set. Using point-wise arithmetic averaging with weighted averaging, the magnitude from information sets at different frequencies for the same pixel may be multiplied by their respective frequency-dependent weight, added together, and optionally normalized to form a combined representation or image information set.

Figure 11:
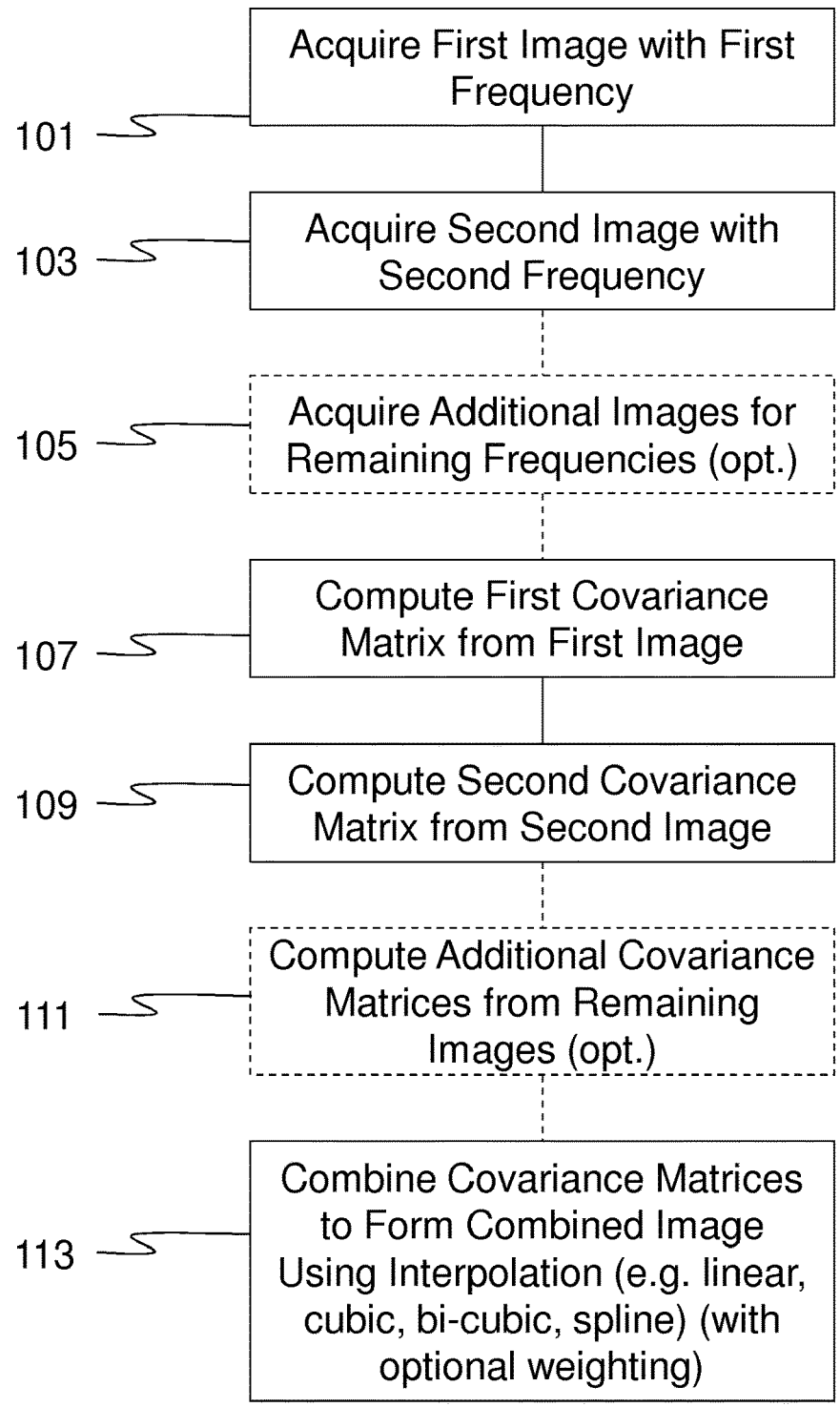
FIG. 11 is a flow chart illustrating a method for creating a combined image information set using two or more covariance matrices.

One example of the present invention may utilize covariance-based interpolation with optional weighting. FIG. 11 is a flow chart illustrating a method for generating a combined image information set using two or more covariance matrices. In such a method, a first received image may be acquired 101 with a first scan frequency. A second received image at a second scan frequency different from the first may be acquired 103. Additional images for other scan frequencies may also be acquired 105. Using image pixels at coordinates (x, y) where x is the horizontal dimension and y is the vertical dimension of the image, a first image covariance matrix with a horizontal and vertical size corresponding to the acquired image may be calculated 107. A second covariance matrix may be calculated 109 from the second image. Additional covariance matrices may be calculated 111 from additional acquired images. Covariance matrices may be generated from images acquired at different frequencies, and those matrices may be combined 113 using interpolation (e.g. linear, cubic, bi-cubic or spline) and optionally normalized to form a combined representation.

Figure 12:
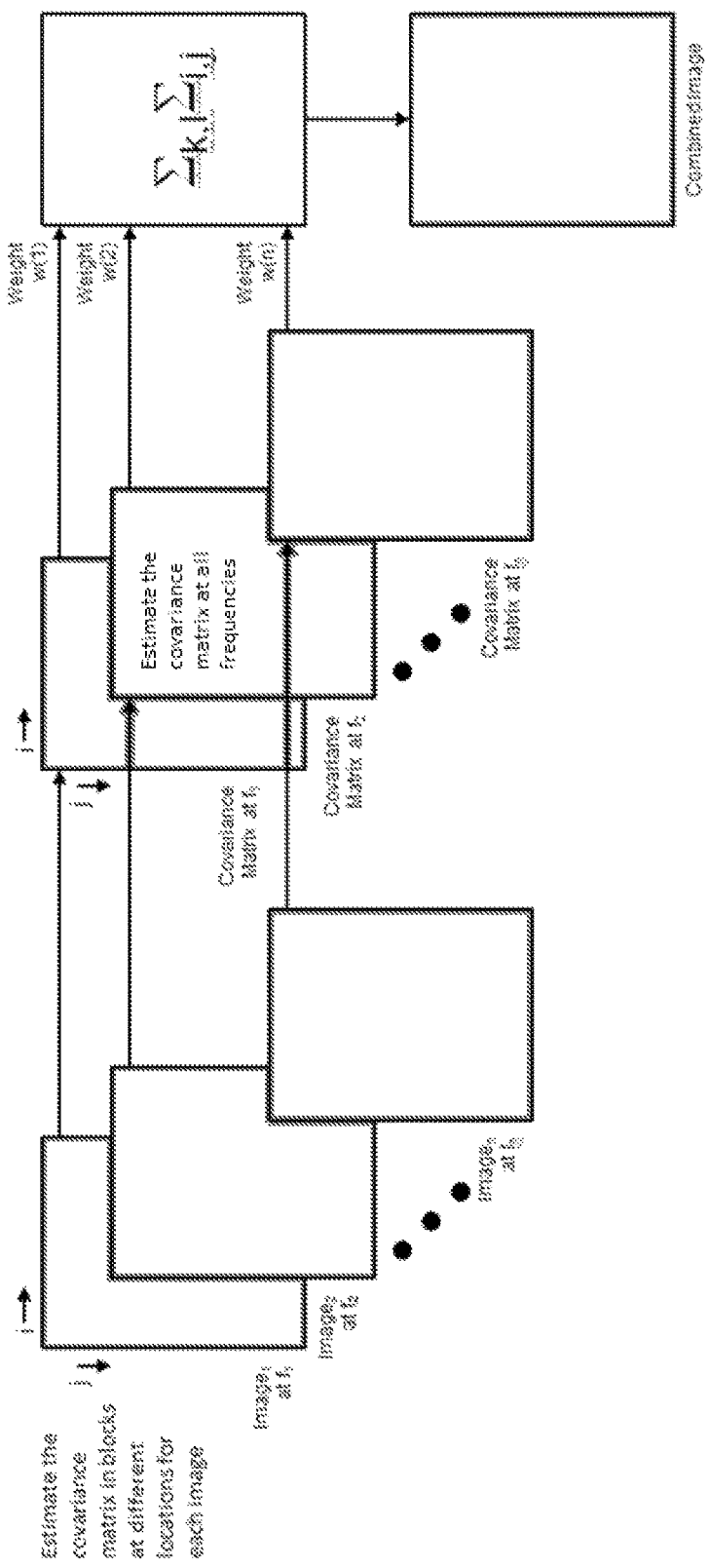
FIG. 12 depicts a method for creating a combined image information set using covariance-based interpolation.

FIG. 12 depicts a method for generating a combined image information set using covariance-based interpolation. Covariance matrices of each acquired image at their respective excitation frequencies may be combined using interpolation (e.g. linear, cubic, bi-cubic, or spline) with optional weighting. Each covariance matrix element at each coordinate (x, y) may be interpolated using the respective elements at the same location across all the acquired information sets. These respective element values may be multiplied by assigned weights based on the excitation frequency. The multiplication 139 operation may be repeated for some or all pixel locations to form a combined (resultant) image. Blocks of information set data a, can be represented as $a^i = F * a^o + n$ where F is a known N×N matrix, $a^o$ is an N×1 vector of pixel values to be estimated that represents a block (e.g. row or column) of an original information set, and n is an N×1 noise vector that may have a zero mean. A block of estimated information set data may be computed as $a^e = (F^T C^{-1} F)^{-1} F^T C^{-1} a^i$. The covariance matrix C for the block of initial image data $a^o$ may be expressed as $$C = \begin{matrix} C_{f1}C_{f1} & C_{f1}C_{f2} & \ldots & C_{f1}C_{fn} \\ C_{f2}C_{f1} & C_{f2}C_{f2} & \ldots & C_{f2}C_{fn} \\ \vdots & \vdots & \vdots & \vdots \\ C_{fn}C_{f1} & C_{fn}C_{f2} & \ldots & C_{fn}C_{fn} \end{matrix}$$

After estimating the statistics of blocks in the original information set, interpolation may be used to estimate statistics centered around each pixel in the information set. After calculating the statistics around each pixel, an estimated image data for that pixel may be computed. For example, each combined value may be correlated 140 to a gray-scale value. Estimated image data may be obtained by combining the results from each block of estimated image data. A combined representation may be obtained by combining results of the estimated image data from each set of initial image data (e.g. from various excitation frequencies). For example, the gray-scale values may be provided 141 as a representation of the fingerprint.

Some implementations may utilize methods for generating weights based on transmit frequencies. Frequencies used for ultrasonic transmission generally have an attenuation in materials used in the sensor stack that varies exponentially. One approach to generating weights for multi-frequency ultrasonic imaging is to relate the various frequencies with an exponentially derived weighting factor. For n number of information sets generated using various excitation frequencies there can be n−1 consecutive weights. The information sets may be arranged in descending order of their excitation frequency, and the image with the highest frequency weighted with the first weight (e.g. one), the information set for the second highest frequency weighted with the second exponentially derived weight, and so on.

Spatial registration may be used to obtain the combined representation (i.e., combined image information set) from the image information sets obtained using various excitation frequencies. It may involve re-alignment of the features from each image using techniques such as block-wise warping. Alternatively, spatial registration may be obtained using motion-correction techniques. Methods such as normalized cross-correlation, mean square error, sum of absolute differences, or mutual information may be used to combine two or more images from different excitation frequencies. Resizing, rotation, nearest neighbor, linear, cubic, or spline techniques may be used to combine two or more image information sets to obtain the combined image information set. Other methods to obtain the combined information set may include edge detection or gradient-based methods.

Based on the frequency response of the ultrasound sensor array (which is dependent in part on the components and arrangement of the sensor stack during an evaluation, provisioning or calibration procedure), the frequencies for multi-spectral ultrasonic imaging may be selected. Two or more frequencies may be used. In some implementations, the system may be calibrated or self-calibrated to determine the preferred set of frequencies for imaging.

Figure 13:
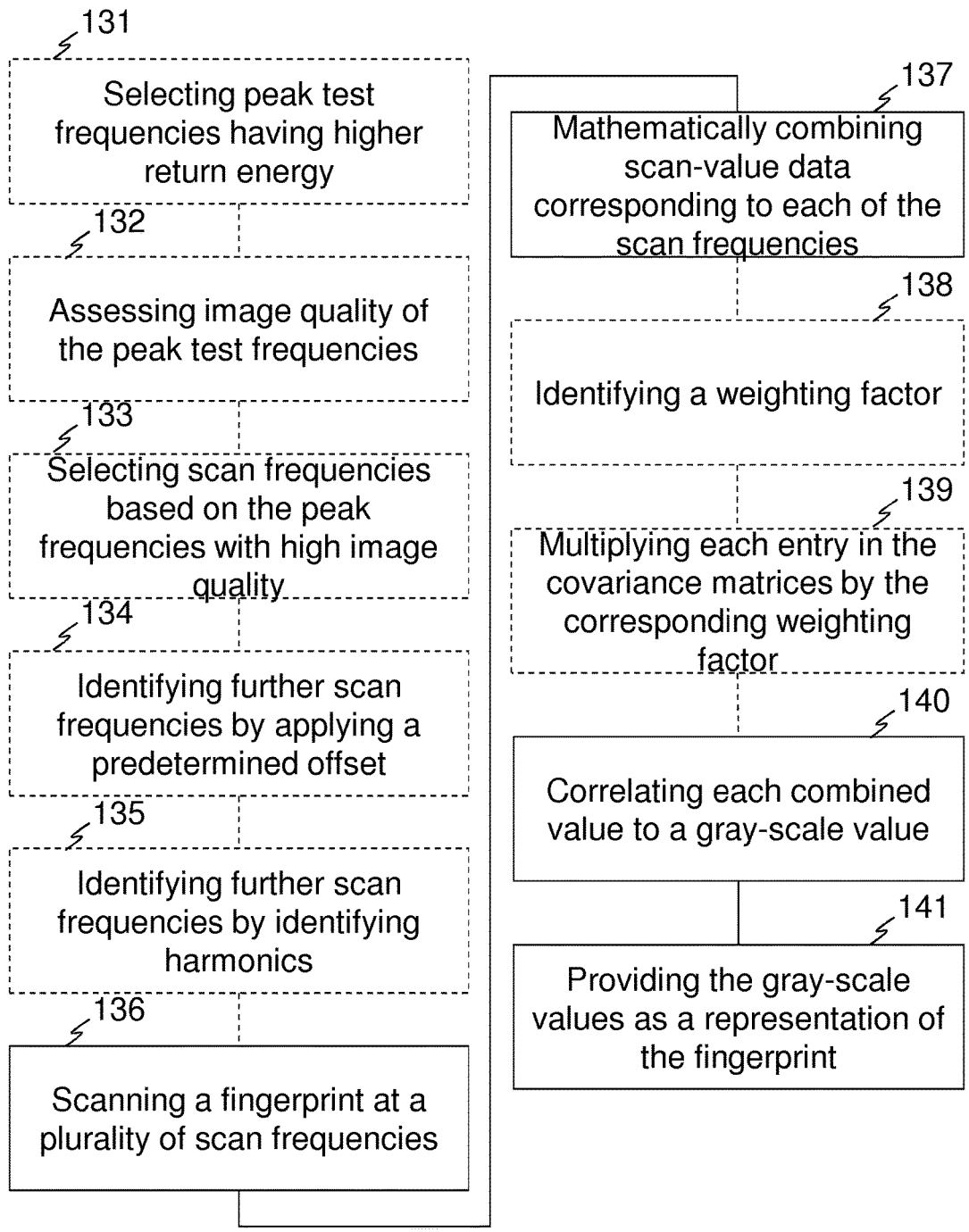
FIG. 13 is a flowchart illustrating a method of providing a representation of a fingerprint.
Figure 14A:
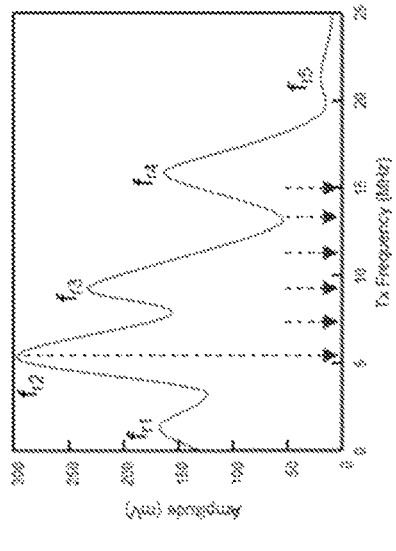
FIG. 14 depicts graphs corresponding to various excitation frequency selections.
Figure 14B:
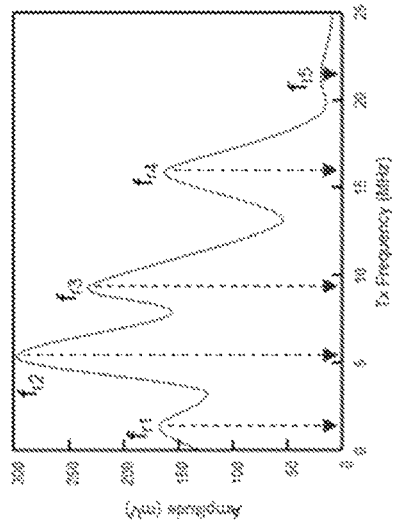
Figure 14C:
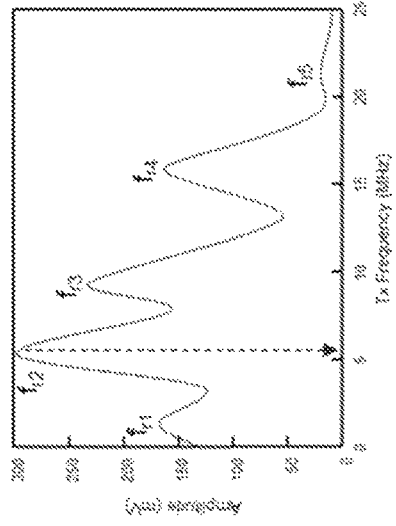
Figure 14D:
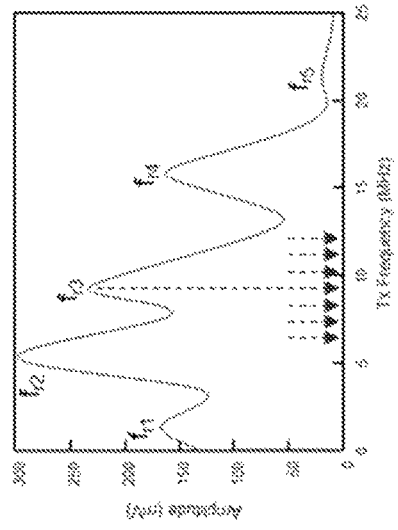
Figure 14E:
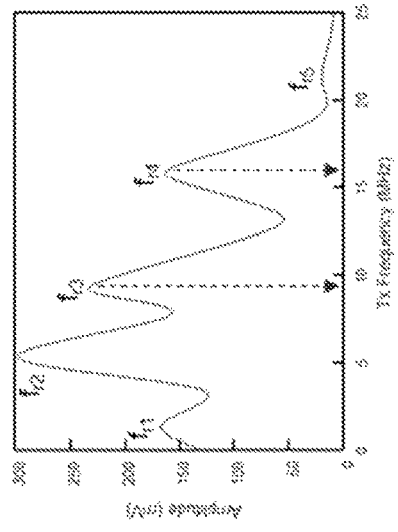
Figure 14F:
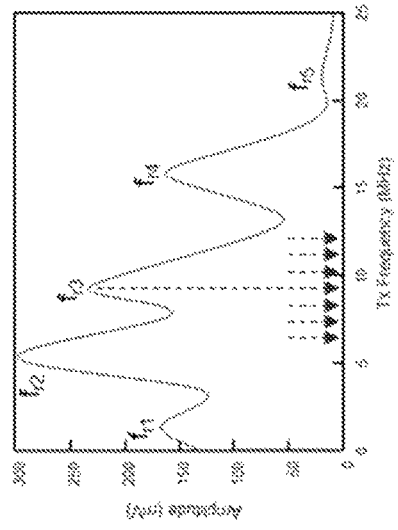

FIG. 13 is a flowchart depicting one or more methods of providing representations of a target value in keeping with the present disclosure. One method may include selecting 131 peak test frequencies having higher return energy than other test frequencies. The method may include assessing 132 image quality of the peak test frequencies and selecting 133 scan frequencies based on the peak frequencies with high image quality. Further scan frequencies may be identified 134 by applying a predetermined offset to the selected 133 frequencies. The method may further include identifying 135 further scan frequencies by identifying harmonics of the selected 133 scan frequencies. The method shown in FIG. 13 may further comprise scanning 136 a fingerprint at a plurality of scan frequencies. The scan-value data may from the scanning 136 may be mathematically combined to correspond to each of the scan frequencies. In some implementations a weighting factor for the scan-value data may be identified 138. Each entry in the covariance matrices may be multiplied 139 by the corresponding weighting factor. Each combined value may be correlated 140 to a gray-scale value. In some implementations, each combined value may be correlated without identifying a weighting factor or multiplying each entry in the covariance matrices by a weighting factor. The gray-scale values may be provided 141 as a representation of the fingerprint or other target object such as a stylus.

An example of the frequency response of an ultrasonic sensor array is shown in FIG. 14, with multiple peaks (local resonances labeled $f_{r1}, f_{r2}, \ldots f_{r5}$) and valleys visible.

Calibrating an ultrasonic sensor system may be carried out by varying the frequency (e.g. from about 1 MHz to about 25 MHz) so as to cause the ultrasonic transmitter to emit ultrasonic waves in order to determine the system response. The system may be operated with and then without transmitter excitation, and the background information set with the transmitter excitation off subtracted from the image information set with the transmitter excitation on to determine the system response. The image information set acquisition may be done, for example, on a pixel-by-pixel basis or as the mean (average) of some or all pixels in the ultrasonic sensor array.

Six graphs are shown in FIG. 14A-F, each indicating how an operating frequency might be selected. In the upper left graph (FIG. 14A), the frequency with the highest amplitude response at $f_{r2}$ is selected. In the lower left graph (FIG. 14B), frequencies with the two highest amplitude responses ($f_{r2}$ and $f_{r3}$) are selected. In the upper middle graph (FIG. 14C), frequencies with the five highest amplitude responses ($f_{r1}$ through $f_{r5}$) are selected. In the lower middle graph (FIG. 14D), frequencies with the best response quality are selected, corresponding to $f_{r3}$ and $f_{r4}$. In the upper right graph (FIG. 14E), a preferred operating frequency ($f_{r2}$) is selected, and one or more frequencies lower than or higher than the preferred operating frequency are selected (e.g., selected in equal steps). In the lower right graph (FIG. 14F), one or more preferred operating frequencies are selected (e.g., $f_{r3}$), and a range of frequencies lower than, including, and higher than the preferred operating frequencies are selected. In some implementations, the selected frequencies may have an equal interval between them.

Figure 15A:
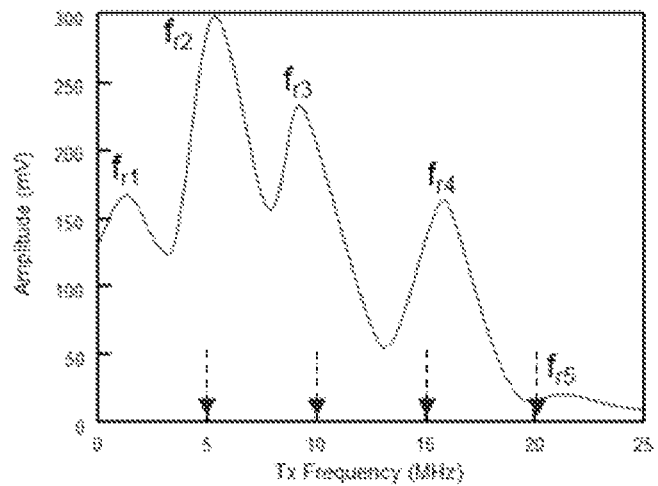
FIG. 15 depicts graphs corresponding to additional excitation frequency selections.
Figure 15B:
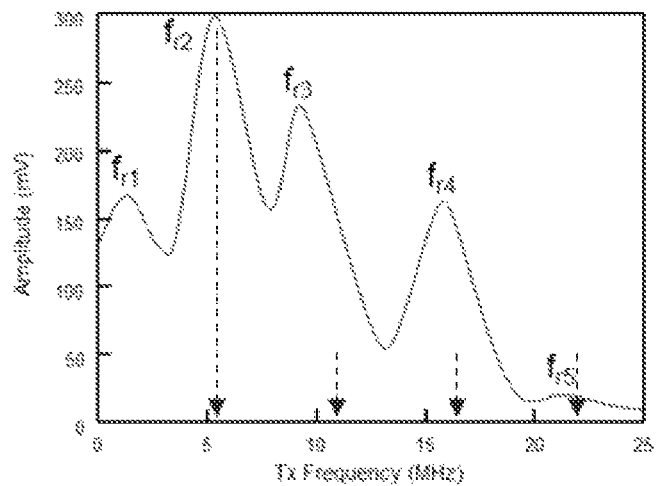

FIGS. 15A-B show graphs corresponding to additional excitation frequency selections. In the upper graph (FIG. 15A), one or more frequencies are selected for transmitter excitation, and information sets are acquired at one or more harmonics of the excitation frequencies (e.g., at integer multiples of the initially selected frequency, which may or may not be at a particular peak in the frequency response, such as 5, 10, 15 and 20 MHz as shown). In the lower graph (FIG. 15B), a frequency with substantially the highest amplitude response or response quality (e.g., $f_{r2}$) is selected for transmitter excitation, and images are acquired at one or more harmonics of the excitation frequency Sound may travel faster during the compression phase of the wave compared to the rarefaction phase in some materials, causing a nonlinear propagation of the sound wave. This nonlinearity of the sound traveling in a medium may generate receive signals with various harmonics of the excitation frequency. Alternatively, the nonlinearity of the ultrasonic waves may generate responses as the sum or difference of frequencies when more than one excitation frequency is used, such as a carrier frequency and a frequency-modulated portion. Harmonics produced as a receive signal are less dominant in the near field, but may still be present and detectable. During multi-spectral imaging, various harmonics may be received by the ultrasonic sensor array. In the thickness mode where the ultrasonic waves propagate in a direction normal to the surface of the ultrasonic transmitter, the sensor stack may resonate at a fundamental frequency and associated odd harmonics. An excitation frequency at or near the fundamental frequency or a chirp transmission sequence generated in a band covering the fundamental frequency may be transmitted to cause the resonance and the associated overtones. Information sets formed by the harmonic components of the applied frequencies may be used as inputs for pixel-wise averaging or covariance-based interpolation methods to generate a combined representation or image information set. These approaches may increase the resolution and contrast for the ultrasonic imaging system, as the fundamental frequency may be filtered out during signal processing.

Figure 16A:
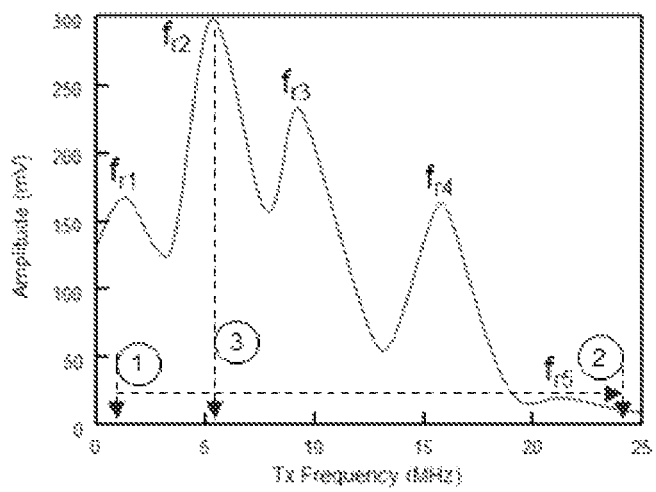
FIG. 16 depicts graphs illustrating methods of calibration.
Figure 16B:
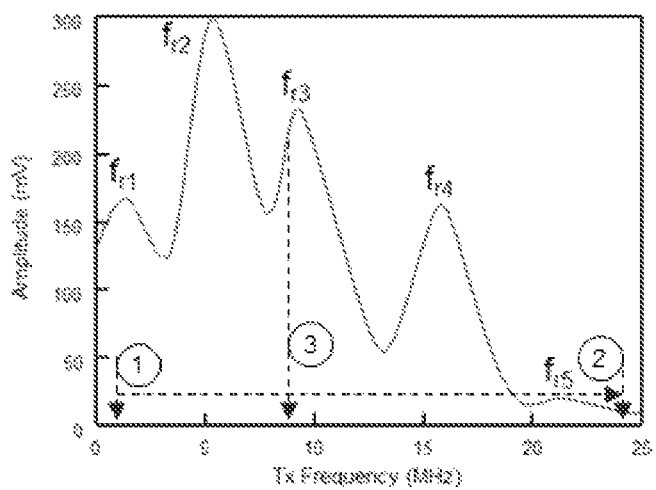

The system may be calibrated or self-calibrated to determine the preferred frequencies for capturing a representation of the target object. FIG. 16A-B depict graphs illustrating methods of calibration. In a first method (FIG. 16A), a lower scan frequency "1" (e.g. 1 MHz) and an upper scan frequency "2" (e.g. 24 MHz) may be selected and a scan made between the lower and upper scan frequencies to determine the system response and resonant peaks. In this example, the frequency "3" ($f_{r2}$) has the largest response and may be selected for operation. In a second method (FIG. 16B), a test target may be placed on the sensor platen, the target containing protrusions and recesses representing various spacing between fingerprint ridges and valleys. Scans may be made and the frequency "3" with the best image quality may be selected for operation (this may be at a frequency other than a peak frequency). Shifts in the selected frequencies with temperature changes for the various calibration methods may be determined by temperature testing and calibration over a range of temperatures or by modeling the typical temperature response of the ultrasonic sensor and modifying the applied excitation frequencies based on a local temperature measurement.

Figure 17A:
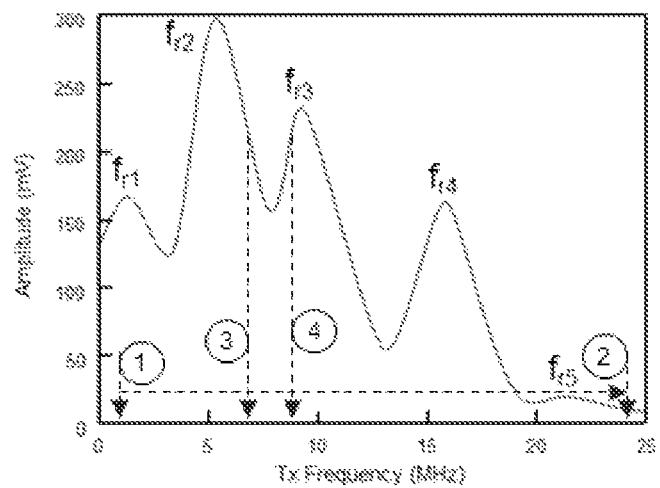
FIG. 17 depicts graphs illustrating additional methods of calibration.
Figure 17B:
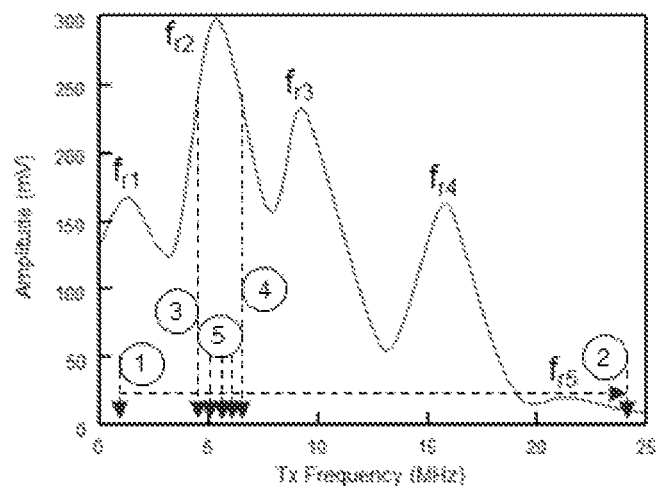

FIGS. 17A-B depict graphs that illustrate additional methods of calibration. In a third method (FIG. 17A), a lower scan frequency "1" (e.g. 1 MHz) and an upper scan frequency "2" (e.g. 24 MHz) may be selected and a scan made between the lower and upper scan frequencies with a test target to determine the system response and resonant peaks. A first frequency "3" representing the lowest output signal with a skin-like test target applied to the sensor platen (representing a fingerprint ridge) may be determined, and a second frequency "4" representing the highest output signal with air (representing a fingerprint valley) may be determined Note that the highest output signal with air and the lowest output signal with a skin-like test target may not always occur with the highest and lowest system peaks. In this example, the two determined frequencies 3 and 4 may be selected for operation. Shifts in the frequencies 3 and 4 with temperature changes may be included. In a fourth method (FIG. 17B), a lower scan frequency "1" (e.g. 1 MHz) and an upper scan frequency "2" (e.g. 24 MHz) may be selected and a scan made between the lower and upper scan frequencies with a test target to determine the system response and resonant peaks. A first frequency "3" may be determined, for example, based on a low output signal with a skin-like test target applied to the sensor platen, a second frequency "4" may be determined, for example, based on a high output signal with air against the platen, and the number of intermediate frequencies "5" between 3 and 4 may be determined (e.g. based on allowed system frequency increments). The two determined frequencies 3 and 4 along with the intermediate frequencies 5 in a frequency band may then be selected for operation. Shifts in the frequencies with temperature changes may be included. In some implementations, a second band of scan frequencies may be included. The second band of scan frequencies may be determined in a similar manner, yet focusing on a different range of frequencies than the first.

Figure 18:
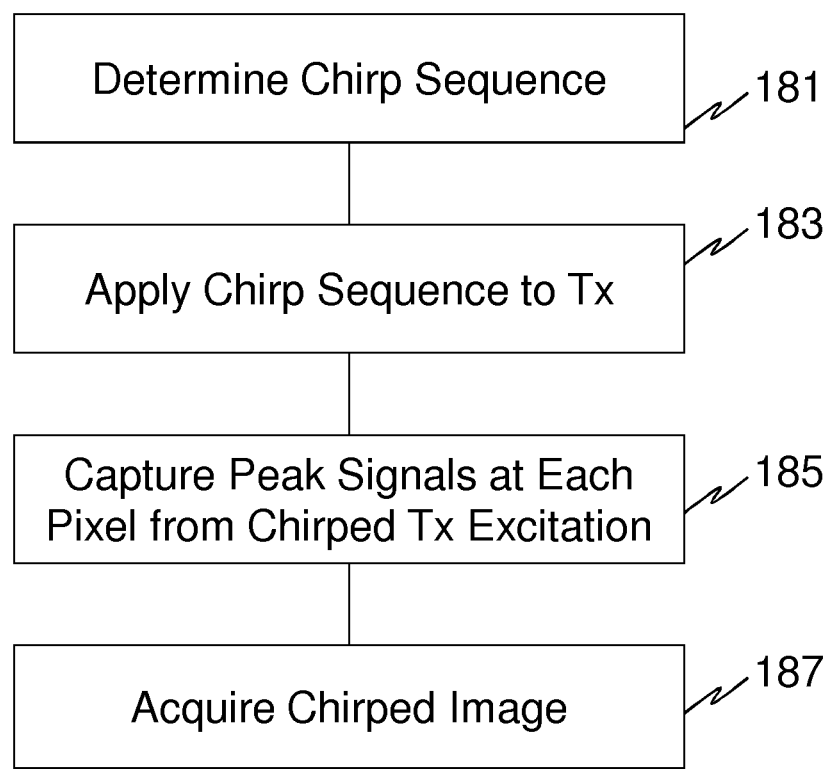
FIG. 18 is a flow chart illustrating a method of multi-spectral ultrasonic imaging with chirped excitation.

FIG. 18 is a flow chart illustrating one method of multi-spectral ultrasonic imaging with chirped excitation. Specifically, FIG. 18 shows a method of single-information set chirped excitation. In such a method, only a single information set is acquired. The method works with a pixel circuit based on a peak detector and uses a controlled range-gate time delay between the start of the transmitter excitation and the start of the sample mode, which may be adjusted to receive the reflected signal at the desired time. The chirp sequence may be generated to produce a single information set, allowing higher frame rates. In one embodiment, a chirp sequence is determined 181. The chirp sequence is applied 183 to the transmitter. A receiver captures 185 peak signals at each pixel from the chirped transmitter excitation. A chirped image is then acquired 187, for example, by a processor that manipulates the captured 185 peak signals.

Figure 19:
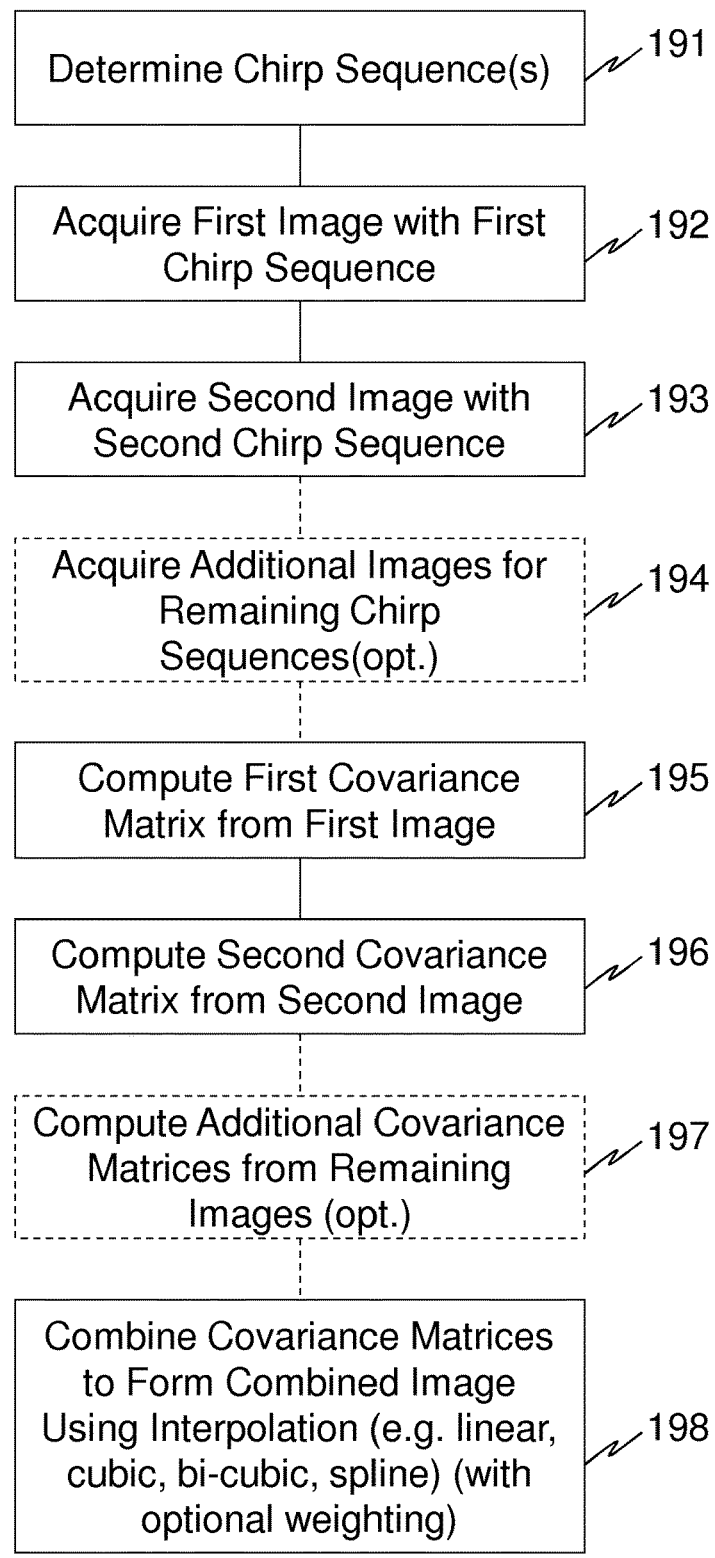
FIG. 19 is a flow chart illustrating a method of multi-spectral ultrasonic imaging for multiple-information-set chirped excitation with pixel-wise arithmetic averaging and optional weighting.

FIG. 19 is a flow chart illustrating a method for multiple-image chirped excitation with pixel-wise arithmetic averaging (and optional weighting). In one embodiment, chirp sequences are determined 191, for example, by a processor or through previous configuration. A first image is acquired 192 using a first chirp sequence. A second image is then acquired 193 using a second chirp sequence. Additional images may be acquired 194 for various other chirp sequences. A first covariance matrix may be computed 195 from the first image. A second covariance matrix may be computed 196 from the second image. Additional covariance matrices may be computed 197 from any additional images acquired 194. The covariance matrices may be combined 198 to form a combined image, for example, by using interpolation (e.g., linear, cubic, bi-cubic, or spline interpolation). The combination 198 of covariance matrices may be weighted.

Figure 20A:
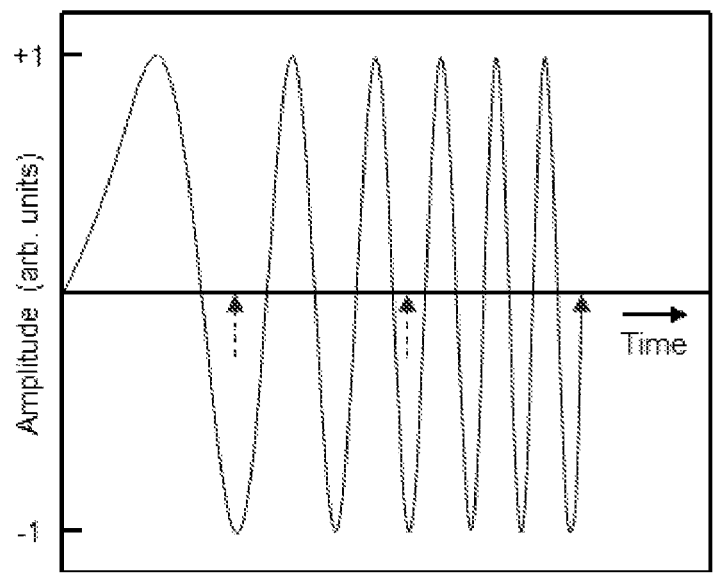
FIG. 20 depicts two graphs that illustrate chirp sequence determination.
Figure 20B:
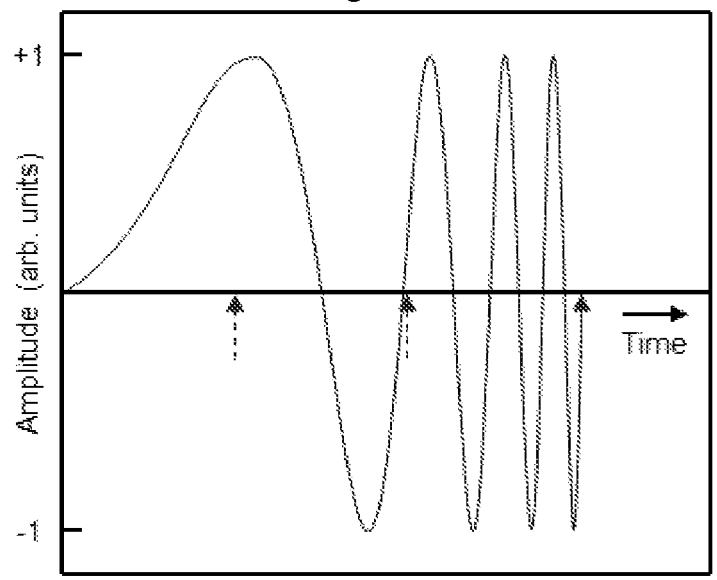

FIG. 20 depicts two graphs that help illustrate chirp sequence determination. The upper graph of FIG. 20 shows a linear chirp starting at a first frequency and ending at a second frequency. The lower graph of FIG. 20 shows an exponential chirp starting at a first frequency and ending at a second frequency. One or more information sets may be acquired during either scan (e.g., at frequencies indicated by the arrows). A chirp sequence may be, for example, linear, quadratic, exponential, logarithmic or comprise individual frequencies. A chirp generally has a start frequency and an end frequency; some chirps may start at the low frequency and end at the high frequency, while others may start at the high frequency and end at the low frequency. The start and end chirp frequencies may be the frequency at the peak amplitude, the frequency at the second peak amplitude, frequencies at or near the peak frequencies, or other frequencies of the ultrasonic sensor.

Several different types of chirp sequences that may be used are: 1) an extended chirp that has an extended range of frequency components; 2) a peak-to-peak chirp that has frequencies extending between the highest peak frequency and the second highest peak frequency of receiver array; 3) a proximity chirp that has frequencies around one of the system peaks; and 4) a gapped chirp that has two or more bands of frequencies extending through one or more peaks of the ultrasonic sensor array. The chirp sequence may be selected based on the highest peaks of the system response.

The chirp sequence may be selected based on the image obtained from it, with the chirp sequence determined from an assessment of image quality or other metric. One or more chirps may be applied in a series (e.g. repeated). A single information set may be acquired using a chirp sequence with a multi-frequency content covering the greatest receiver frequency response. Multiple information sets may be acquired using one or more chirp sequences and the information sets combined. An ultrasonic sensor may be calibrated using these chirp sequences.

Figure 21A:
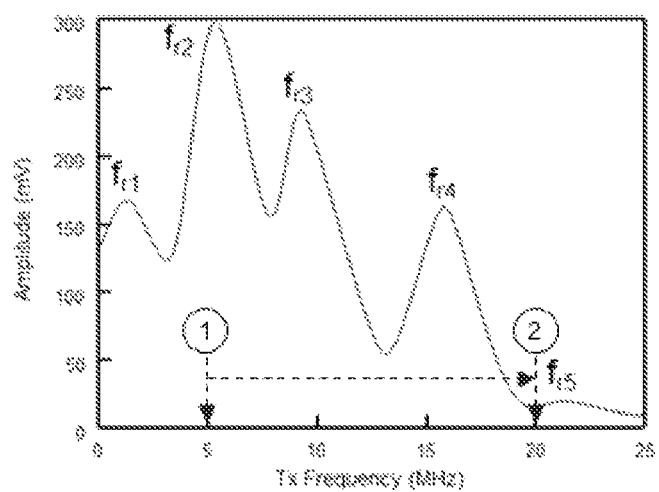
FIGS. 21 and 22 depict graphs illustrating various chirp sequences.
Figure 21B:
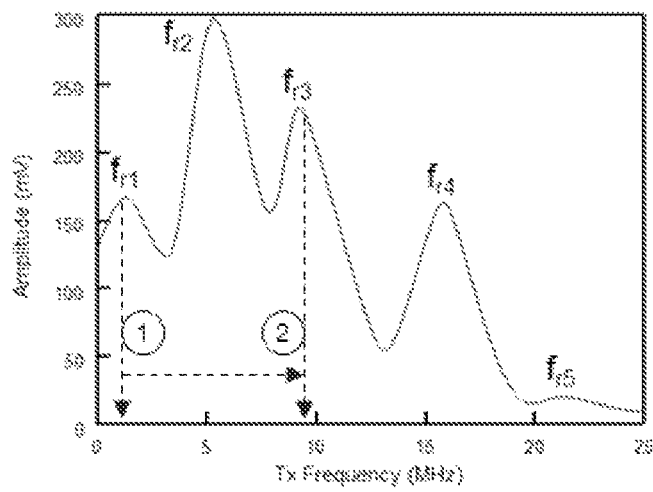

FIGS. 21A-B depict graphs illustrating various chirp sequences. In a first method (an extended chirp—see FIG. 21A), a lower chirp frequency "1" (e.g. 5 MHz) and an upper chirp frequency "2" (e.g. 20 MHz) are selected and a chirp is made between the lower and upper chirp frequencies. In some implementations, the lower and upper chirp frequencies may be determined based on a measurement of the frequency response of the system. In some implementations, the lower and upper chirp frequencies may be selected based on testing of similarly constructed sensor arrays. An information set may be acquired after the chirp has been completed. Alternatively, one or more information sets may be acquired during the chirp. In a second method (a peak-to-peak chirp—see FIG. 21B), a lower chirp frequency "1" (e.g. ~1 MHz) and an upper chirp frequency "2" (e.g. ~9.5 MHz) may be selected at or near resonant peaks of the system, and a chirp made between the lower and upper chirp frequencies. An information set may be acquired after the chirp has been completed. Alternatively, one or more information sets may be acquired during the chirp.

A linear chirp signal has a frequency that changes linearly with time, for example, Chirp(time)=sin [2π($f_o$+(B/2T)*time)time]

for 0<time<T, where $f_o$ is the start frequency, B is the frequency bandwidth, and T is the time duration of the chirp.

Figure 22A:
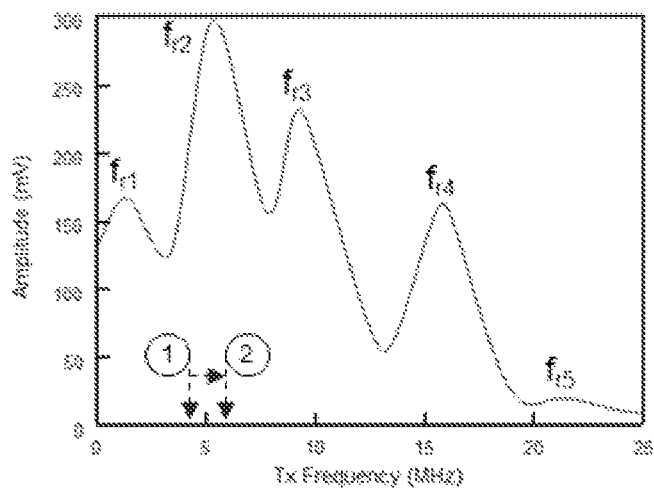
Figure 22B:
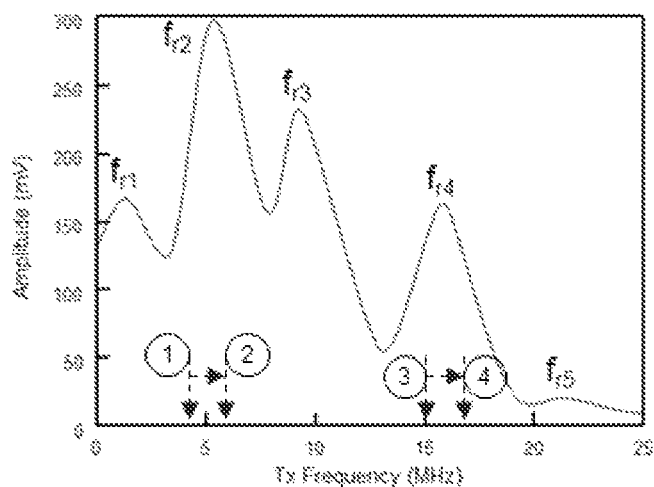

FIGS. 22A-B depicts graphs illustrating other various chirp sequences. In a third method (proximity chirp—see FIG. 22A), a lower chirp frequency "1" (e.g. 4 MHz) and an upper chirp frequency "2" (e.g. 6 MHz) are selected that covers a system peak, and a scan is made between the lower and upper chirp frequencies. An information set may be acquired after the chirp has been completed. Alternatively, one or more information sets may be acquired during the chirp. In a fourth method (gapped chirp—see FIG. 22B), a lower chirp frequency "1" (e.g. 4 MHz) and an upper chirp frequency "2" (e.g. 6 MHz) are selected around a first resonant peak, and a second lower chirp frequency "3" (e.g. 15 MHz) and a second upper chirp frequency "4" (e.g. 17 MHz) are selected around a second resonant peak. A scan may be made between the lower and upper chirp frequencies of the first range (1 to 2) followed by a scan between the lower and upper chirp frequencies of the second range (3 to 4). An information set may be acquired after the chirp has been completed. Alternatively, one or more information sets may be acquired during the chirp.

Chirp-coded transmitter signals may be generated using a linear frequency band around a peak amplitude response in the ultrasonic system. A broadband pulse and a chirp pulse may both have the same peak amplitude, but the chirp pulse may have much more pulse energy due to its increased length. In general, the more signal energy transmitted, the larger the reflected signal. The chirp pulse may be formed with varying amplitude and frequency during the pulse. A shorter chirp pulse may allow faster sensor frame rates. Chirp pulses may use a single transmitted pulse, in order to mitigate motion artifacts that may occur from motion of a target object between transmission pulses of a multiple-pulse, multiple-frequency scheme.

Figure 23B:
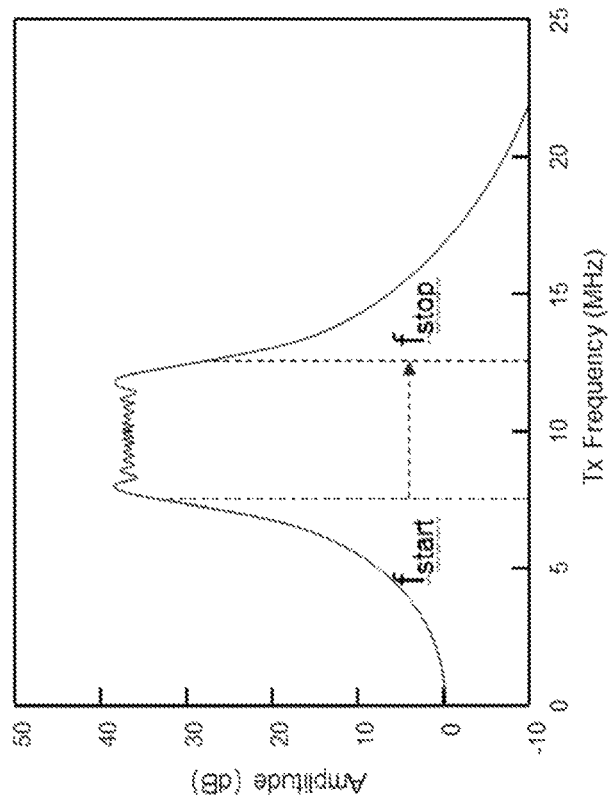
FIGS. 23A, 23B, 24A and 24B depict graphs illustrating FFTs of chirp-coded transmitter signals.
Figure 23A:
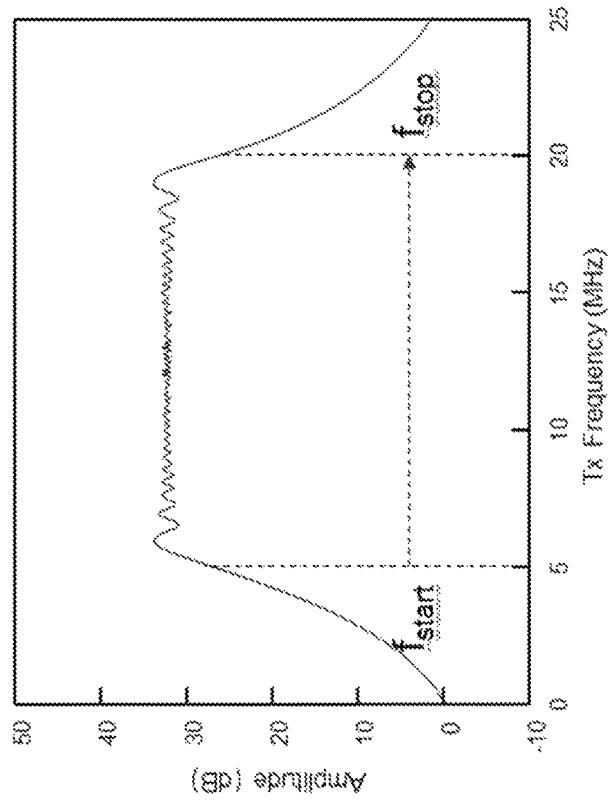

FIGS. 23A and 23B depict graphs illustrating FFTs of chirp-coded transmitter signals. FIG. 23A shows a FFT of chirp-coded "extended chirp" transmitter signal, with a linear frequency band from 5 to 20 MHz. FIG. 23B shows a FFT of chirp-coded "peak-to-peak chirp" transmitter signal, with a linear frequency band from 7.5 to 12.5 MHz.

Figure 24A:
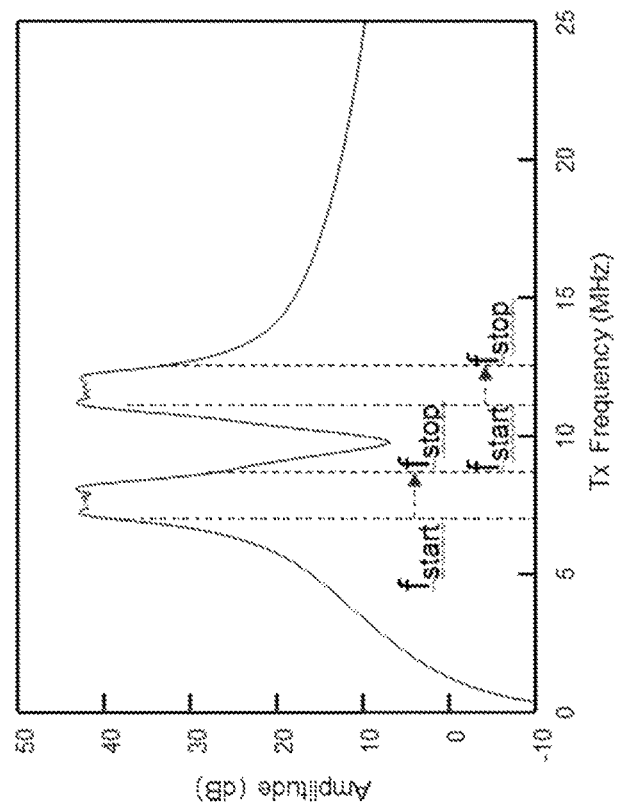
Figure 24B:
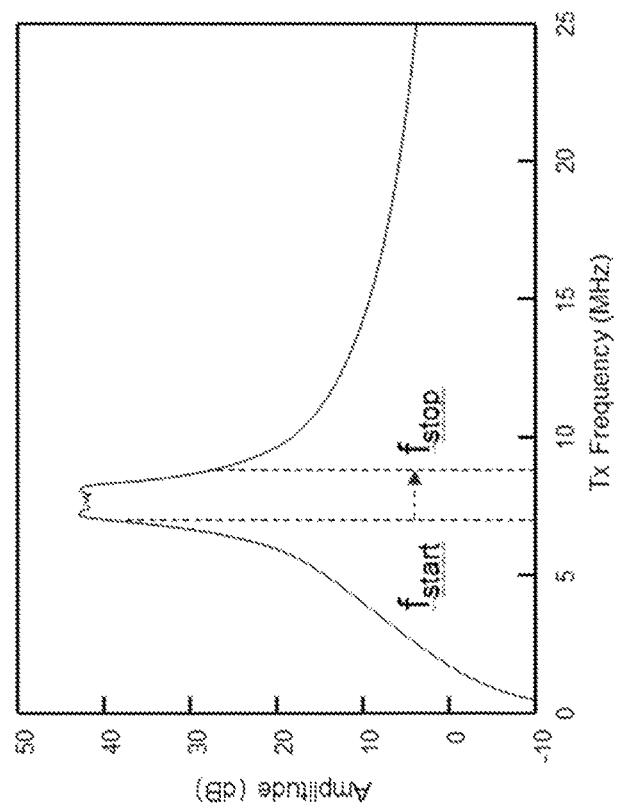

FIGS. 24A and 24B depicts graphs showing FFTs of chirp-coded transmitter signals. FIG. 24A shows a FFT of chirp-coded "proximity chirp" transmitter signal, with a linear frequency band from 7 to 8.5 MHz. FIG. 24B shows a FFT of chirp-coded "gap chirp" transmitter signal, with a linear frequency band from 7.5 to 8.5 and 11 to 12.5 MHz.

Figure 25:
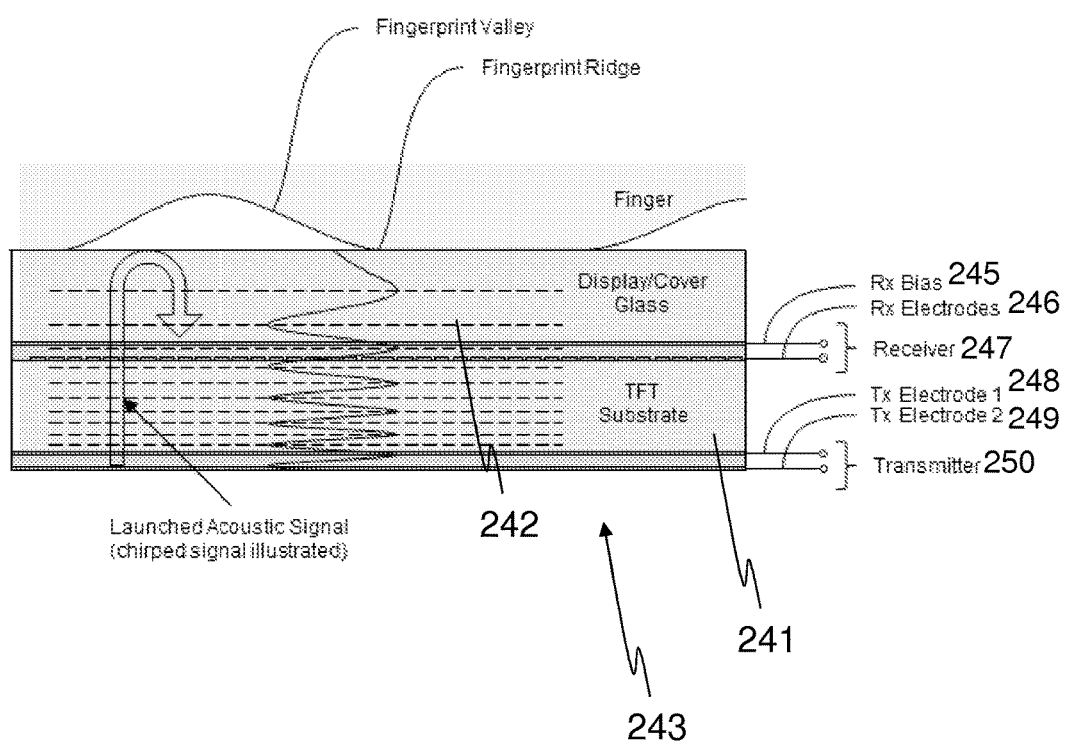
FIG. 25 is a diagram of an ultrasonic sensor array.

FIG. 25 is a diagram depicting an ultrasonic sensor array. The sensor array 243 may include a TFT substrate 241 and a receiver 247. The sensor array 243 may be in physical communication with a display/cover 242 such as a glass cover or LCD display. The receiver 247 may comprise one or more receiver biases 245 and one or more receiver electrodes 246. The sensor array 243 may also be arranged in relation to a transmitter 250. The transmitter 250 may comprise multiple transmission electrodes 248 and 249. The sensor array 243 may have a pixel pitch of approximately 50 µm. The sensor array 243 may range in size from approximately 15 mm×6 mm to full display sizes. Other sizes may include 11 mm×11 mm, and 1 inch×1 inch sizes. The sensor array 243 may have a low profile (approximately 1 mm) The sensor array 243 may have high operational frequencies (5-25 MHz). The sensor array 243 may be at periphery of a fingerprint scanning device, behind a portion of the display 242, behind the entire display, or elsewhere in device enclosure.

Figure 26:
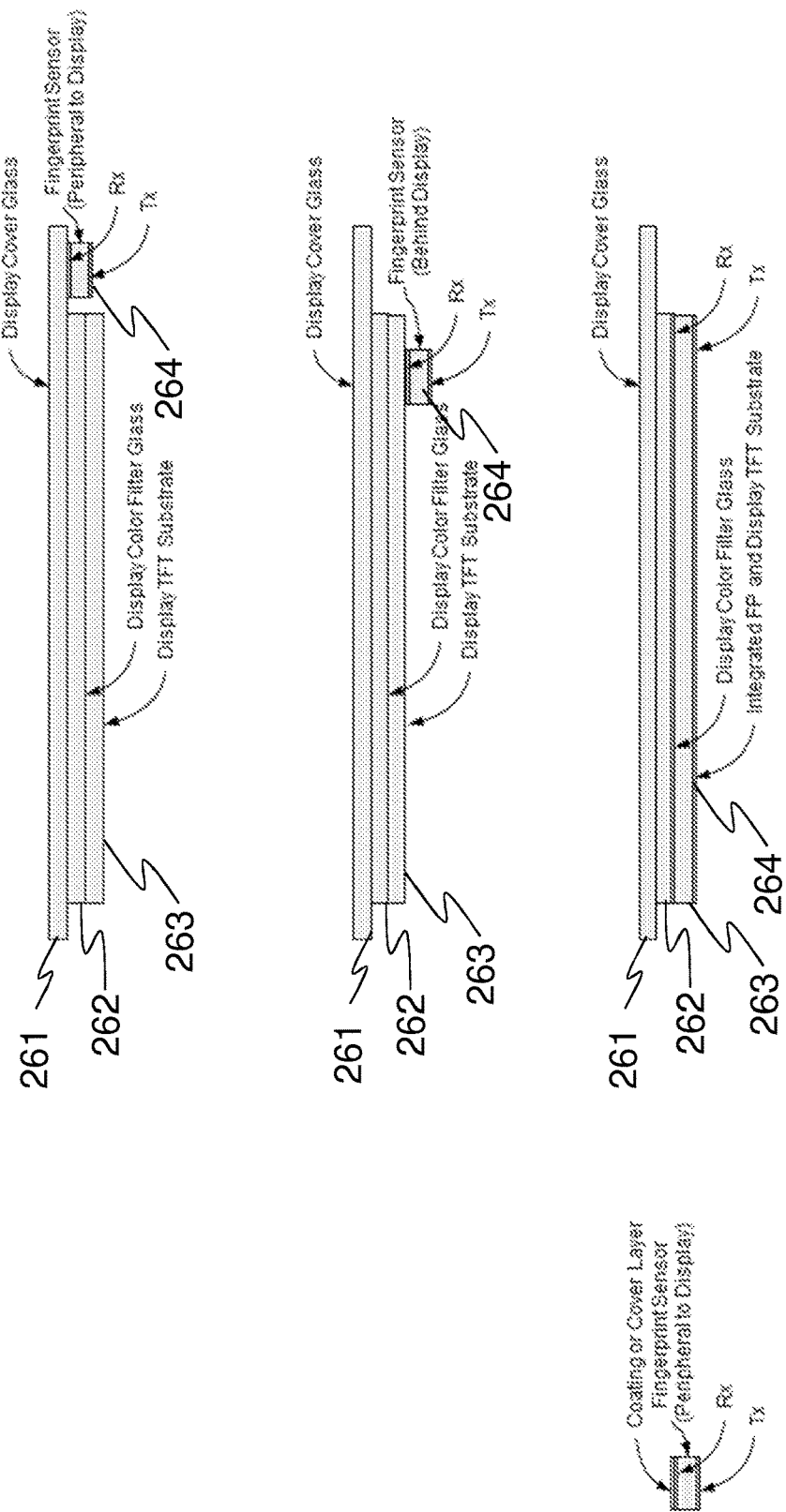
FIG. 26 is a plurality of configurations of an ultrasonic fingerprint sensor.

FIG. 26 depicts some possible configurations of an ultrasonic fingerprint sensor in keeping with the present disclosure. The sensor may have separate or common TFT substrates for a display and fingerprint sensor. A common cover glass or touchscreen may be shared between elements of the sensor. An ultrasonic fingerprint sensor array (and optional coating or cover layer) may be positioned on a bezel, on the side, or on the back of a mobile device enclosure. The sensor may be placed above or positioned as part of a button (mechanical or non-mechanical; authenticating or non-authenticating). For example, the fingerprint sensor 264 may be peripheral to the display (comprising display color filter glass 262 and display TFT substrate 263). In this example, the fingerprint sensor 264 is situated beneath the display cover glass 261. In another example, the fingerprint sensor 264 may be situated separately from the display and coated with a cover layer to protect the sensor 264. In another example, the fingerprint sensor 264 may be situated beneath (or behind) the display (comprising display color filter glass 262 and display TFT substrate 263). In another example, the fingerprint sensor 264 may be integrated within the display TFT substrate 263.

Figure 27:
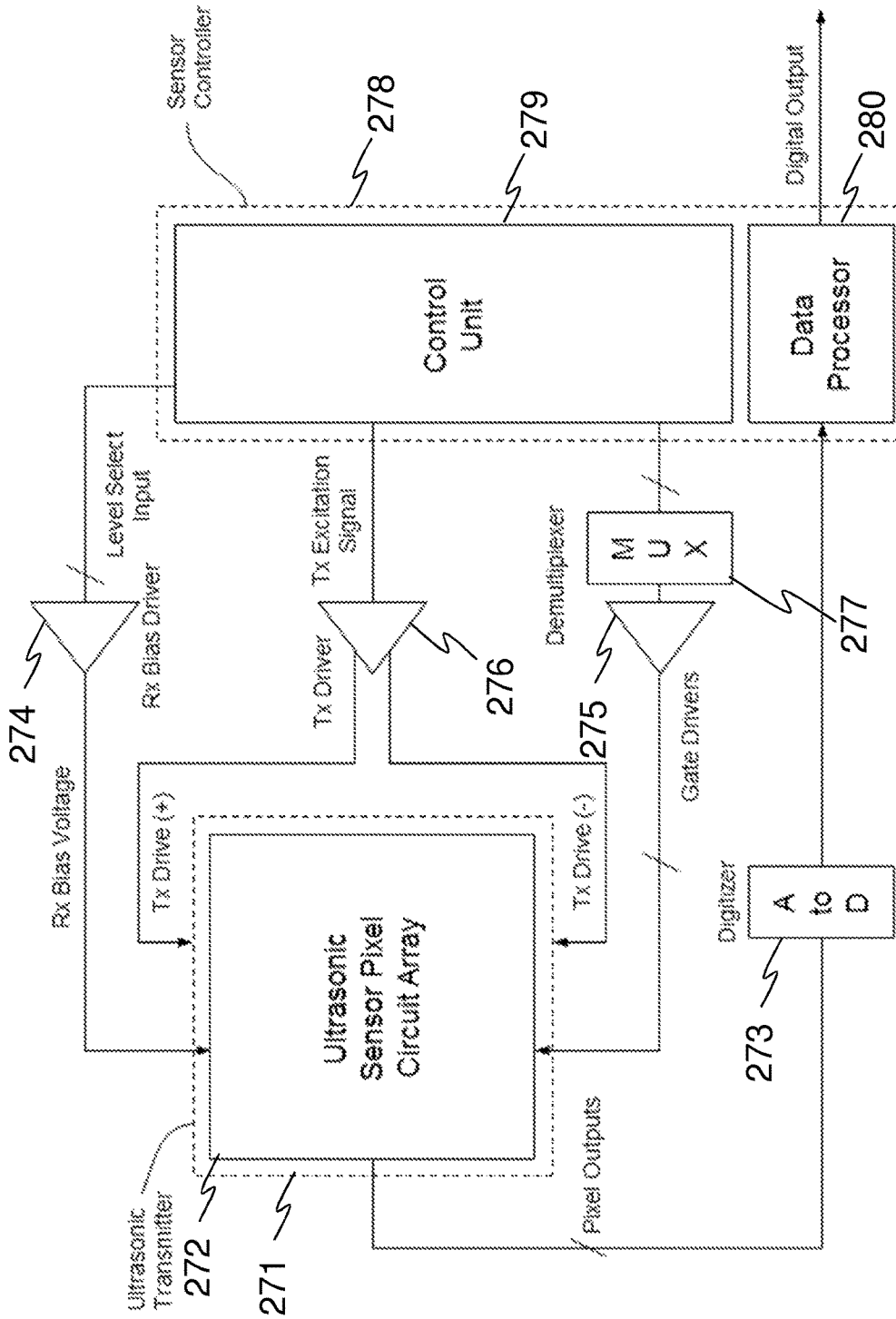
FIG. 27 depicts a block diagram of an ultrasonic sensor system.

FIG. 27 depicts a block diagram of one such ultrasonic sensor system. The ultrasonic sensor system of FIG. 27 comprises an ultrasonic transmitter 271 having an ultrasonic sensor pixel circuit array 272. The ultrasonic transmitter 271 is in electronic communication (for example, through one or more electronic connections) to a transmitter driver 276. For example, the transmitter driver 276 may have a positive polarity signal and a negative polarity signal in electronic communication with the ultrasonic transmitter 271. The transmitter driver 276 may be in electronic communication with a control unit 279 of a sensor controller 278. The control unit 279 may provide a transmitter excitation signal to the transmitter driver 276. The control unit may also be in electronic communication with a receiver bias driver 274 through a level select input bus. The receiver bias driver 274 may provide a receiver bias voltage to a receiver bias electrode disposed on a surface of a piezoelectric receiver layer that may be attached to the ultrasonic sensor pixel circuit array 272. The control unit 279 may also be in electronic communication with one or more demultiplexers 277. The demultiplexers 277 may be in electronic communication with a plurality of gate drivers 275. The gate drivers 275 may be in electronic communication with the ultrasonic sensor pixel circuit array 272 in the ultrasonic transmitter 271. The gate drivers 275 may be positioned external to the ultrasonic sensor pixel circuit array 272 or in some implementations included on the same substrate as the ultrasonic sensor pixel circuit array 272. The demultiplexers 277, which may be external to or included with the ultrasonic sensor pixel circuit array 272, may be used to select specific gate drivers 275. The ultrasonic sensor pixel circuit array 272 may be in electronic communication with one or more digitizers 273. The digitizers 273 may convert analog signals from the ultrasonic sensor pixel circuit array 272 to a digital signal suitable for a data processor 280 in the sensor controller 278. The sensor controller 280 may provide a digital output to an external system, such as an applications processor of a mobile device.

When information sets are acquired at specific frequencies, the resulting information sets may invert finger print definitions (for example, the ridge regions which typically appear bright in the sensor array output image seem to appear dark and vice versa for the finger valley regions). These observations may occur at several specific frequencies in the 5-20 MHz operation range, but may have the biggest output in a narrow range with respect to the previously defined optimal frequency. The hypothesis for this behavior is that there is a creation of standing waves due to the resonance of the transmit and receive signal in the sensor stack which then interfere constructively or destructively at specific frequencies to yield such a pattern.

Figure 28:
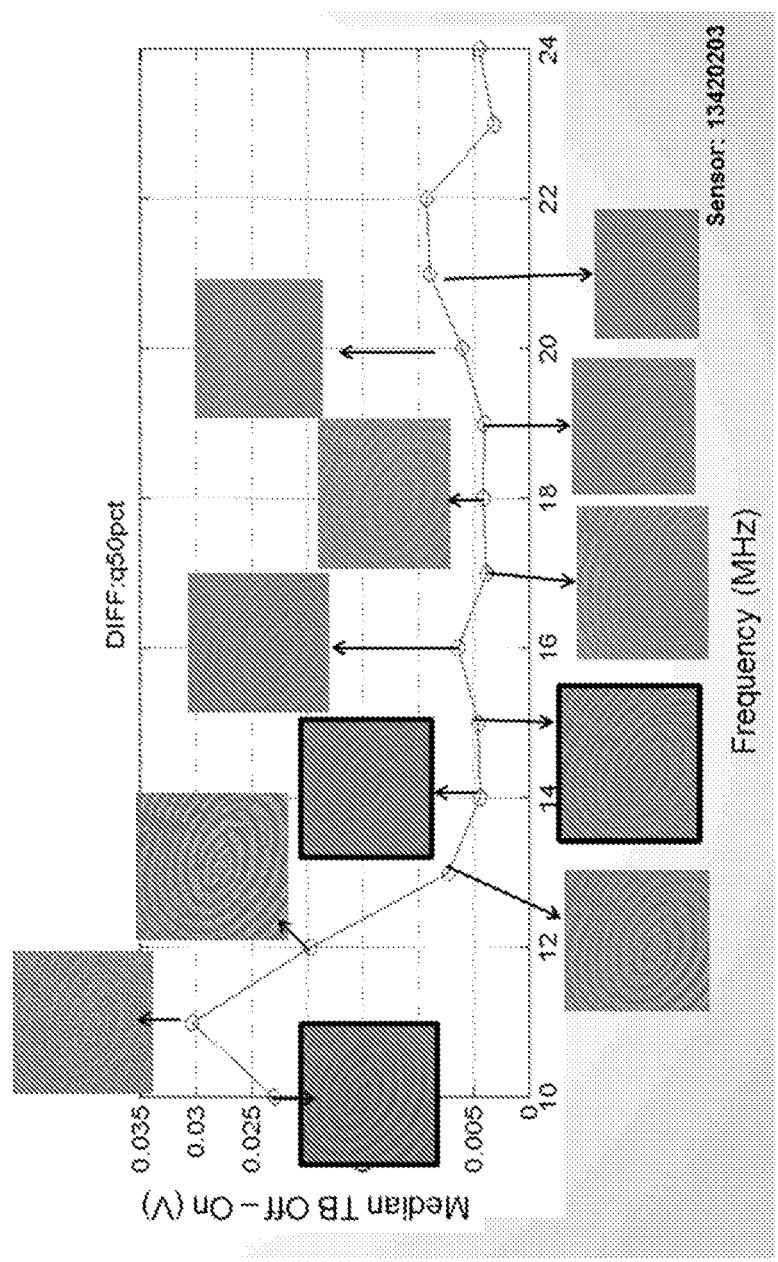
FIG. 28 depicts the frequency response of the difference in output of a sensor array between transmitter on and transmitter off conditions.

An example of such a behavior is shown in FIG. 28. FIG. 28 shows the frequency response of the difference in the output of the array between tone burst ON and OFF conditions. Fingerprint images are overlaid at the frequencies at which they were obtained, and the images marked by solid black boxes appear inverted. Typically, the peak response is determined to be the optimal frequency of operation yielding maximum signal transfer (the "optimal frequency"). The overlay plot includes the fingerprint images taken at the respective frequencies. The images outlined with solid black boxes highlight the inversion of the image (gray scale values for finger print ridges and valleys look swapped). It can also be noted that this behavior is far stronger, more sensitive and observable around the peak frequency. This behavior can be used to process information sets and improve overall signal-to-noise ratio in the output image. In this proposed methodology, the finger print images may be taken simultaneously at two to four frequencies above and below the previously determined "optimal frequency" (frequency at which the tone burst ON and OFF signals read by the array vary the most). Once information sets are obtained, there can be one of several ways to improve the identification of distinct ridge and valley patterns.

Figure 29:
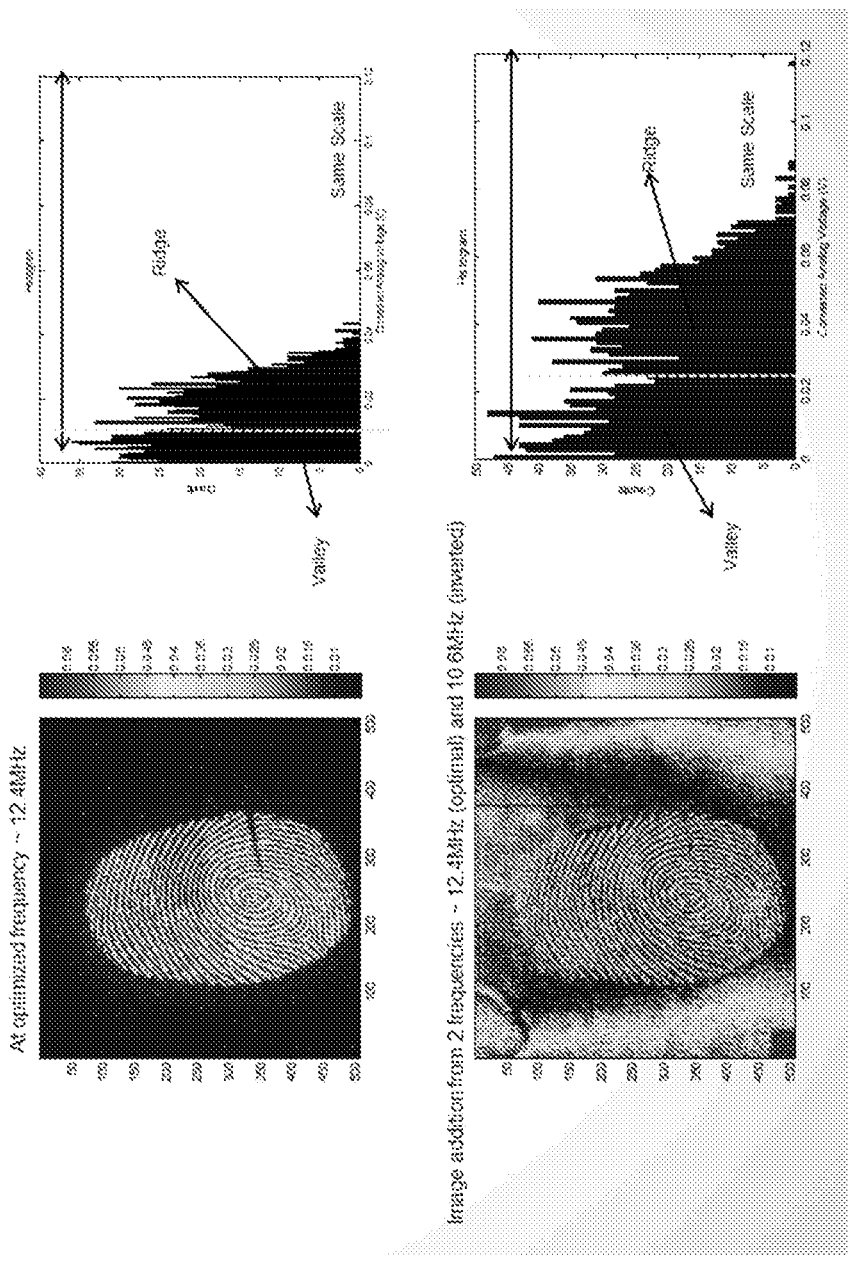
FIG. 29 depicts a histogram of sensor output signal amplitude obtained for a finger in two cases.

One such example is illustrated in FIG. 29, wherein two images are acquired, one at the optimal frequency (12.6 MHz) and the other at a frequency slightly lower than that which resulted in a complete inversion of the ridge and the valley regions (10.4 MHz). These individual images are then subtracted from their corresponding background images (images taken at the same frequency conditions without the finger) for better isolation. As an example, post normalization, the data captured at the two different frequencies is added, which results in an increase in the overall signal attributed to the ridge and the valley regions. There can be several other image processing methodologies that can be implemented that serve the same purpose of improving the separation in the response. FIG. 29 shows the signal amplitude obtained in two cases (one at a single optimal frequency and the second at two frequencies, one of which resulted in image inversion). The histogram plots highlight the typical voltage output distribution for the two cases, with the latter showing significantly higher output distribution.

One objective of the disclosure is the use of specific target frequencies that lead to better fingerprint definitions by employing the multiple frequency related signal inversion. The processing methodologies to increase the definition can be several and can be chosen based on specific concerns. There are several allied factors related to the image capture based on the sampling parameters. The significant ones that would affect the observation of such an inversion behavior are the delay between the sampling and the burst start, the number ultrasonic pulses used, and their frequencies. However, with suitable tuning of the sensor, these parameters (i.e., number of pulses, delay, burst start, and frequencies) can be adjusted.

Figure 30:
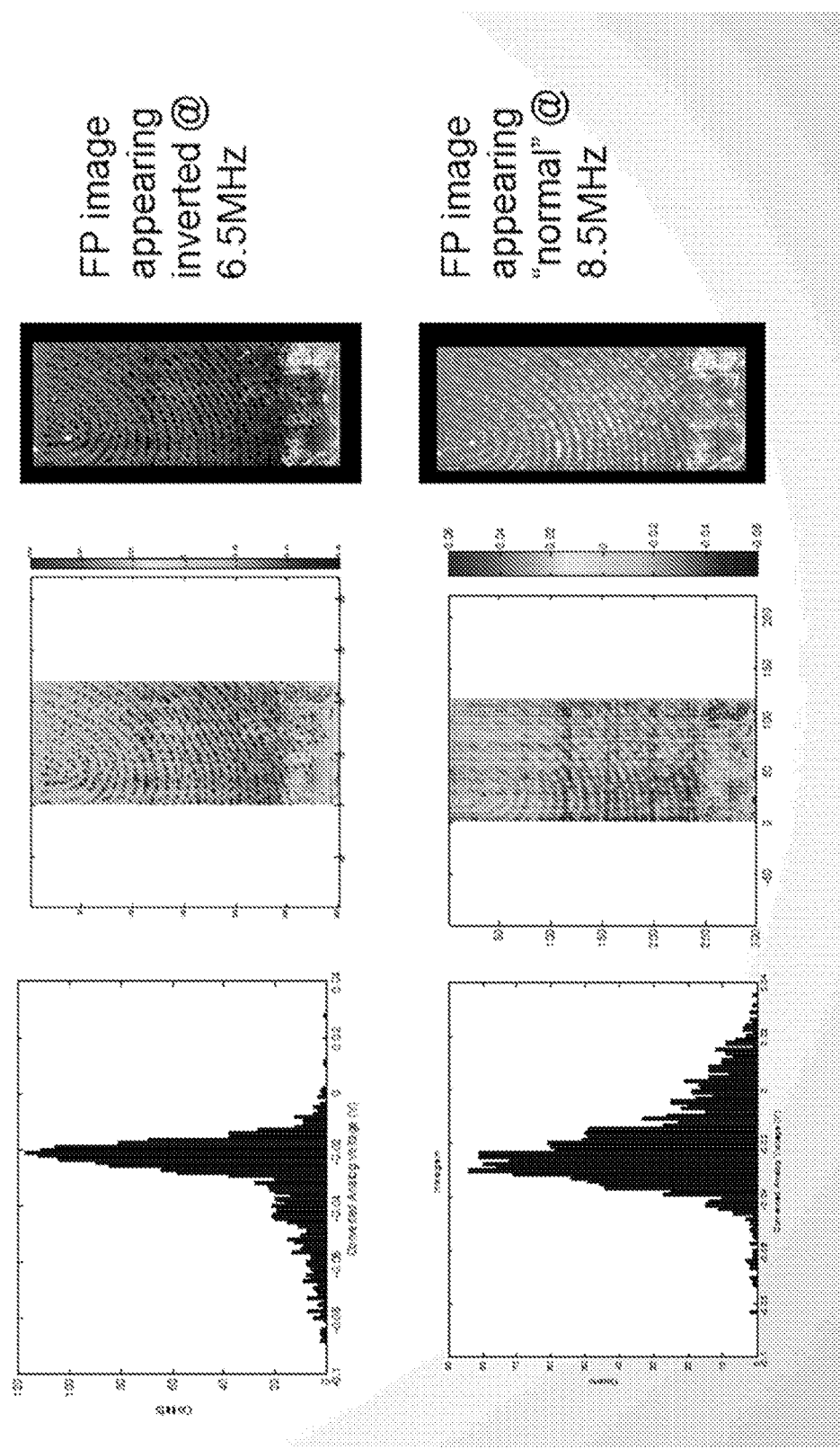
FIG. 30 depicts sample image contours and corresponding histogram plots of a finger.

For example, one way to improve the identification of distinct ridge and valley patterns involves obtaining finger print images at two distinct frequency settings (one "normal" where the ridges appear bright and the other "inverted" where the ridges appear darker compared to the valley regions). FIG. 30 depicts sample image contours and histogram plots, which show the voltages corresponding to the fingerprint ridge and valley post conversion by the ADC (analog-to-digital converter). The histogram and the image plots in FIG. 30 have the same scale to enable ease of comparison. Although the contrast in FIG. 30 between the ridge and valley regions appears comparable, the histograms corresponding to each of the frequencies show that the distribution of the information set corresponding to the ridge and valley regions has changed from one frequency (6.5 MHz) to the other frequency (8.5 MHz).

Figure 31:
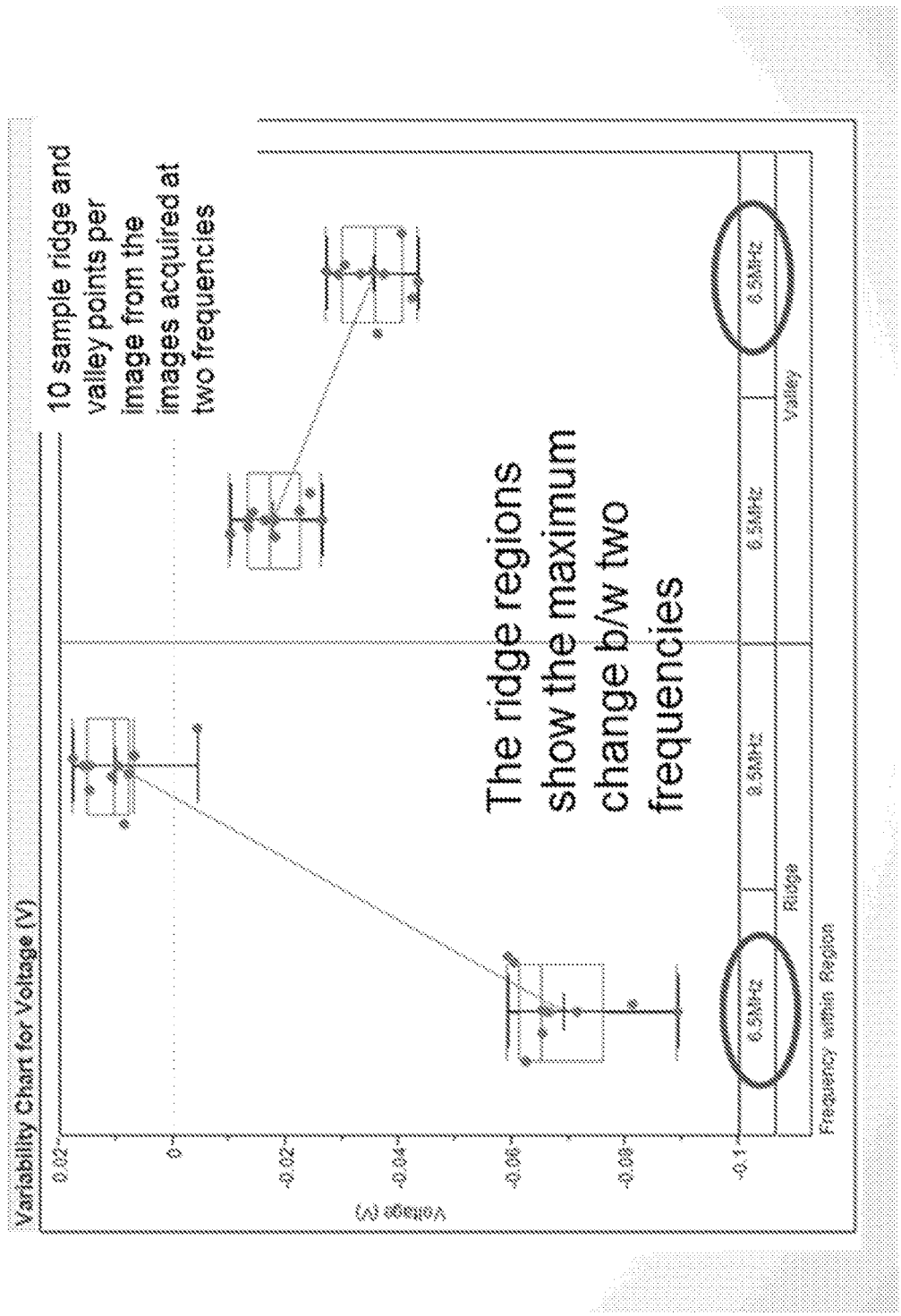
FIG. 31 depicts a variability plot showing analog voltage comparison between selected ridge and valley regions.

Further examination of the data distribution is shown in FIG. 31. FIG. 31 is a variability plot showing analog voltage comparison between selected ridge and valley points. Here, a group of randomly selected points corresponding to ridge and valley regions of a finger is tracked for the two frequencies of operation. It can be seen that the regions representative of the ridges of a finger show the maximum change between the two operation frequencies, while the "valley" regions of the finger remain fairly unchanged.

By obtaining measurement at selected frequencies, the difference between the ridge and valley regions can be amplified by tracking regions of an image or pixels based on their output change with frequency. Ridge regions which are more prone to significant output change with frequency can be identified for effective processing using subsequent thresholding by suitable gradient domain processing of information sets. Another potential advantage is the improvement in the SNR (Signal to Noise Ratio) of the acquired images. Identification of regions with the maximum and minimum gradient change between the two frequencies of operation can potentially improve SNR, when compared to a single frequency image acquisition process.

Figure 32:
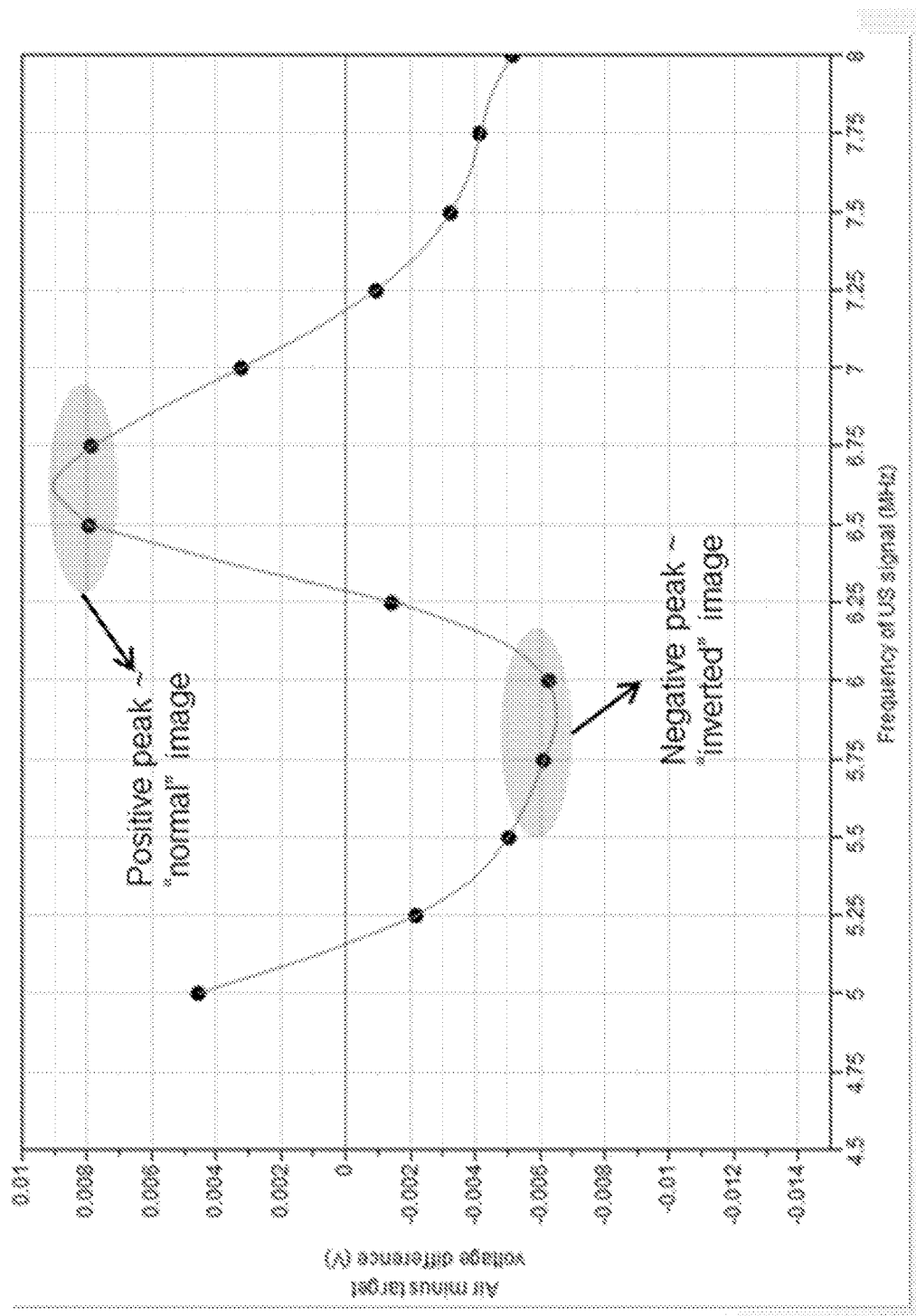
FIG. 32 depicts a negative peak and positive peak as plotted between an air minus target voltage difference versus the frequency of an ultrasonic transmitter excitation signal.
Figure 33:
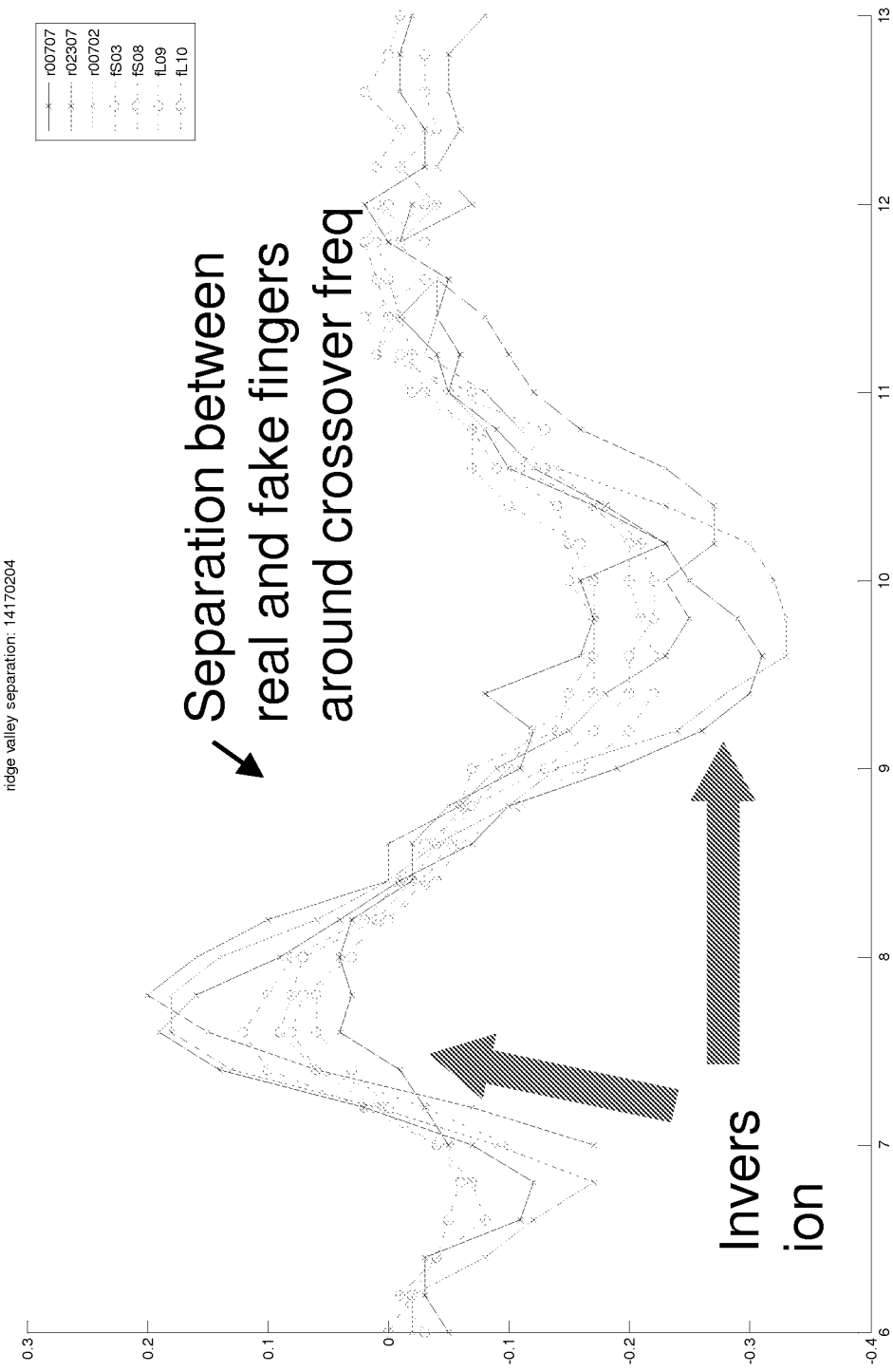
FIGS. 33-36 depict multi-frequency-based approaches to determining liveness of a target object.
Figure 34:
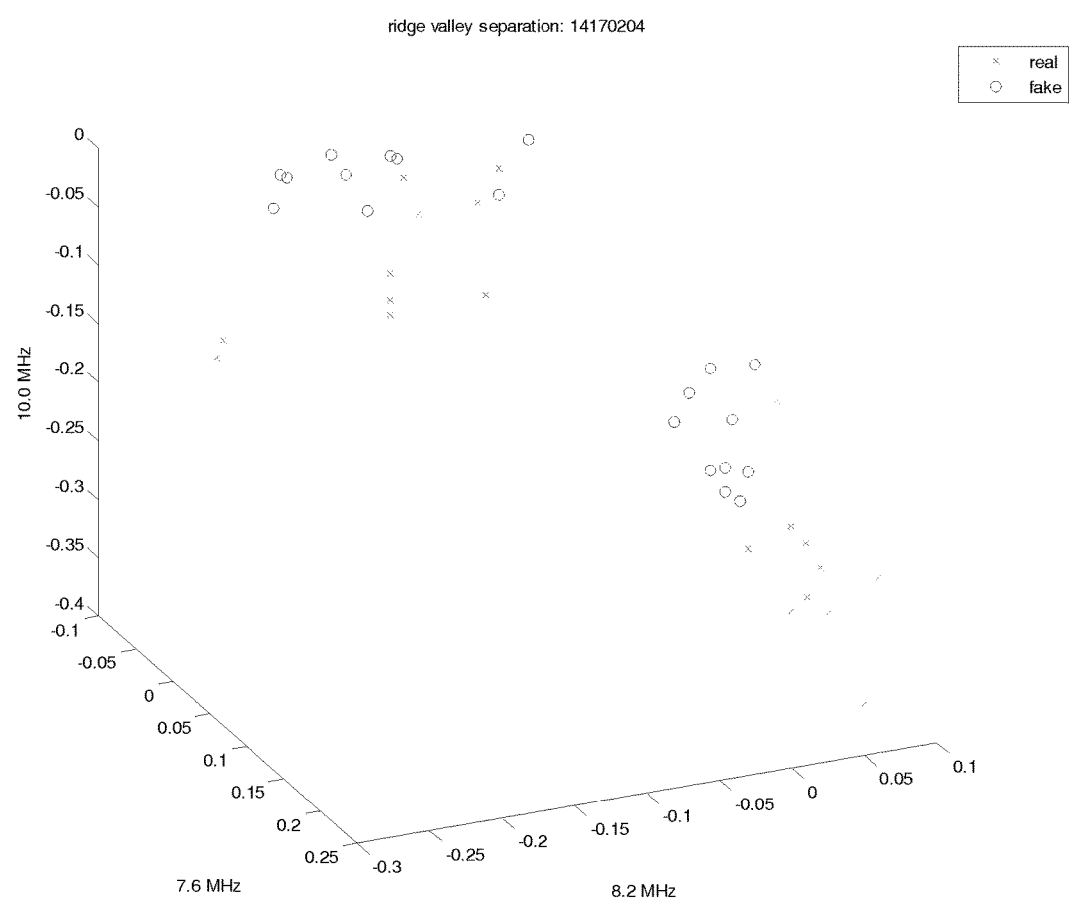
Figure 35:
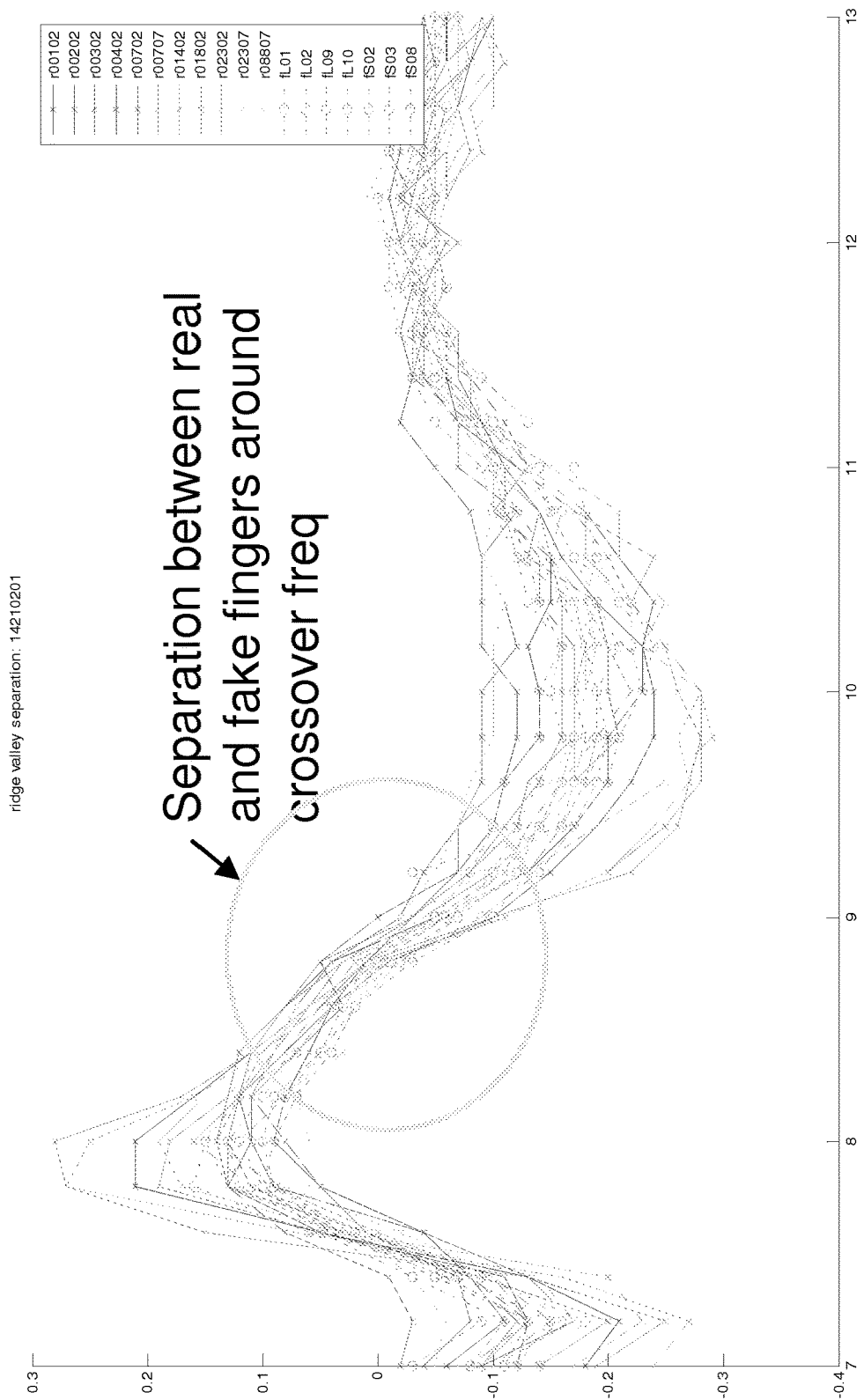
Figure 36:
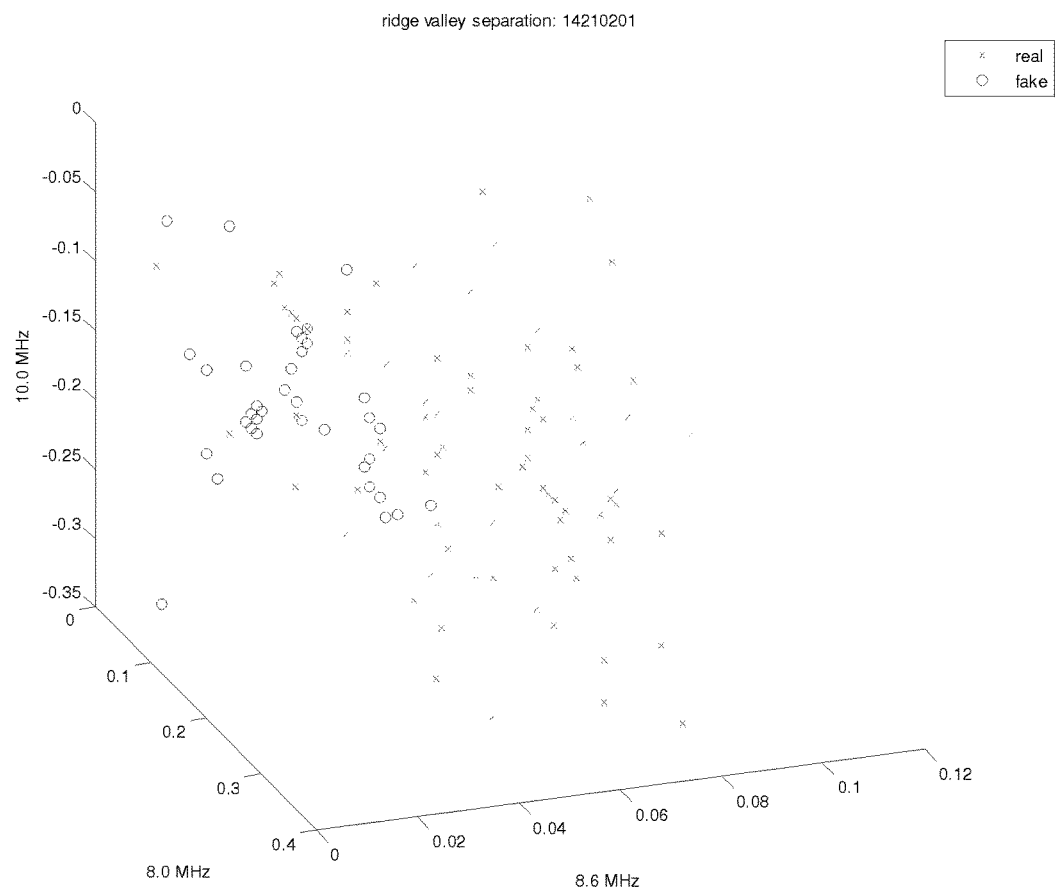
Figure 39A:
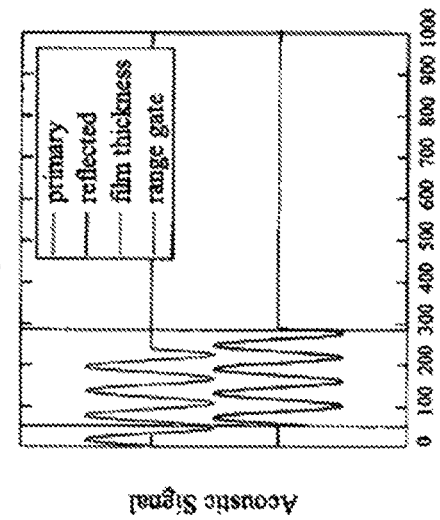
FIGS. 39A-C depict plots of signals reflected from various portions of the target object in another configuration of a system for multi-spectral ultrasonic imaging.
Figure 39B:
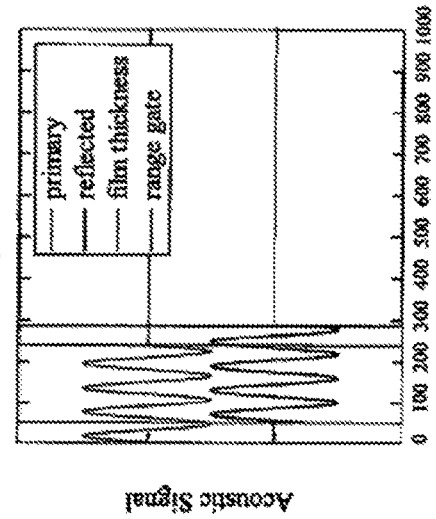
Figure 39C:
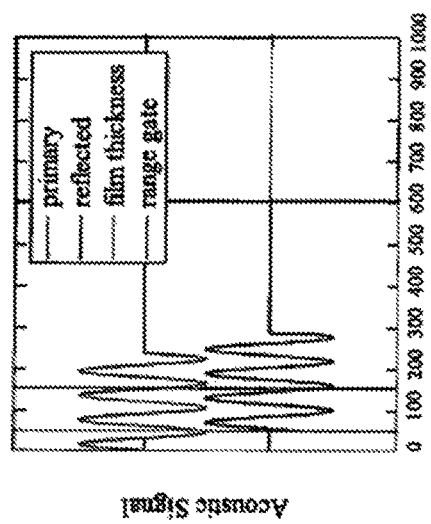
Figure 39D:
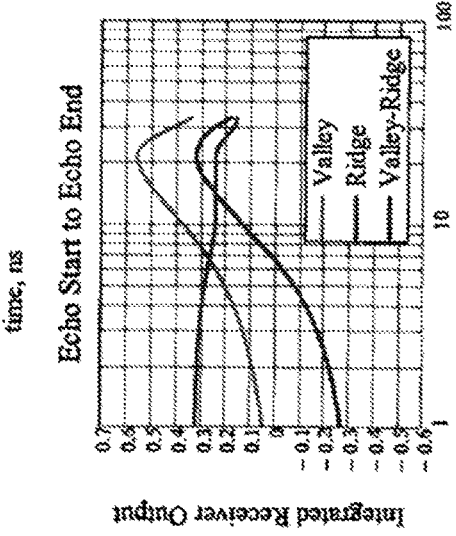
Figure 39E:
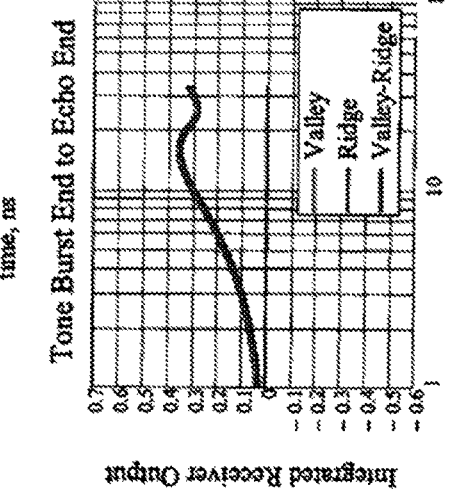
Figure 39F:
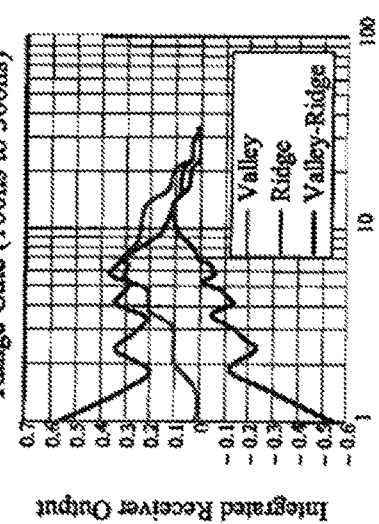

For determining the optimal frequencies of operation, a standard factory-like calibration methodology can be employed by using a target material (e.g., rubber) similar in acoustic properties to a finger. Two sets of measurements may be taken, one with the target material completely covering the platen (simulating finger) and another without any target object on the platen ("air" measurement). The frequency of the tone burst signal may be swept, and the TFT response captured for both the cases (with and without the target). The difference between the two signals is then used to determine the optimal point(s) where inversion behavior is best observed which is given by the negative and positive maximum of the difference signal of air and target ("Air minus Target"). FIG. 32 illustrates a negative peak and positive peak as plotted between the air minus target voltage difference versus the frequency of ultrasonic signal.

Another embodiment of the present disclosure may be related to determining fingerprint liveness. A fingerprint is proven to be an effective biometric trait to distinguish a subject's identity. Fingerprint authentication has been widely used. However, fingerprint authentication is vulnerable to spoofing. A fake finger (a.k.a. a "spoof") can be made from molds of an enrolled real finger, and used to falsely obtain authentication. The molds can be made with or without user cooperation. To guard against the use of a spoof, an attempt may be made to determine whether the target object is live. Existing liveness tests can be categorized into two groups. One group is an image-based approach, which relies on the subtle traits that are visually perceptible in fingerprint images to distinguish real and fake fingers. This approach requires fairly high resolution (500 to 1000 dpi) to properly assess liveness. A second group of liveness tests is a hardware-based approach, which requires hardware other than the fingerprint sensor to capture liveness features, such as blood pressure, pulse, conductivity, etc.

One embodiment of the present disclosure incorporates testing for liveness by using multi-frequency ultrasonic information sets. At the optimal operating frequency, both real and fake fingers may look similar and result in very subtle differences in image-based liveness features. However, different materials have different ultrasonic reflectance over different frequencies. The differences over a range of frequencies can be used to identify a spoof. For each pixel, a vector of liveness features may be extracted. The vectors may be normalized using a reference frequency response. The normalized frequency response vector may then processed to generate a multi-frequency signature of that material and hence a good indication for liveness. FIGS. 33-36 illustrate results of multi-frequency-based approaches to a liveness test.

One method of determining liveness using a multi-frequency-based approach comprises selecting a first one of the information sets (the "FoIS"), the group of information sets including information sets captured by a multi-frequency ultrasonic sensor. The method may further comprise the step of identifying pixels (the "ridge-pixels") in the FoIS corresponding to ridges of the fingerprint. The method may further comprise the step of identifying pixels (the "valley-pixels") in the FoIS corresponding to valleys of the fingerprint.

For each of the other information sets, the method may further comprise the step of computing SSHDI or FSHDI for the ridge-pixels and SSHDI or FSHDI for the valley-pixels. For each of these other information sets, the method may further comprise identifying a feature-value of the ridge-pixel SSHDI or FSHDI and a feature-value of the valley-pixel SSHDI or FSHDI. For each of the other information sets, the method may further comprise determining a difference between the ridge-pixel feature-value and the valley-pixel feature-value to obtain a separation value. For each of the other information sets, the method may further comprise determining whether the separation values identify a spatial location previously identified as corresponding to a live being.

In one embodiment, the feature-value is a signal-strength most commonly appearing in the SSHDI or FSHDI. In another embodiment, the feature-value is a median signal-strength appearing in the SSHDI or FSHDI. However, the feature-value may be a statistical energy, statistical entropy, or statistical variance of the SSHDI or FSHDI.

The following describes operating information for a particular sensor that uses multiple frequencies and ultrasonic waves to obtain information about a target object, such as a fingerprint, in keeping with the present disclosure. Operating information may include material types, and other aspects of the sensor. It should be noted that this particular sensor uses an integrator to detect signal peaks, but other devices may be used to detect signal peaks.

In this particular sensor, a Tone Burst Generator function is created. For the following equations, f=frequency, n=number of pulses, t=time, $t_0$=start time, and A=amplitude. The tone burst function generator may be described by the following equation:

$$\eta(f, n, t, t_0, A) := \text{if}\left[t < t_0, 0, \text{if}\left[t > \left(t_0 + \frac{n}{f}\right), 0, A(\sin[2\pi f(t - t_0)])\right]\right]$$

The reflected tone burst may be described by the following equation:

$$r\eta(f, n, t, t_0, A) := \text{if}\left[t < t_0, 0, \text{if}\left[t > \left(t_0 + \frac{n}{f}\right), 0, A\left(\sin\left[2\pi f\left(t - \frac{t_0}{2}\right)\right]\right)\right]\right]$$

The speed of sound in PVDF, parylene, and polycarbonate may be respectively as follows:

$$c_{pvdf} := 2200 \frac{m}{s}, c_{pary} := 2307 \frac{m}{s}, c_{car} := 2241 \frac{m}{s}$$

The thickness of PVDF, parylene, and polycarbonate in this particular sensor may be respectively described as follows:

$\delta_{pvdf} := 28$ μm, $\delta_{pary} := 25$ μm, $\delta_{pcar} := 254$ μm

The range gate function may be described by the following equation:

RangeGate($t$,rgstart,rgstop,$X$):=if[($t$≥rgstart)∧[$t$≤($rg$-stop)],$X$,$-X$]

The index, array of times, and number of pulses in the tone burst may be described as follows:

$j := 0 \ldots 2000, t_j := jns, n := 4$

The piezoelectric layer and parylene coating on top of the piezoelectric may be observed first. The following equations describe a possible observation:

$$\delta t := 2\left(\frac{\delta_{pvdf}}{c_{pvdf}} + \frac{\delta_{pary}}{c_{pary}}\right)$$

-continued $$= 47.128 \text{ ns},$$

(i.e., time to enter receiver stack, reflect and return)

The following parameters may be relevant to this particular sensor:

$rg_{on}$:=150 ns,$rg_{off}$:=600 ns(arbitrary range gate start and range gate end)

$p(f,\tau)$:=$\eta(f,n,\tau,0$ ns,1)(primary pulse)

$r(f,\tau,\delta t)$:=$r\eta(f,n,\tau,\delta t,1)$(reflected pulse)

$x(f,\tau,\delta t,\sigma)$:=$p(f,\tau)+r(f,\tau,\delta t)-\sigma$(interference modulated pulse (pulse meeting its own reflection at the receiver layer))

$q(f,\tau,\delta t,\sigma)$:=if($x(f,\tau,\delta t,\sigma)<0,0,x(f,\tau,\delta t,\sigma)$)(rectified electrical signal resulting from the pulse and its reflections)

Valley = 1, Ridge = 0, $MRayl = \dfrac{10^6 \text{ kg}}{sm^2}$ $R(W_{from}, W_{into}) := \dfrac{W_{into} - W_{from}}{W_{into} + W_{from}}$ (reflectivity), where $W_{air} := 0.000412 \text{ } MRayl$, $W_{pvdf} := 4.005 \text{ } MRayl$, $W_{pc} := 2.672 \text{ } MRayl$, $R(W_{air}, W_{pvdf}) = 0.9997943$, $R(W_{pvdf}, W_{air}) = -0.9997943$, $R(W_{air}, W_{pc}) = 0.9996917$, $R(W_{pc}, W_{air}) = -0.9996917$ Film($t, \delta t, X$) := if $(t < \delta t, -X, X)$(film thickness marker function)

The following equation represents critical range gate points, where $\delta t$ is the platen thickness (start of echo), $$\dfrac{n}{f}$$

is the TB length (end of TB), and $$\delta t + \dfrac{n}{f}$$

is the end of the echo:

$$rg(f, n, \delta t) := \begin{pmatrix} \delta t \\ \dfrac{n}{f} \\ \delta t + \dfrac{n}{f} \end{pmatrix}$$

A frequency sweep of outputs may be captured from the receiver. For example, the frequency sweep may begin at 1 MHz and progressively increase in 0.1 MHz increments, until an upper frequency is reached, for example, 33 MHz. Using the following configuration, the signals are captured, as shown in FIGS. 37A-C and 39A-C:

$$\delta t := 2\left(\dfrac{\delta_{pvdf}}{c_{pvdf}} + \dfrac{\delta_{pary}}{c_{pary}}\right) = 47.128 \text{ ns}$$

Capture($f,t,gs,ge,\sigma$):=if[($t \geq gs$) $\wedge$ $\lfloor t \leq ge \rfloor,p(f,t)+r(f,t,\delta t)$ $\sigma,0$]

Rectifier($f,t,gs,ge,\sigma$):=if(Capture($f,t,gs,ge,\sigma$)$\leq 0,0$,Capture($f,t,gs,ge,\sigma$))

FIG. 39 D-F shows the integrated receiver output by frequency based on various range gates.

Using the following configuration (adding 254 μm of polycarbonate platen), the signals are captured, as shown in FIG. 38A-C:

$$\delta t := 2\left(\dfrac{\delta_{pvdf}}{c_{pvdf}} + \dfrac{\delta_{pary}}{c_{pary}} + \dfrac{\delta_{pcar}}{c_{pcar}}\right) = 273.812 \text{ ns}$$

Capture($f,t,gs,ge,\sigma,\delta t$):=if[($t \geq gs$) $\wedge$ $\lfloor t \leq ge \rfloor,p(f,t)+r(f,t,\delta t)\sigma,0$]

Rectifier($f,t,gs,ge,\sigma,\delta t$):=if(Capture($f,t,gs,ge,\sigma,\delta t$)$\leq 0,0$, Capture($f,t,gs,ge,\sigma,\delta t$))

The following integrating function may be used:

$$Itg(f, \delta t, \sigma, rg_{on}, rg_{off}) := \int_{rg_{on}}^{rg_{off}} \dfrac{q(f, \tau, \delta t, \sigma)}{rg_{off} - rg_{on}} d\tau, \text{ where}$$

$\sigma$ = surface state(1 = valley, 0 = ridge), $f$ = frequency, $\tau$ = instantaneous time, $\delta t$ = thickness(time), $rg_{off}$ = range gate OFF, $rg_{on}$ = range gate ON The following equation may be used to describe an integrated valley minus ridge:

$$Idf(f, \delta t, rg_{on}, rg_{off}) := \int_{rg_{on}}^{rg_{off}} \dfrac{q(f, \tau, \delta t, 1) - q(f, \tau, \delta t, 0)}{rg_{off} - rg_{on}} d\tau$$

Figure 40A:
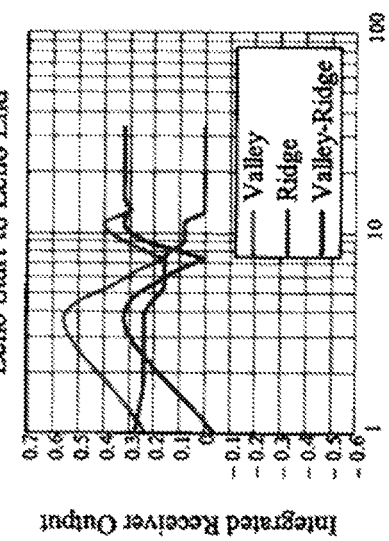
FIGS. 40A-C depict plots of signals reflected from various portions of the target object in another configuration of a system for multi-spectral ultrasonic imaging.
Figure 40B:
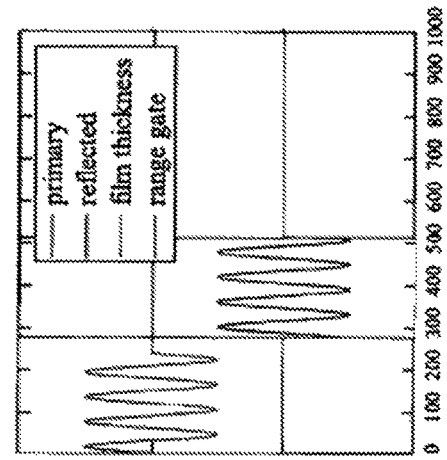
Figure 40C:
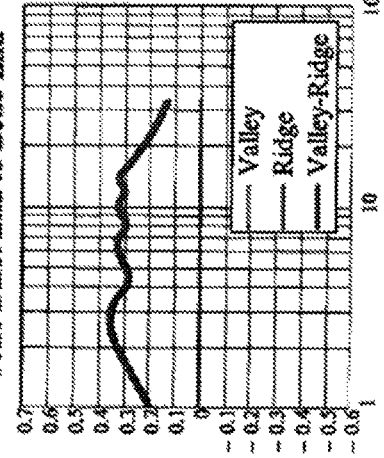
Figure 40D:
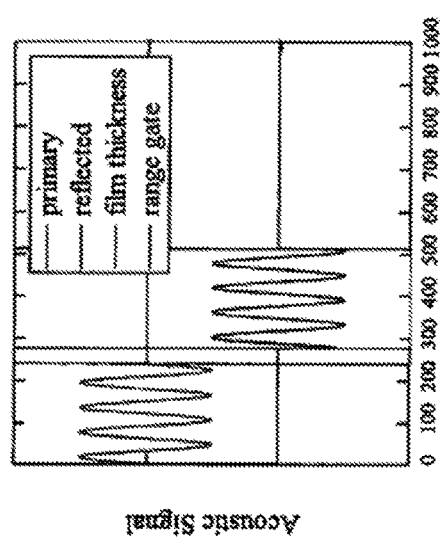
Figure 40E:
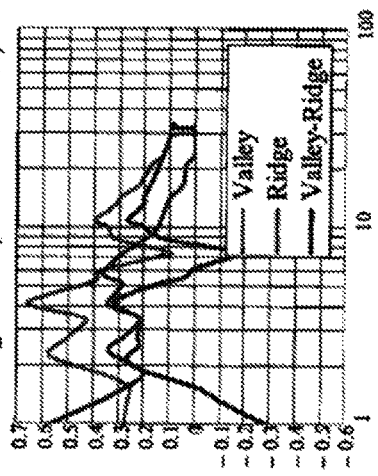
Figure 40F:
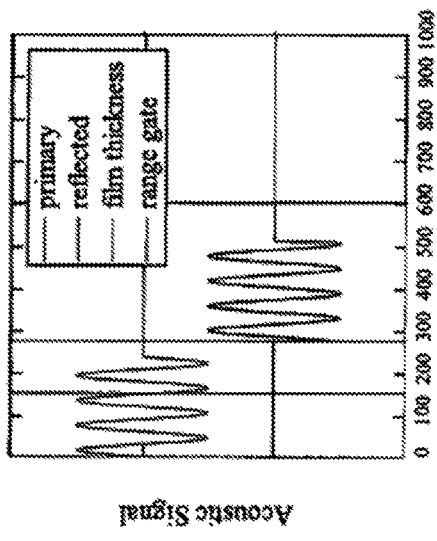
Figure 41A:
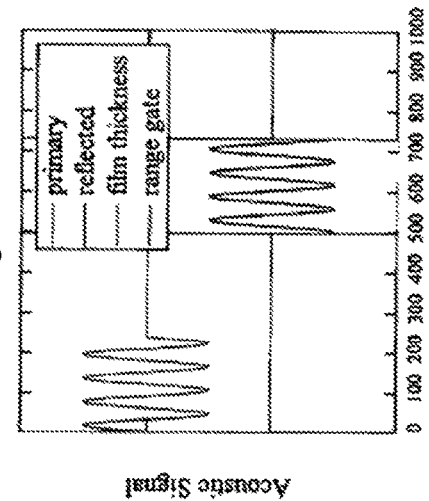
FIGS. 41A-C depict plots of signals reflected from various portions of the target object in another configuration of a system for multi-spectral ultrasonic imaging.
Figure 41B:
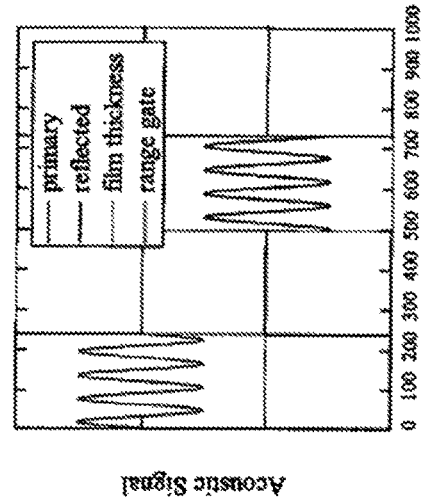
Figure 41C:
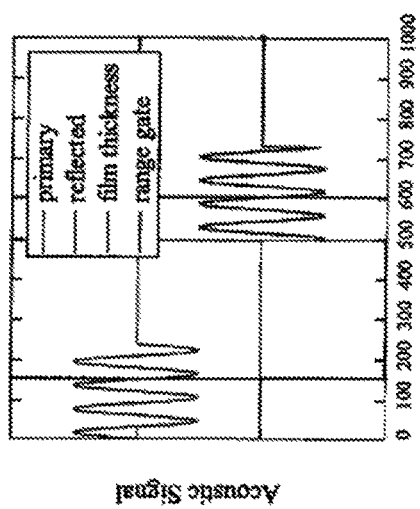
Figure 41D:
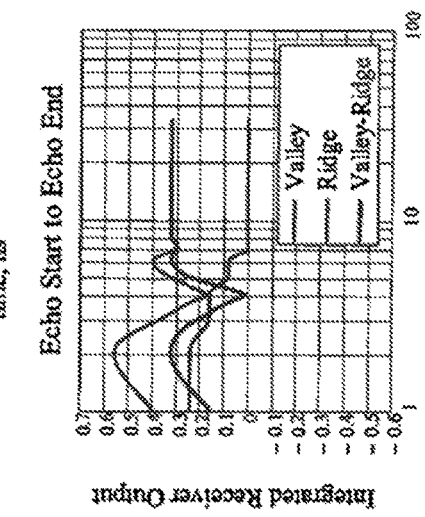
Figure 41E:
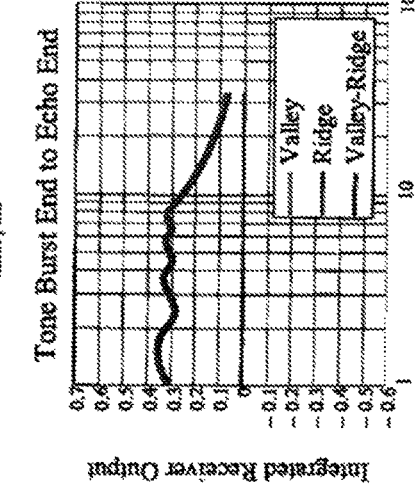
Figure 41F:
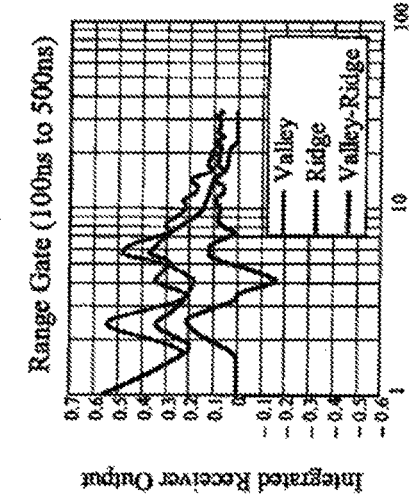

In this particular sensor, an ultrasonic signal enters the piezoelectric film, passes through the film and reflects back down. If the signal encounters a fingerprint valley (air), both the entering and reflecting pulses will excited the piezoelectric film to produce an electrical signal. In situations where the signal passes through finger tissue, such as a fingerprint ridge, only the entering pulse will excite the piezoelectric film. The signal may be delayed between the film and the target object by a delay line, such as 254 μm of polycarbonate (see FIG. 40A-C) or a 500 μm platen (see FIG. 41A-C). FIG. 40D-F shows the integrated receiver output by frequency based on various range gates with the 254 μm polycarbonate layer. FIG. 41D-F shows the integrated receiver output by frequency based on various range gates with the 500 μm platen layer.

Figure 43:
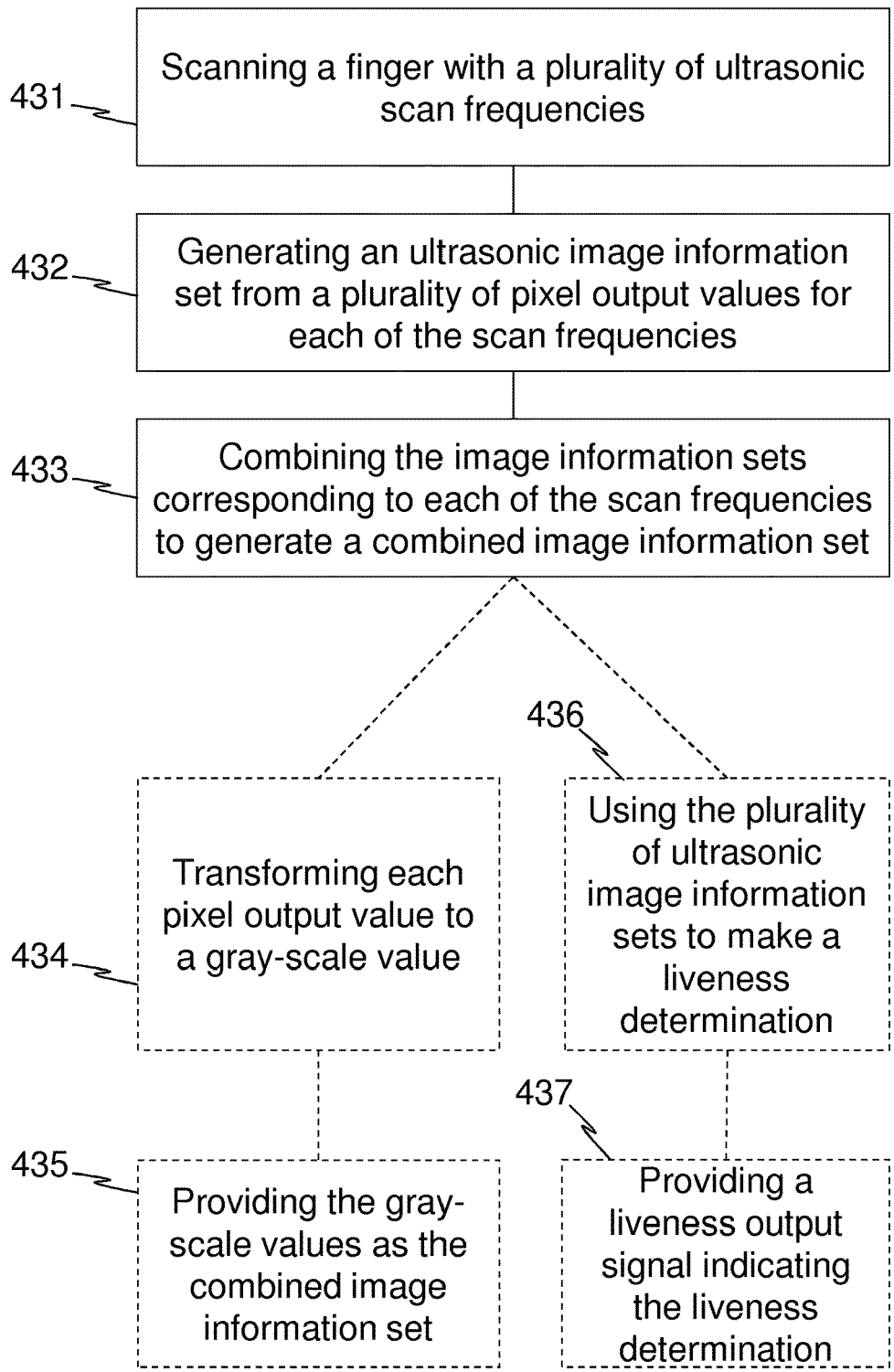
FIG. 43 is a flowchart of a method for scanning a finger.

FIG. 43 is a flowchart of a multi-spectral method of scanning a finger. The method may include scanning 431 a finger with a plurality of ultrasonic waves at various scan frequencies. The method may further include generating 432 an ultrasonic image information set from a plurality of pixel output values for each of the scan frequencies. The method may further include combining 433 the image information sets corresponding to each of the scan frequencies to generate a combined image information set. The method may further include transforming 434 each pixel output value to a gray-scale value. The method may further include providing 435 the gray-scale values as the combined image information set. The method may further include using 436 the plurality of ultrasonic image information sets to make a liveness determination. The method may further include providing 437 a liveness output signal indicating the liveness determination.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method of scanning a finger, comprising:
    scanning a finger positioned on an imaging surface of an ultrasonic sensor with a plurality of ultrasonic scan frequencies;
    generating an ultrasonic image information set from a plurality of pixels of the ultrasonic sensor for each of the scan frequencies, the image information set including a pixel output value from each of the plurality of pixels, each pixel output value indicating an amount of energy reflected from the imaging surface; and
    combining the image information sets corresponding to each of the scan frequencies to generate a combined image information set, the combined image information set including combined pixel output values from each of the plurality of pixels, wherein combining the image information sets includes creating a covariance matrix for each of the scan frequencies from the pixel output values in the image information sets, and combining the covariance matrices to provide a combined matrix having a combined value for each pixel output value and interpolating between entries in the covariance matrices.

2. The method of claim 1, further comprising:
    transforming each pixel output value to a gray-scale value; and
    providing the gray-scale values for the plurality of pixels as the combined image information set representing a fingerprint of the finger.

3. The method of claim 1, further comprising:
    using the plurality of ultrasonic image information sets to make a liveness determination; and
    providing a liveness output signal indicating the liveness determination.

4. The method of claim 1, further comprising:
    for each scan frequency, identifying a weighting factor; and
    multiplying each entry in the covariance matrices by the corresponding weighting factor prior to combining the covariance matrices.

5. The method of claim 4, wherein the weighting factor is calculated using the following equation:

$$w(f_i) = (e^{(avg_i * fi)} - e^{(avg_i * fmax)}) / (e^{(avg_i * fmin)} - e^{(avg_i * fmax)})$$

where
  $w(f_i)$ is the weighting factor for the $i^{th}$ scan frequency;
  $avg_i$ is the average value of the pixel output values at the $i^{th}$ scan frequency and a next lower scan frequency;
  $f_{min}$ is a lowest scan frequency; and
  $f_{max}$ is a highest scan frequency.

6. The method of claim 1, wherein the plurality of scan frequencies are selected by:
    scanning, without a finger on the imaging surface of the ultrasonic sensor, at a plurality of ultrasonic test frequencies; and
    identifying peak test frequencies, wherein a peak test frequency is a test frequency at which an immediately lower test frequency and an immediately higher test frequency return less energy than the peak test frequency.

7. The method of claim 6, further comprising:
    selecting peak test frequencies, each selected peak test frequency having a return energy that is higher than a majority of other test frequencies, and using the selected peak test frequencies as the plurality of scan frequencies.

8. The method of claim 6, further comprising:
    assessing image quality of the peak test frequencies;
    selecting peak test frequencies, each selected peak test frequency having an image quality that is better than other peak test frequencies, and using the selected peak test frequencies as the plurality of scan frequencies.

9. The method of claim 6, further comprising:
    selecting one of the peak test frequencies, and
    using the selected peak test frequency as one of the plurality of scan frequencies.

10. The method of claim 9, further comprising identifying additional ones of the plurality of scan frequencies by adding or subtracting a predetermined offset to the selected one of the peak test frequencies.

11. The method of claim 9, further comprising identifying additional ones of the plurality of scan frequencies by:
    identifying a range that includes the selected one of the peak test frequencies; and
    selecting the scan frequencies to be within the identified range.

12. The method of claim 9, further comprising identifying additional ones of the plurality of scan frequencies by identifying harmonics of the selected peak test frequency.

13. The method of claim 3, wherein generating an ultrasonic information set further comprises generating a vector of liveness for each pixel.

* * * * *